United States Patent
Godard et al.

(10) Patent No.: US 10,678,700 B2
(45) Date of Patent: Jun. 9, 2020

(54) CPU SECURITY MECHANISMS EMPLOYING THREAD-SPECIFIC PROTECTION DOMAINS

(71) Applicant: Mill Computing, Inc., Palo Alto, CA (US)

(72) Inventors: Roger Rawson Godard, East Palo Alto, CA (US); Arthur David Kahlich, Sunnvale, CA (US); Jan Schukat, Berlin (DE); William Edwards, Bräkne Hoby (SE)

(73) Assignee: Mill Computing, Inc., Palo Alto, CA (US)

( * ) Notice: Subject to any disclaimer, the term of this patent is extended or adjusted under 35 U.S.C. 154(b) by 128 days.

(21) Appl. No.: 15/559,858

(22) PCT Filed: Mar. 21, 2016

(86) PCT No.: PCT/US2016/023420
§ 371 (c)(1),
(2) Date: Sep. 20, 2017

(87) PCT Pub. No.: WO2016/154115
PCT Pub. Date: Sep. 29, 2016

(65) Prior Publication Data
US 2018/0060244 A1 Mar. 1, 2018

Related U.S. Application Data

(63) Continuation of application No. 14/663,760, filed on Mar. 20, 2015, now Pat. No. 9,747,218.
(Continued)

(51) Int. Cl.
*G06F 12/08* (2016.01)
*G06F 12/0893* (2016.01)
(Continued)

(52) U.S. Cl.
CPC ............ *G06F 12/0893* (2013.01); *G06F 9/00* (2013.01); *G06F 9/3004* (2013.01);
(Continued)

(58) Field of Classification Search
CPC .... G06F 12/0875; G06F 12/0893; G06F 9/00; G06F 9/46; G06F 9/3004; G06F 9/3009;
(Continued)

(56) References Cited

U.S. PATENT DOCUMENTS 6,546,546 B1  4/2003  Van Doorn
6,604,123 B1  8/2003  Bruno et al.
(Continued)

FOREIGN PATENT DOCUMENTS

WO    WO 2010/151267 A1    12/2010

OTHER PUBLICATIONS

Early Capability Architectures, Capability Based-Computer Systems, Henry M. Levy, 1984, pp. 41-47.
(Continued)

*Primary Examiner* — Pierre Miche Bataille
(74) *Attorney, Agent, or Firm* — Gordon & Jacobson, P.C.

(57) ABSTRACT

A computer processor includes an instruction processing pipeline that interfaces to a hierarchical memory system employing an address space. The instruction processing pipeline includes execution logic that executes at least one thread in different protection domains over time, wherein the different protection domains are defined by descriptors each including first data specifying a memory region of the address space employed by the hierarchical memory system and second data specifying permissions for accessing the associated memory region. The address space can be a virtual address space or a physical address space. The protection domains can be associated with different turfs
(Continued)

each representing a collection of descriptors. A given thread can execute in a particular protection domain(turf), one protection domain (turf) at a time with the particular protection domain (turf) selectively configured to change over time.

32 Claims, 24 Drawing Sheets

Related U.S. Application Data

(60) Provisional application No. 62/145,070, filed on Apr. 9, 2015.

(51) Int. Cl.

| | |
|---|---|
| *G06F 12/0875* | (2016.01) |
| *G06F 9/30* | (2018.01) |
| *G06F 12/14* | (2006.01) |
| *G06F 9/38* | (2018.01) |
| *G06F 9/46* | (2006.01) |
| *G06F 9/00* | (2006.01) |

(52) U.S. Cl.
CPC .......... *G06F 9/3009* (2013.01); *G06F 9/3802* (2013.01); *G06F 9/3851* (2013.01); *G06F 9/468* (2013.01); *G06F 12/0875* (2013.01); *G06F 12/1441* (2013.01); *G06F 2212/60* (2013.01)

(58) Field of Classification Search
CPC ... G06F 9/3802; G06F 9/3851; G06F 12/1441

USPC .................................................. 711/152, 150
See application file for complete search history.

(56) References Cited

U.S. PATENT DOCUMENTS

| | | | |
|---|---|---|---|
| 7,287,140 | B1 | 10/2007 | Asanovic et al. |
| 7,437,521 | B1 | 10/2008 | Scott et al. |
| 9,122,890 | B2 | 9/2015 | Grocutt et al. |
| 9,652,230 | B2 | 5/2017 | Godard et al. |
| 9,747,216 | B2 | 8/2017 | Godard et al. |
| 9,747,218 | B2* | 8/2017 | Godard .............. G06F 12/0875 |
| 9,934,166 | B2* | 4/2018 | Wilkerson .............. G06F 9/322 |
| 2005/0198479 | A1 | 9/2005 | Bean et al. |
| 2011/0276760 | A1 | 11/2011 | Chou |
| 2012/0144167 | A1* | 6/2012 | Yates, Jr. ............ G06F 9/30174 |
| | | | 712/216 |
| 2013/0275656 | A1* | 10/2013 | Talagala .............. G06F 12/0246 |
| | | | 711/103 |
| 2013/0283017 | A1* | 10/2013 | Wilkerson ............. G06F 9/322 |
| | | | 712/225 |
| 2014/0075581 | A1 | 3/2014 | Grocutt et al. |
| 2016/0350019 | A1* | 12/2016 | Koufaty ................ G06F 3/0622 |
| 2017/0232003 | A1 | 8/2017 | Voskuhl |

OTHER PUBLICATIONS

Mondrian Memory Protection, Emmett Witchel et al., MIT Laboratory for Computer Science, 2002.
Mondrix: Memory Isolation for Linux Using Mondriaan Memory Protection, Emmett Witchel et al., 2005.

* cited by examiner

Fetch ⟶ Decode ⟶ Issue ⟶ Execute ⟶ Retire

Portal Entry

Stacklet Info Block

CPU SECURITY MECHANISMS EMPLOYING THREAD-SPECIFIC PROTECTION DOMAINS

BACKGROUND OF THE INVENTION

1. Field

The present disclosure relates to computer processing systems.

2. State of the Art

A computer processor and the program which it executes needs places to put data for later reference. A computer processor will typically have many such places, each with its own trade off of capacity, speed of access, and cost. Usually these are arranged in a hierarchal manner referred to as the memory system of the computer processing system, with small, fast, costly places used for short lived small data and large, slow and cheap places used for what doesn't fit in the small, fast, costly places. The hierarchical memory system typically includes the following components arranged in order of decreasing speed of access:

a register file or other form of fast operand storage;

one or more levels of cache memory (one or more levels of the cache memory can be integrated with the processor (on-chip cache) or separate from the processor (off-chip cache);

main memory (or physical memory), which is typically implemented by DRAM memory and/or NVRAM memory and/or ROM memory; and on-line mass storage (typically implemented by one or more hard disk drives).

In many computer processing systems, the main memory can take several hundred cycles to access. The cache memory, which is much smaller and more expensive but with faster access as compared to the main memory, is used to keep copies of data that resides in the main memory. If a reference finds the desired data in the cache (a cache hit) it can access it in a few cycles instead of several hundred when it doesn't (a cache miss). Because a program typically has nothing else to do while waiting to access data in memory, using a cache and making sure that desired data is copied into the cache can provide significant improvements in performance.

The address space of the program can employ virtual memory, which provides for two different purposes in modern processors. One purpose, hereinafter paging, permits the totality of the address spaces used by all programs to exceed the capacity of the main memory attached to the processor. The other purpose, hereinafter address extension, permits the totality of the address spaces used by all programs to exceed the address space supported by the processor.

Paging can be used to map the virtual addresses used by the program at page granularity to physical addresses recognized by the main memory or to devices such as disk that are used as paging store. The set of valid virtual addresses usable without error by a program is called its address space. The address mapping is represented by a set of mapping tables maintained by the operating system as it allocates and de-allocates memory for the various running programs. Every virtual address must be translated to the corresponding physical address before it may be used to access physical memory.

Systems with caches differ in whether cache lines store tags defined by a physical address (physical caching) or a virtual address (virtual caching). In the former, virtual addresses must be translated at least before they are used to match against the physical addressed tags of the cache; in the latter, translation occurs after cache access and is avoided if the reference is satisfied from cache.

Address extension is not needed when the space encompassed by the representation of a program address is large enough. Common representations of program address space are four bytes (32 bits) and eight bytes (64 bytes). The four-byte representation (yielding a four gigabyte address space) is easily exceeded by modern programs, so addresses (and address spaces) must be reused with different meanings by different programs and address extension must be used. Reuse of the same address by different programs is called aliasing. The computer processing system must disambiguate aliased use of addresses before they are actually used in the memory hierarchy.

In a computer processing system employing physical caching, alias disambiguation occurs prior to the caches. In a computer processing system employing virtual caching, disambiguation can occur after the caches if the caches are restricted to hold only memory from a single one of the aliased addressed spaces. Such a design requires that cache contents be discarded whenever the address space changes. However, the total space used by even thousands of very large programs will not approach the size representable in 64 bits, so aliasing need not occur and address extension is unnecessary in 64-bit machines. A computer processing system that does not use address extension permits all programs to share a single, large address space; such a design is said to use the single-address-space model.

It happens that the same hardware can be used both to disambiguate aliases and to map physical memory, and such is the common arrangement. Because alias disambiguation is typically performed prior to physical caches, using the common hardware means that page mapping occurs their too. When paging and alias disambiguation are in front of physical caches, it is also common to use the same hardware for access control, restricting the kinds of access and the addresses accessible to the program. The hardware enforced restrictions comprise the protection model of the processor and memory system. Protection must apply to cache accesses, so the protection machinery must be ahead of the caches. Hence it is common to have one set of hardware that intercepts all accesses to the memory hierarchy and applies protection restriction, alias disambiguation, and page mapping all together. Because all this must be performed for every reference to memory, and specifically must be performed before cache can be accessed, the necessary hardware is power hungry, large and on the critical path for program performance.

Furthermore, modern CPU architectures support protected multiprocessing where different program invocations are given their own sets of private resources (a process) and then run in parallel, with a combination of hardware and software ensuring that no program can inspect or change the private resources of any other. This protected multiprocessing is often accomplished by letting the CPU execute the code of one process for a while (with access to the resources of that process), and then changing the hardware execution environment to that of another process and running that one for a while with access to the resources of the second but no longer with access to the resources of the first. Changing from running one process to running another is called a process switch and is very expensive in machine terms because of the amount of state that has to be saved and restored as the process context is changed.

A process can contain multiple threads. A thread is a sequence of one or more instructions executed by the CPU. Typically, threads are used for small tasks, whereas processes are used for more heavyweight tasks, such as the execution of applications. Another difference between a thread and a process is that threads within the same process share the same address space, whereas different processes do not. This allows threads to read from and write to the same data structures and variables, and also facilitates communication between threads.

Communication between processes (also known as inter-process communication) can be quite difficult and resource-intensive. For example, one process may be the source of some data that it computes or reads from a file, while the second is a sink for the data which it uses in its own operation or writes out to a file in turn. In the usual arrangement, the processes arrange for a buffer to be created as a shared resource in memory that they both have access to. The source then fills the buffer with data and triggers a process switch to the sink. The sink consumes the data, and then triggers a process switch back to the source for more data. Each buffer full thus involves two process switches. In addition, the processes must establish some protocol to make sure that (for example) the source doesn't start putting more data into the buffer before the sink has finished emptying it of the previous data. Such protocols are difficult to write and a frequent source of subtle bugs.

Communication between the threads of a process is much easier. In one method, both source and sink threads can run concurrently (on separate cores) or semi-concurrently (being swapped in and out of a single core), and communicate using shared data structures similar to inter-process communication. In a second method, only one thread is active at a time (no matter how many cores are available), and a special operation or system function permits the running thread to give up control to an idle thread, possibly passing arguments to the idle thread. This method is typically referred to as "coroutines," and the operation that stops the active thread and passes control to the idle thread is often called a "visit." Processes can also communicate as coroutines.

The difference between process and thread-based communication is that the threads share their whole environment, while processes don't, although they may share limited quantities of state for purposes of the communication. Thus, current CPU architectures require that the program code of the cooperating source and sink threads share resource environments. If the code of the source and sink are to have private resource sets, they must be organized as separate processes and utilize the process switch machinery and a custom protocol.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor including an instruction processing pipeline that interfaces to a hierarchical memory system employing an address space. The instruction processing pipeline includes execution logic that executes at least one thread in different protection domains over time, wherein the different protection domains are defined by descriptors each including first data specifying a memory region of the address space employed by the hierarchical memory system and second data specifying permissions for accessing the associated memory region. The address space can be a virtual address space or a physical address space. The protection domains can be defined by turfs each representing a collection of descriptors. A given thread can execute in a particular protection domain/turf, one protection domain/turf at a time. The particular protection domain/turf can be selectively configured to change over time.

In one embodiment, the descriptors of a protection domain are associated with a key (turf ID) that identifies the protection domain. The protection domain can be associated with a key (thread ID) that uniquely identifies the thread that currently executes in the protection domain. The thread ID can have a configuration that specifies a wildcard identifier corresponding to any thread being executed by the execution logic. The turf ID can have a configuration that specifies a wildcard identifier corresponding to any turf being executed by the execution logic.

The descriptors can be stored in at least one hardware table that is queried in conjunction with servicing requests that access the hierarchical memory system.

In one embodiment, the hierarchical memory system includes a top level instruction cache separate from a top level data cache. The descriptors for memory regions that store instructions are stored in a first hardware table that is queried in conjunction with servicing fetch requests that are issued to the top level instruction cache for accessing instruction portions stored in the top level instruction cache. The descriptors for memory regions that store operand data are stored in a second hardware table that is queried in conjunction with servicing memory requests that are issued to the top level data cache for loading operand data from or storing operand data in the top level data cache. The second data for descriptors stored in the first hardware table can selectively specify an execute permission or a portal permission. The second data for descriptors stored in the second hardware table can selectively specify a write permission or a read permission. Both tables can selectively specify a grant permission, which permits transitive re-granting. The first hardware table can be queried in parallel with querying the top level instruction cache, and the second hardware table can be queried in parallel with querying the top level data cache. These tables are known as the "persistent" tables, as opposed to the "transient" tables to be described later, and the permissions they contain are part of the "persistent permissions".

In another embodiment, the protection domains can be further defined by descriptors for predefined memory regions of the address space that are stored in hardware registers of the computer processor. The predefined memory regions can include at least one memory region selected from the group including: at least one turf-specific memory region, at least one thread-turf-specific memory region, and at least one thread-specific memory region. The at least one turf-specific memory region can include a first memory region that stores instructions for a particular turf, a second memory region that stores constants for a particular turf, and a third memory region that stores data for the particular turf. The at least one thread-turf-specific memory region can include a memory region that stores a stack portion for a particular thread-turf pair (e.g., a stack frame for the stacklet of the particular thread-turf pair as described herein). The at least one thread-specific memory region can include a memory region that stores thread local data for a particular thread. These hardware descriptors also comprise part of the "persistent permissions". It is possible for permissions in the hardware descriptors and in the persistent tables to duplicate or overlap each other.

The hardware registers that store the descriptors for the predefined memory regions of the address space can be accessed and processed in order to perform protection checking before querying the at least one hardware table that stores the descriptors for protection checking. In certain circumstances, the protection checking carried out by accessing and processing the hardware registers that store the descriptors for the predefined memory regions of the address space avoids the protection checking carried out by accessing and processing the at least one hardware table that stores the descriptors.

The at least one hardware table storing the descriptors can be backed to one or more Permission Tables stored in the memory system. The descriptors can be stored as entries in the hardware table where each entry includes a single bit that is processed when first adding the corresponding entry to the at least one hardware table and when evicting the corresponding entry from the at least one hardware table. Such processing can remove the corresponding entry from the at least one hardware table without accessing the one or more Permission Tables for circumstances when the corresponding entry is not located in the one or more Permission Tables.

In still another embodiment, the first data of at least one descriptor specifies a memory region storing a portal associated with a particular function or service. The instruction processing pipeline can support a portal-type CALL operation with a pointer argument that refers to the portal. The actions of the portal-type CALL operation process the portal to switch to a different protection domain defined by the portal without switching threads. The portal can include a turf ID that refers to the different protection domain which is used during execution of the particular function or service associated with the portal. The portal can also include address data that refers to the entry address of the particular function or service. The portal can also include state information that is restored to hardware registers for use during execution of the particular function or service. The portal can act as indirect interface mechanism to the execution of the particular function or service.

In one embodiment, for the at least one descriptor that specifies a memory region storing the portal, the second data of such descriptor includes a portal permission. The portal permission of the second data of such descriptor can be processed in conjunction with the execution of the portal-type CALL operation to distinguish the portal-type CALL operation from a normal-type CALL operation.

DETAILED DESCRIPTION OF THE PREFERRED EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

The term "stack" is a region of memory associated with a thread that implements a function or subroutine. When the thread of the function or subroutine executes, it may add a stack frame to the top of the stack by the actions of an explicit or implicit CALL operation; when the function or subroutine exits by executing a RETURN operation, the top stack frame may be removed from the stack.

The term "stacklet" is one segment of a segmented data stack, and its contents are in general visible to load and store ops, at least up to the current top of stack. The stacklet stores stack frames generated by execution of the particular thread executing in the particular turf.

The term "spillet" is one segment of a segmented call stack, which contains call linkages, save state, and transient grant tables. The spillet is generally not visible to load and store operations but is instead manipulated by hardware or trusted system code.

The term "stack frame" is a frame of data pushed onto a stacklet by an executing thread. Each stack frame corresponds to an explicit or implicit CALL operation to a function or subroutine whose execution as not yet terminated by a corresponding RETURN operation.

Figures 1, 2:
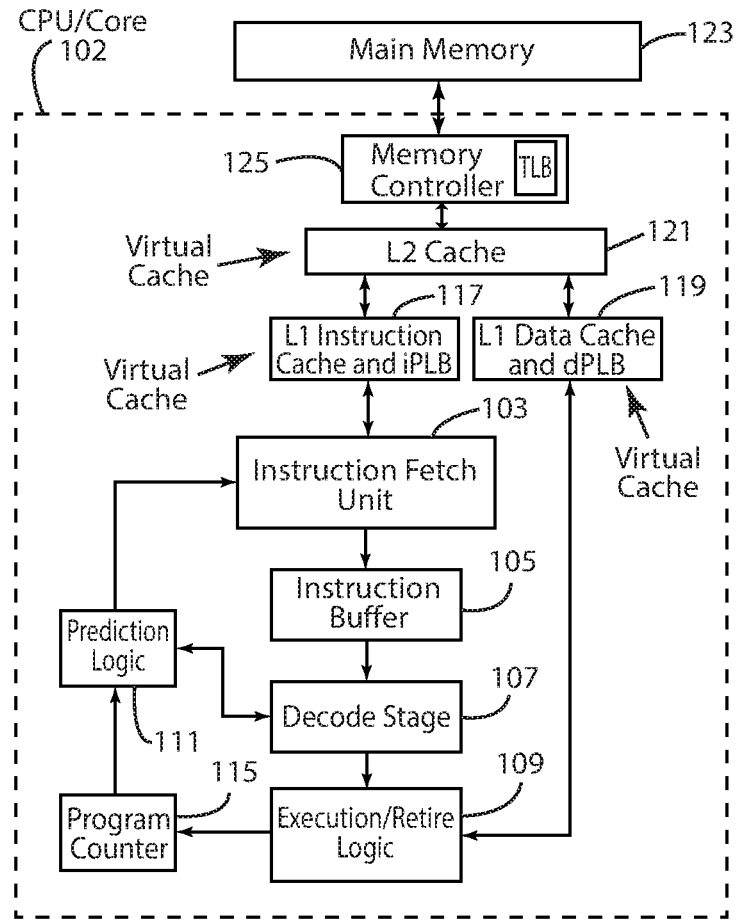
FIG. 1 is a schematic block diagram of a computer processing system according to an embodiment of the present disclosure.
FIG. 2 is a schematic diagram of exemplary pipeline of processing stages that can be embodied by the computer processor of FIG. 1.

In accordance with the present disclosure, a sequence of instructions is stored in a hierarchical memory system and processed by a CPU (or Core) 102 as shown in the exemplary embodiment of FIG. 1. The CPU (or Core) 102 includes a number of instruction processing stages including at least one Instruction Fetch Unit (one shown as 103), at least one Instruction Buffer (one shown as 105), at least one Decode Stage (one shown as 107) and Execution Logic 109 that are arranged in a pipeline manner as shown. The CPU (or Core) 102 also includes Prediction Logic 111, at least one Program Counter (one shown as 115), at least one L1 Instruction Cache (one shown as 117), and an L1 Data Cache 119.

The L1 Instruction Cache 117 and the L1 Data Cache 119 are logically part of the hierarchical memory system. The memory system is organized as a single-address-space system where all program code and data reside and coexist in the same global virtual address space. The L1 Instruction Cache 117 is a cache memory that stores copies of instruction portions stored in the memory system in order to reduce the latency (i.e., the average time) for accessing the instruction portions stored in the memory system. In order to reduce such latency, the L1 Instruction Cache 117 can take advantage of two types of memory localities, including temporal locality (meaning that the same instruction will often be accessed again soon) and spatial locality (meaning that the next memory access for instructions is often very close to the last memory access or recent memory accesses for instructions). The L1 Instruction Cache 117 can be organized as a set-associative cache structure, a fully associative cache structure, or a direct mapped cache structure as is well known in the art. Similarly, the L1 Data Cache 119 is a cache memory that stores copies of operands stored in the memory system in order to reduce the latency (i.e., the average time) for accessing the operands stored in the memory system 101. In order to reduce such latency, the L1 Data Cache 119 can take advantage of two types of memory localities, including temporal locality (meaning that the same operand will often be accessed again soon) and spatial locality (meaning that the next memory access for operands is often very close to the last memory access or recent memory accesses for operands). The L1 Data Cache 119 can be organized as a set-associative cache structure, a fully associative cache structure, or a direct mapped cache structure as is well known in the art.

The hierarchical memory system of the CPU/Core 102 can also include an L2 instruction/data cache 121 as well as main memory 123 as shown in FIG. 1. The caches 117, 119, 121 store tags defined by virtual addresses and thus are virtual caches. The protection model of the system can be enforced by two protection lookaside buffers, one labeled iPLB that can be viewed as part of the L1 Instruction Cache 117 and one labeled dPLB that can be viewed as part of the L1 Data Cache 119. Specifically, the protection lookaside buffer iPLB provides for access control of instructions, restricting the kinds of access and the addresses for instructions that are accessible to the program. The protection lookaside buffer dPLB provides for access control of operand data, restricting the kinds of access and the addresses for operand data that are accessible to the program. Such access control is enforced before program accesses to the corresponding cache are allowed to complete. However, the cache access may be carried out in parallel with the protection checking, which removes protection from the program critical path. A memory controller 125 provides an interface between cache and external main memory 123. The memory controller 125 supports virtual memory with paging where the global virtual address space of the memory system is divided into equal chunks of consecutive memory locations called pages. Pages are dynamically mapped to pages of the physical address space of the main memory 123 through a set of translation tables called page tables. In order to speed up virtual address translation, the memory controller 123 stores current address translations in a separate cache called the translation lookaside buffer (TLB). As noted above, a separate virtual address space or memory access hardware may exist for instructions and data. In this case, the memory controller 123 can include distinct TLBs for each access type, an Instruction Translation Lookaside Buffer (iTLB) and a Data Translation Lookaside Buffer (dTLB). Note that because the cache of the memory hierarchy are virtual caches, the protection function provided by the PLB(s) that are part of the top level cache is split from the virtual-to-physical address mapping function provided by the TLB(s) of the memory controller 123.

In other implementations, a single virtual address space or memory access hardware may exist for instructions and data. In this case, the top level of cache can include a single PLB, and the memory controller 123 can include a single TLB to handle both instructions and data. Other memory hierarchy organizations can also be used.

The Program Counter 115 stores the memory address for a particular instruction and thus indicates where the instruction processing stages are in processing the sequence of instructions. This memory address can be derived from a predicted (or resolved) target address of a control-flow operation (branch or call operation), the saved address in the case of a return operation, or the sum of memory address of the previous instruction and the length of previous instruction. The memory address stored in the Program Counter 115 can be logically partitioned into a number of high-order bits representing a cache line address ($ Cache Line) and a number of low-order bits representing a byte offset within the cache line for the instruction.

The Prediction Logic 111 employs a mechanism to predict the logical chain of instruction portions (e.g., cache lines) that is to be executed by the CPU 102. The prediction of the chain of instruction portions can be generated and stored ahead of the Decode Stage 107. The operation of the Prediction Logic 111 can be used to control prefetch operations that prefetch the cache lines that make up the logical chain of instruction portions. The operation of the Prediction Logic 111 can be used to control fetch operations carried out by the Instruction Fetch Unit 103 that fetch such cache lines from the L1 Instruction Cache 117 into the Instruction Buffer 105. The operation of the Prediction Logic 111 can be used to control read-out operations that read-out the sequence of instructions within the logical chain of instruction portions from the Instruction Buffer 105 to the Decode Stage 107 as well as to control shifting operations that operate on cache lines to isolate each instruction for decoding and follow-on execution. During start-up and mispredict recovery, the logical chain of instruction portions begins at the target memory address stored by the Program Counter 115.

The Instruction Fetch Unit 103, when activated, sends a memory request to the L1 Instruction Cache 117 to fetch a cache line from the L1 Instruction Cache 117 at a specified cache line address ($ Cache Line). This cache line address can be derived from the operation of the Prediction Logic 111. The L1 Instruction Cache 117 services this request (possibly accessing lower levels of the hierarchical memory system if missed in the L1 Instruction Cache 117), and supplies the requested cache line to the Instruction Fetch Unit 103. The Instruction Fetch Unit 103 passes the cache line returned from the L1 Instruction Cache 117 to the Instruction Buffer 105 for storage therein.

The Decode Stage 107 is configured to decode one or more instructions stored in the Instruction Buffer 105. Such decoding generally involves parsing and decoding the bits of the instruction to determine the type of operation(s) encoded by the instruction and generate control signals required for execution of the operation(s) encoded by the instruction by the Execution/Retire Logic 109.

The Execution/Retire Logic 109 utilizes the results of the Decode Stage 107 to execute the operation(s) encoded by the instructions. The Execution/Retire Logic 109 can send a load-type memory request to the L1 Data Cache 119 to load data from the L1 Data Cache 119 at a specified memory address. The L1 Data Cache 119 services this load-type memory request (possibly accessing the lower levels of the hierarchical memory system if missed in the L1 Data Cache 119), and supplies the requested data to the Execution/Retire Logic 109. The Execution/Retire Logic 109 can also send a store-type memory request to the L1 Data Cache 119 to store data into the memory system at a specified address. The L1 Data Cache 119 services this store-type memory request by storing such data at the specified address (which possibly involves overwriting data stored by the L1 Data Cache 119 and lowering the stored data to lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the Instruction Fetch Unit 03 sends a request to the L1 Instruction Cache 117 to fetch a cache line from the L1 Instruction Cache 117 at a specified cache line address ($ Cache Line). The Instruction Fetch Unit 103 passes the cache line returned from the L1 Instruction Cache 117 to the Instruction Buffer 105 for storage therein.

In the decode stage, one or more instructions stored in the Instruction Buffer 105 are decoded by the Decode Stage 107. Such decoding generally involves parsing and decoding the bits of the instruction to determine the type of operation(s) encoded by the instruction and generating control signals required for execution of the operation(s) encoded by the instruction by the Execution/Retire Logic 109.

In the issue stage, one or more operations as decoded by the Decode Stage 107 are issued to the Execution/Retire Logic 109 and begin execution.

In the execute stage, issued operations are executed by the functional units of the Execution/Retire Logic 109 of the CPU/Core 102.

In the retire stage, the results of one or more operations produced by the Execution/Retire Logic 109 are stored by the CPU/Core 102 as transient result operands for use by one or more other operations in subsequent issue/execute cycles.

The Execution/Retire Logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the Execution/Retire logic 109 are controlled by the executing program to accomplish the program aims.

During the execution of an operation by the Execution/Retire Logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

Figure 3:
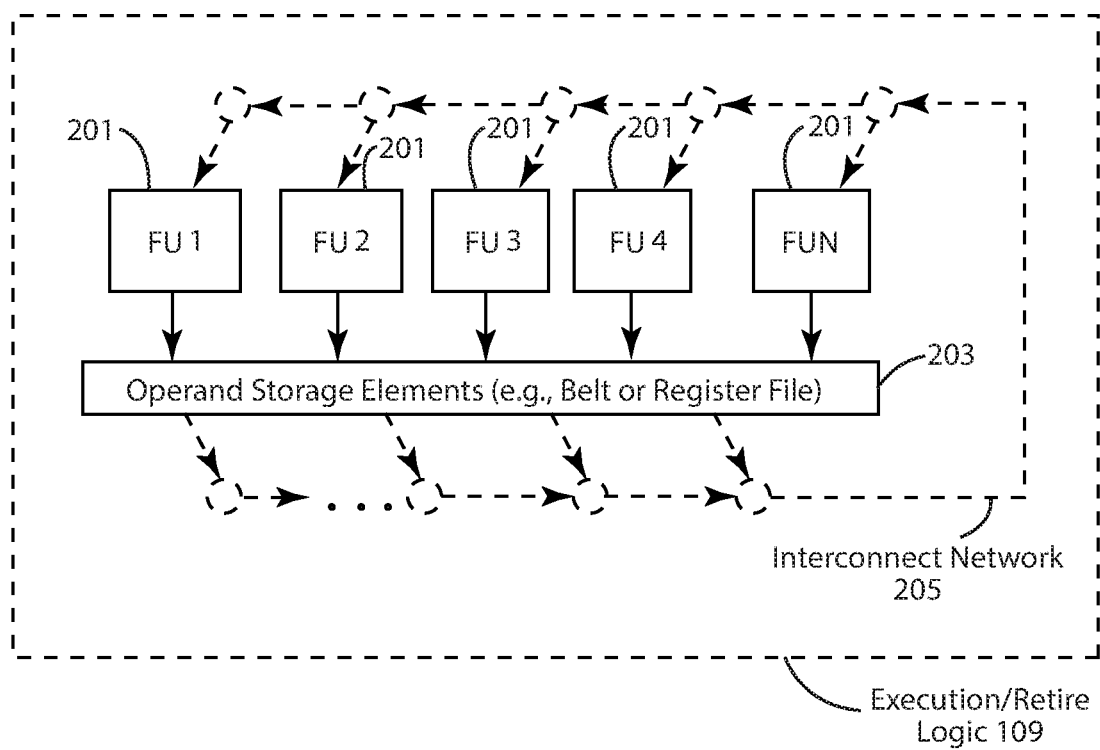
FIG. 3 is schematic illustration of components that can be part of the execution/retire logic of the computer processor of FIG. 1 according to an embodiment of the present disclosure.

FIG. 3 is a schematic diagram illustrating the architecture of an illustrative embodiment of the Execution/Retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

The protection model of the CPU dictates which parts of the virtual address space of the memory system can and cannot be accessed by different parts of program code dynamically as the program code executes on the CPU. The protection model employs permissions that are tied to virtual addresses, or rather address ranges. There are no privileged operation modes or restricted instructions. All access questions are dealt with via access to virtual addresses. An address range is just a start address and an end address, and a permission attached to a range applies to start and end address and everything in between. As for the permissions themselves, the protection model of the CPU supports the classic read and write permissions, as well as the execute permission that has become more and more prevalent in mainstream architectures in recent years. There are more kinds of permissions, of which the portal permission is particularly important, since it enables the transition between different protection domains. But there is also a grant permission, a session permission and possibly more.

The short forms of these permissions are r, w, x, p, g, s.

r or Read permissions are checked on load operations.

w or Write permissions are checked on store operations.

x or Execute permissions are checked on every instruction load initiated by the CPU, whether from normal sequential execution or from execution transfer operations like branch operations, call operations, and return operations.

p or Portal permissions are checked only on call operations.

g or Grant permissions are checked on persist operations.

s or Session permissions are checked on session operations.

Checking permissions in this context means checking whether the current protection domain has the required permission flags set for the required address within one of the ranges in this protection domain. That's what a protection domain is in general: a collection of permissions for different resources. Since all permissions are tied to address ranges, a protection domain or turf is an identifier with a collection of address ranges with permissions attached to it. Permissions are attached to a protection domain (turf) by the grant operation, which has three basis components:

1. an address range
2. different permission flags
3. the protection domain (turf) this applies to These three components don't necessarily need to be explicitly stored together in one data structure. In different hardware contexts either one or both, the permission flags and the protection domain, are often implicitly defined by the memory location or register an address range is stored in. Also note that some grant operations include additional data fields as described herein.

The granting and revoking of permissions by program code segments (threads) can be regulated by the permissions that the thread already has. For example, if a thread has read or write permissions to an address range, the thread can pass on the read or write permissions respectively on this range to another thread or can choose to pass on the read or write permission for a part (subrange) on this range. With this context, an initial all-grant provided by the hardware at power-up can be broken down hierarchically into ever smaller grants via delegation. The all-grant is a special permission setup on boot. It covers the whole address space and gives read and write permissions to the initial turf. The grant and session permissions only become applicable when two threads exist and communicate with each other. The initial boot code must have execute permissions too, and for this reason an initial execute grant exists in addition to the all-grant.

The CPU can support two different kinds of grant operations, transient grants and persistent grants. Transient grants are temporary, and are created for the purpose of a single transaction between two different protection domains, between two different turfs. Immediately after the transaction for which they were created completes, the transient permissions are revoked again, automatically, when the stack frame that they are granted for is exited. Persistent grants are attached to turfs, and once they are granted they tend to persist for the remainder of the life time of the turf. Some tasks, like the unloading of libraries, can of course remove persistent permissions again, but it is a comparatively rare occurrence, and it has to be done explicitly. Persistent grants can only be created by either directly accessing the permission data structures in privileged applications, or by creating them from a transient grant via a handshake. Transient grants, and only transient grants, can have the grant permission in addition to other flags. A grantee of such a transient grant can create persistent permissions from the transient permission for its own turf, or on a subrange or a subset of the rights. The grant right itself of course cannot be passed on. It is possible without further restriction to create new transient grants from the persistent grants that a thread has, or to pass on transient grants to other threads.

In the single-address-space system of the memory system, all program code (applications) resides and coexists in the same global virtual address space. It is still a virtual address space, in that it maps the all possible addresses used by the program code to available physical memory. Addresses can be freely shared between different program code, requiring no expensive remapping. And while there is still a single virtual address space to map to physical memory, shared by all program code, this has no protection domain semantics. Furthermore, memory address translation (from the virtual address space to the physical memory address space) is about resource utilization, and doesn't need to happen on every memory access. Specifically, such memory address translation is only needed when loads miss in cache or cache lines are evicted and there is actual access to physical memory. This represents a decoupling of access checks and memory address translation. Such decoupling allows for the permissions/turfs as explained above to be applied at byte granularity (where the address range(s) of the turfs have byte granularity), while memory address translation is carried out at the physical page granularity. Furthermore, the access checking can be carried out in a far bigger extent than pages, before any translation takes place.

A turf is uniquely identified by a key, the turfID. In one embodiment, the size of the turfID can be configurable to be in the range of 20 to 32 bits. Address range permissions (also referred to herein as region descriptors and associated permissions) are attached to the turfID, and thus it serves to identify as a protection domain. Note that such a protection domain provides for protection without isolating applications into different address spaces. Thus, read only data and code can be shared between different program code in the single-address-space system and all program code uses the same addresses to access them. This is in contrast to multiple address space systems, where most code and read only data must go through an expensive relocation step to fit them into the application address space.

In addition to assigning grants to turfs with the turfID, the turfID can be used to efficiently perform simple address mappings to support the copying of address ranges without invalidating pointers in those address ranges. This is necessary to implement fork( ) in a single address space system. The single global address space can be accessed as many different local spaces. To implement this distinction, addresses can be absolute global addresses where the same bit pattern always points to the same location in the single global address space for every turf. Or they can be local addresses, where the same bit pattern points to the same relative location within the mapping of a turf. These different kinds of addresses form one global and many local address spaces. These local spaces are not fully fledged virtual address spaces like in a multiple address space system. They are rather a simple mapping on top of the single global virtual address space. All grants are defined in the global address space, and permissions are checked using global addresses. The main reason local and global addresses exist, as mentioned, is to make forking possible, to easily be able to copy the memory from a local address space into a different location in the global address space as a different local space, and still have contained pointers point to the same relative locations within the new local space. And as long as the program code only uses local pointers, this is possible.

Global and local addresses can be distinguished by the highest order bit 63 (or L bit) in a 64-bit virtual memory address as shown in Table A below:

TABLE A

| L | Res | Address |
|---|-----|---------|
| x | xxx | xxxxxxxxxxxxxxxxxxxxxxxxxxxxxxxxxxxxxxxxxxxxxxxxxxxxxxxxxxxx |

When the L-bit is set, it is a local address and the global address can be derived by the XOR of the local address and a base address derived from the turfID, called turfIDMask, as follows:

Global Address=Local Address XOR turfIDMask

When the L-bit is cleared, it is a global address and the local address can be derived by the XOR of the global address and the turfIDMask as follows:

Local Address=Global Address XOR turfIDMask

This arrangement segments to local address spaces in power of two sized chunks of consecutively addressable memory. These segments are called plots. The minimum plot size can be a multiple of the page size. The turfIDMask is obtained by shifting the turfID left to reflect the minimum plot size. That is, turfIDs can be seen as being indexes into an array of plots in memory, and the turfIDMask is the byte address of the particular indexed plot. When the highest order bit is zero, nothing else needs to be done. In this case, the bit pattern is the global address. When it is one, the turfIDMask needs to be applied. An example using C operators follow:

turfID=0x12345678, leftShift=20
turfIDMask=0x12345678<<20|1<<63=
   0x8001234567800000
globalAddress=0x0123456701234567
localAddress=0x0123456701234567
   ^0x8001234567800000=0x8122662266A34567
0x8122662266^0x8001234567800000=
   0x0123456701234567=globalAddress A consequence of this is that local address spaces consist of power of two-sized plots and the lowest set bit of the turfID determines the maximum plot size of the local address space of a turf, i.e. all the bits lower than the lowest set bit of the mask comprise the offset into the plot segment. The number of bits in the turfID and the left shift define the minimum and maximum plot size are a member dependent machine configuration. Note that one distinguished plot, called the home plot of the turf, has local address zero, and necessarily the global address equal to the turfIDMask. A turf doesn't even have to use any local addresses at all, but as long as a turf needs to be able to be forked, it will have to.

Note that all addresses in the virtual address space can point to the same location for all turfs and the local address space each of them defines. This does not mean a turf gets to allocate or reserve all of the addresses of the virtual address space (e.g., 64 ZB of a 60 bit address space). Instead, the virtual address space must be reserved and allocated before it can be used. Specifically, the global space and all local spaces are divided up by the hardware and the OS and appointed to use for different turfs according to all kinds of criteria. This is reservation, but reserved address space is still not accessible by the turf, for that there must exist permission for them to actually use it. Only with permissions does the address space become usable for the turf and is allocated. And even allocated memory doesn't initially take any space in the caches or physical memory due to backless memory mechanisms as described in U.S. patent application Ser. No. 15/515,058, filed on Oct. 15, 2014, commonly assigned to the assignee of the present application and herein incorporated by reference in its entirety.

Due to the way local addresses are constructed from global addresses, by XORing with a left shifted turfID, local spaces have several interesting properties as follows:
  The turfID bitmask implicitly defines a home plot in the global address space for every possible turf. This home plot resides in the global address space where the local address, consisting of the global address XORed with turfIDMask, would be zero. One implication of this is: turfs with smaller maximum plot sizes are more numerous than turfs with larger maximal plot sizes
  There is one turf, with a turf ID all zero but the highest ID bit, which has the largest regular plot size there is one turf, with a turf ID of zero, whose plot size is all of memory and whose home plot is located at global address zero turfs with larger home plots overlay spaces that could have been used for multiple turfs with smaller plot sizes home plots must reside in a dedicated section the global address space The minimum and maximum plot size, and with it the number of available turfIDs, can be tuned to fit the work profiles and resource requirements of specific processors, which results in different bitmask lengths of the turfID, which should generally be between 20 and 32 bits.

There can be quite a bit of administrative data associated with turfs, and the CPU hardware must be able to find this data quickly without having to consult software. For this reason, the CPU hardware can maintain a turflet array. The turflet array can be located at a predefined address in the global address space. This predefined address can be read from the turfletsReg special register. The turflets array has as many entries as there are possible turfIDs, and each entry has a predefined power of two size. The entries of the turflet array (turflets) correspond to the different turfs and can contain pointers to event handlers, permission search trees, resource limits and other things. Zero can be a meaningful default for the data contained in the turflet array. In one embodiment, a turf almost never has read or write access to its corresponding turflet or any other turflet corresponding to other turfs.

A turf is set of address range permissions attached to a turfID. While turfs isolate the permission sets on memory regions, threads isolate the control flow of program code working with those memory regions. In other words, a thread is a contained flow of execution. A turf can be associated with a particular thread during execution of the thread. In this sense, the particular thread executes within the turf and the address range permissions that belong to the turf are used during execution of the particular thread to dictate which parts of the virtual address space of the memory system can and cannot be accessed by the execution of the particular thread. Like a turf, each thread is identifiable by a unique key referred to as a threadID. Unlike turfs, there are no additional semantics attached to the threadIDs. In one embodiment, the size of the threadID can be configurable to be in the range of 20 to 32 bits. The threadID of the currently executing thread can be kept in threadReg special register. The turfID of the turf associated with the currently executing thread can be kept in the turfReg special register. When the threadReg register is set to X and the turfReg register is set to Y, it is said that thread X is (running) in turf Y. When thread X isn't currently executing, it is said thread X is parked in turf Y, where turf Y will be the current turf for thread X if it is reactivated.

In one embodiment, a new thread can be created with a dedicated spawn operation as follows:

threadID spawn(void* target, args argv)

The target argument is a code address to start execution at. The args and argv arguments are function arguments as for any normal function call. The spawn operation returns a threadID for the newly created thread. The spawn operation allocates a new hardware threadID and sets up the hardware data structures to manage the newly created threads, called a spillet. The new thread is parked in the current turf to execute at the given target address with the given arguments in the new thread context later. The arguments are passed using the same mechanism calls use to pass arguments. It returns the newly created threadID. How exactly hardware threadID generation is implemented can vary. It can be incrementing counters with reuse buffers, it can be fully randomized, it even can be implemented as an abstract operation, i.e. as a function. Since there are no restricted operations, runaway thread creation could be a problem. Fortunately, this can be caught by the memory allocation interrupts when spillets are evicted from the caches.

For transferring control to a thread without creating a new one there is the dispatch operation:

void dispatch(threadID next)

The dispatch operation takes one argument, the threadID to next transfer to. It will park the current thread in the current turf and transfer control to the next thread, starting it for the first time or restarting it. In parking the current thread, the thread context of the current thread can be saved in a special hardware managed memory region. The data that comprises a thread context can vary by design. In one embodiment, it can contain the contents of the operand storage (e.g., belt, scratchpad), all task saved special registers like the stack pointer, the code pointers etc. The operation can raise a fault if the next thread is not parked in the same turf as the current thread.

The hardware resources used for threads (including special memory regions and threadIDs) can be reclaimed by the following operations:

void suicide(threadID next)
bool fratricide(threadID id)

The suicide operation essentially works like dispatch, but instead of saving the current thread state, it clears it and reclaims everything. The fratricide operation only works in threads currently parked in the same turf. It simply reclaims all hardware resources allocated for the thread. It will do nothing and return false if the thread is currently running, as recognized by the flag set by dispatch.

Note that whenever any of the above operations with a next ThreadID parameter fault, the fault handler must schedule a new thread. If the application handler does not resolve the fault, the fault cascades to the system fault handlers, which ultimately will result in a thread chosen by the operating system if no earlier fault handler catches it.

The CPU can maintain separate data and call stacks. This separation makes physically impossible most of the common stack overflow exploits that are so prevalent on current hardware, because the call stack, and the return and other pointers in it are not available to application code. Both data and call stacks are bound to threads and turfs and are segmented, so they can grow practically without limit. The CPU can also employ a dedicated hardware module referred to as the spiller that operates at the center of stack management. The spiller can manage the call stacks directly, from dedicated memory regions, which are never directly accessible by the application that uses them.

Figure 16:
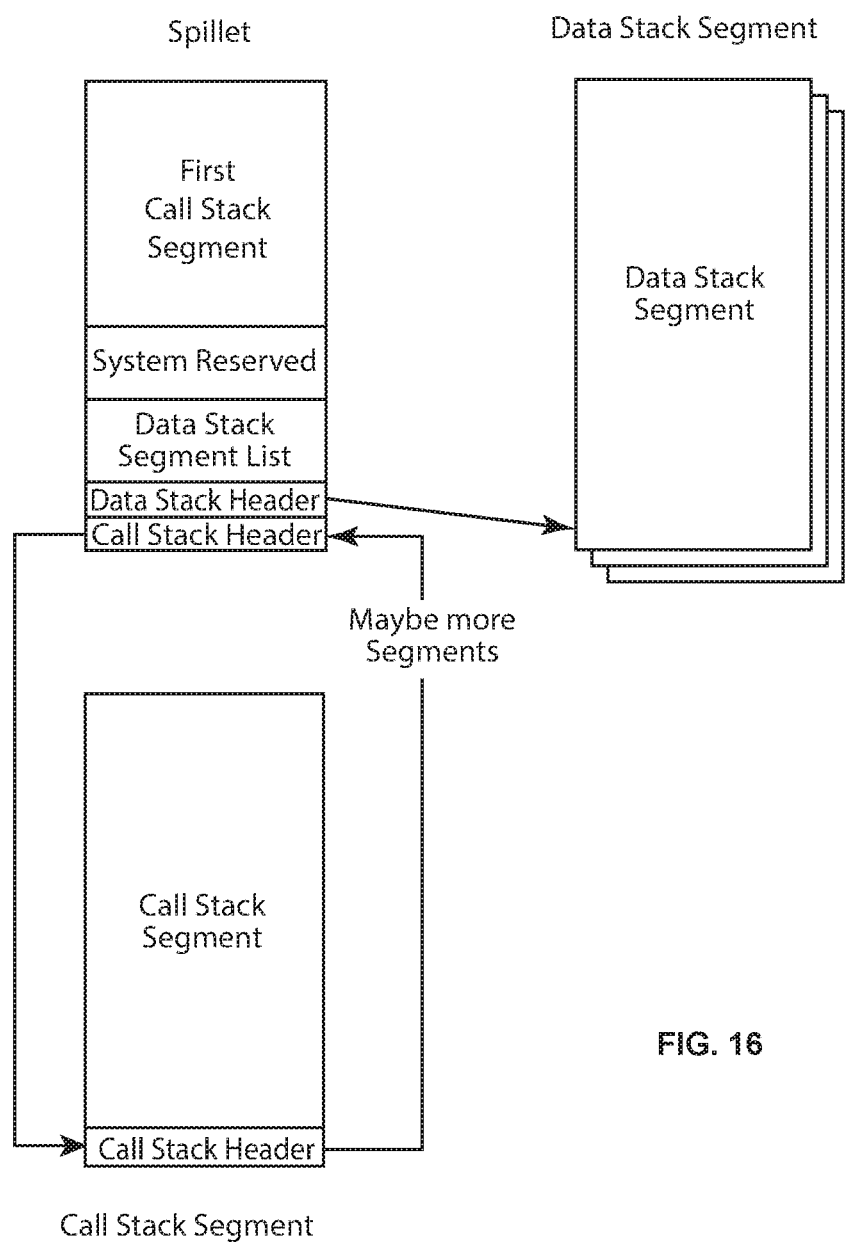
FIG. 16 is a schematic diagram of a spillet and corresponding data stack segment (or stacklet) and call stack segment.

In one embodiment, the spiller employs a dedicated memory region referred to as the spillet array for managing the calls stacks. Like the turflets array, the spillet array is an array in global address space with easily computed entry addresses. The spillet array is two dimensional and the dimensions are the threadID and turfID. The entries of the spillet array, which are referred to herein as spillets, each have a convenient power of two size, and compared to turflets is larger (for example, a whole 4 kB page or even more). A spillet and corresponding data stack segment (or stacklet) and call stack segment are shown in FIG. 16. The internal organization of the spillet can be varied by design, but it contains the stack headers for both the call and data stacks, handles for transient permissions, and the data to park and resume threads. It can also contain reserved space for operating system defined use. The spillet can also store the first call stack segment, making it unnecessary to allocate memory via software for portal call or thread transitions. This feature can reduce the time for thread and portal call switches. More call stack segments can be added, each containing a call stack segment header, like the spillet array entry itself, but not all the other data. These call stack segments form a linked ring list with the headers containing the pointers. The header pointing to the currently in use call stack segment is always written in the spillet, so the hardware always knows where to find the current call stack top. Like for the turf headers, a fully zeroed entry is a meaningful initialization, in this case indicating an unused spillet array entry. Note that while the space for spillets is reserved in the address space, there is no associated physical space or DRAM for unused spillets. Thus only the spillets actually in use by some thread running in some turf ever occupy memory. While the amount of the virtual address space reserved for spillets is large, it is dwarfed by the size of the overall 60-bit virtual space. The base of the spillet array is also a predefined address. For example, it can be the same address from the turfletsReg register where the turflet array extends downward and the spillet array extends upward.

In contrast to the call stacks, the data stacks often, but not always, have to be fully accessible to the application turf. At least the current data stack frame must be accessible to the running application. The operand storage (e.g., belt and scratchpad) of the CPU can reduce the need for actual data stack severely and often it is not needed at all. For this reason, data stack segments are only allocated when they are really needed, when the stackf( ) operation is called for the first time in a thread in a turf. This triggers a stack overflow trap, and the handler allocates the data stacks according to the application needs, with the growth behavior it needs. The data stack header has a header that holds the administration data for the data stack such as the stack pointer and frame pointer into the current segment. The header is stored at a defined location in the corresponding spillet array entry for fast access. Additionally, because unlike for the call stack the segment headers can't be stored in the segment itself here, there is a sorted array to the potentially many data stack segments. These segments are allocated at size alignment, and don't need to be all the same size, the stack allocation handler can implement any sizing strategy.

Figure 17:
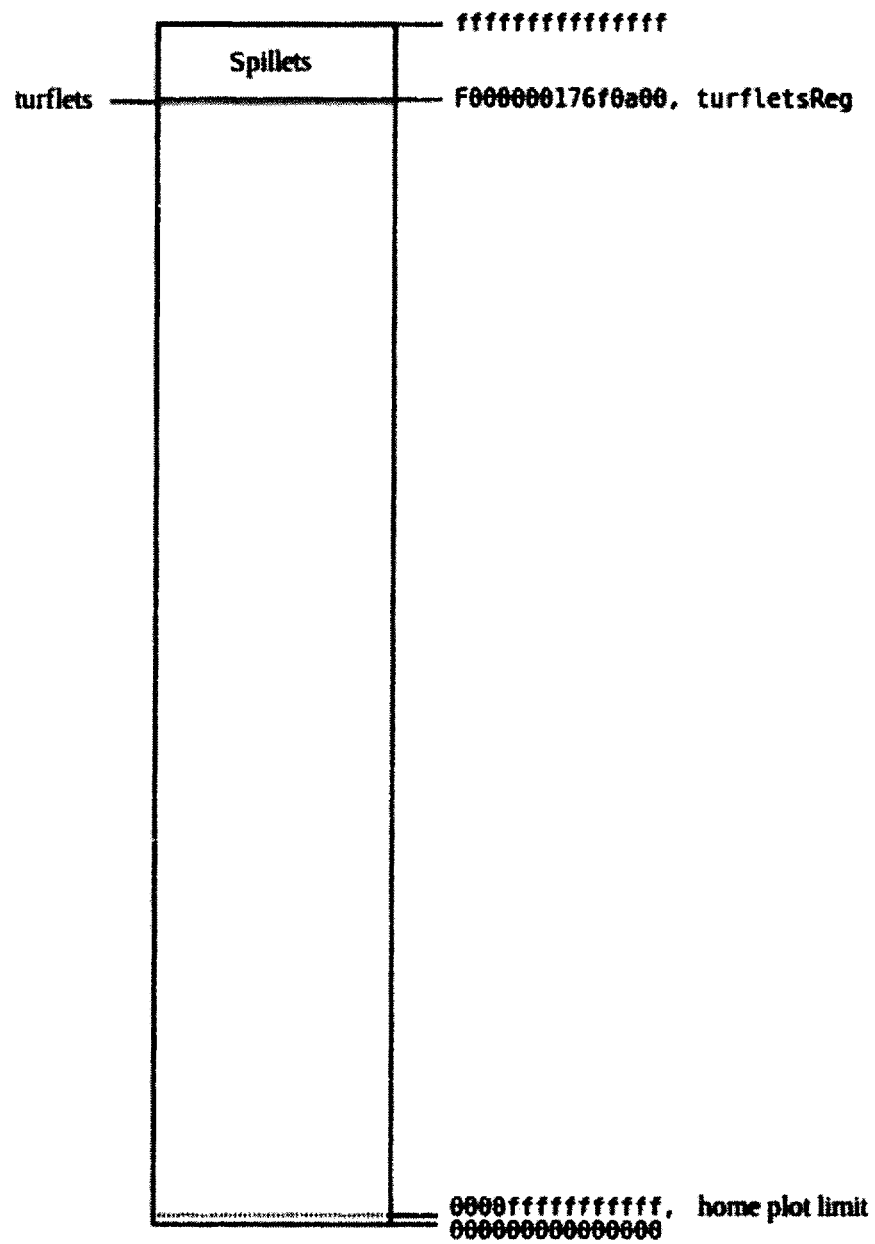
FIG. 17 is a schematic diagram of a global virtual address space using an example configuration.

FIG. 17 shows the global address space using an example configuration with 24 bit turfIDs, 20 bit threadIDs, 1 MB minimum plot size, and additionally 4 kB turflet and spillet size.

Figure 18:
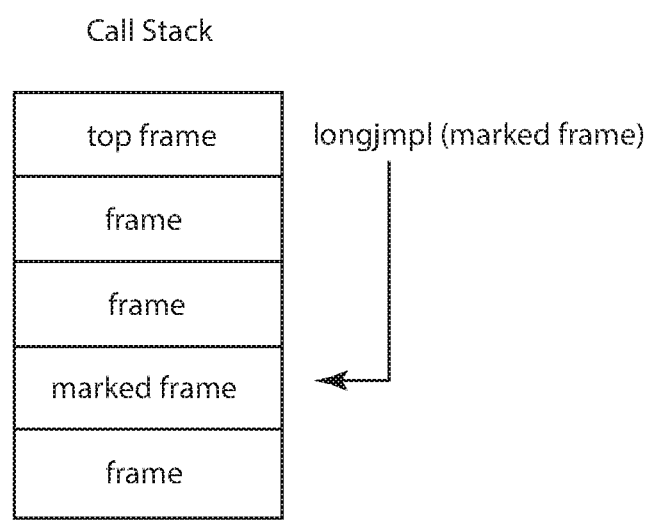
FIG. 18 is a schematic diagram of a call stack on which a longjmpl operation is executed.

Since the control stacks are hidden from application access and are fully managed by hardware, any control scheme that is commonly implemented by explicit stack manipulation can be implemented as machine operations on the CPU. One such control scheme is the long jump pattern well known from the C standard library. The operations are:
handle setjmpl( )
op longjmpl(handle target, op value)
These very much resemble the C functions. Handle is an opaque 8-byte structure that identifies the saved stack and execution state internally for the spiller. longjmpl has a return value because it needs to make it available on the belt for the code to continue. It can of course only be called from places that are down the call stack from where the setjmpl has been called, and it will fault if the handle is illegal. It will also fault if the handle was created in a different turf. The mechanisms employed to implement these operations can be the same that are implemented to facilitate normal calls and returns and dispatch. More specifically, the setjmpl operation creates exactly the same data structures in the call stack in spiller space that the dispatch operation would create, or a call would create to save the caller frame. It saves the current frame, creates a new frame by copying the current one. And then it drops the current frame index of the current stack as a handle into the new frame and transfers control there. The spiller also saves the state of the operand storage (e.g., belt), the instruction pointers and all other call saved special registers. Note that the turf and thread are implicit from the spillet address. Each call frame has a very regular defined layout and size as it is completely hardware managed. The longjmpl operation implements what would be the second part of the dispatch or the return operation, reinstating the execution context from the call stack, acting as a kind of multi-level return. FIG. 18 shows a continuous logical view, i.e. without taking stack segments into account, of a call stack on which a longjmpl operation is executed.

A single thread can be active in different turfs, at different times, depending on the requirements of the application and the protection requirements of the different components. Portals allows for threads to cross turf boundaries. Portals bring threads and turfs together in the conceptual, but also the very literal way: A portal is a data structure that consists of:
  target memory address to transfer thread control next to
  a portal permission on the location the target memory address is stored in memory, the permission with a TurfID for the new context of the thread
In memory a portal is just a pointer to an entry point. It can be a single pointer with a single portal grant on that one pointer address. It can also be a whole array of entry points with a portal grant spanning all of it. Such a portal array can be the definition of the full API of a service library. Such services, in isolated turfs, potentially with privileges on important address ranges, but without needing a primary thread, can be an important security feature. Active applications with running threads can call into services though published portals and have tasks performed for them safely and with minimal overhead. The most prominent example of a service would be a kernel that implements system calls through portals.

Portals are invoked with a normal call operation to the portal's address and are referred to as portal-type call operations herein. The portal-type call operation includes the following steps:
1. The memory access check on the called address reveals a portal permission.
2. The TurfID is retrieved from the permission and placed into turfReg.
3. The target memory address is retrieved from the called location.
4. A memory access check is performed on this target memory address for x or p
5. If target address has an execute permission, control is transferred there with the passed arguments (for example on a new belt) of the new frame.
6. If it has a portal permission again, the steps 2-5 are repeated, but only once.

Often the caller of the portal doesn't even need to be aware it is a portal. It calls the address the portal is stored in like any other address. Applications control the creation of portals into their turf, but if everyone could pass through, there wouldn't be much safety involved in portals. This is why the portal permission exists. The addition of step six, the potential one time repeat of the portal call steps, serves as a means to allow multiple services to be presented as one defined API to applications and to possibly swap them out at runtime even without the applications being aware. The limit of one step prevents circular portal structures and a never-ending attempt by the hardware to find actual code. If a location with execute permission is not found by the second iteration, then the caller is faulted with invalidAddressFault.

A transient grant operation is tied to a particular portal-type call operation. While communicating through a portal-type call operation is a function call in the hardware implementation, semantically it is a transaction: a single exchange of information between two isolated and possibly distrustful parties. In general, the caller is the client and the callee is the server, and the set of calls offered by the server to clients is a service. In an ordinary function call, the caller may pass arguments to the callee, and the callee may return results, but in addition caller and callee share much other state: global data, heap contents, and even data internal to other functions lower in the stack. Both caller and callee accept this arrangement because they trust each other; the call is a convenient and clean way to cause an action to be performed, but has no protection or security aspect.

A portal-type call operation can provide the convenience of a call-like interchange between client and server, except that the parties share only the arguments and results of the call. The arguments and results form the entirety of the interchange; neither party can see or modify any other state of the other. This isolation is typical of inter-process communication (IPC) of other systems. IPC does provide isolation, typically using the page mapping hardware for the purpose, but it usually is large-granularity, inconvenient, and slow. While conventional IPC is possible on the CPU, the CPU can provide portal-type call operations as a much lighter weight alternative. In conventional IPC each party is a process, a notion that combines a protection domain, some data reachable from that domain, and one or more threads of control, all wrapped up together. On the CPU, these notions are distinct: the protection domain is a turf, which may or may not have either data or threads associated with it. With IPC a client thread physically passes argument data (usually pages) to a server process, where a server thread then uses the data arguments and the data of its own process to produce some result, which is then sent back to the client. Finally, a client thread examines the results and continues execution. In contrast, on the CPU, when a client thread calls a portal via a portal-type call operation, the protection domain that the thread is running in changes from that of the client turf to that of the server turf. In effect, the former client thread becomes a server thread, temporarily, and remains one until it returns from the call. At that point, it doffs the server disguise, reenters the client turf, and becomes again a client thread. However, in its brief incarnation as a server thread, it had full access to the server data and state, because it was, as a server thread, running in the server turf. In addition, it had access to the arguments to the call, and was able to use those arguments and the server state to perform the service requested by the call. While a server thread, it has no access to any client state except the arguments. The temporary server thread will return from the portal-type call operation after producing the desired results. The return carries the results back, but no other server state, and the thread, now properly a client thread, can continue executing with those results.

A portal-type call operation can carry arguments and returns results, and in machine terms it uses much the same calling convention that is used for normal calls. As on many machines, the CPU can possibly use several different mechanisms for passing arguments and results (such as passing on operand storage such as the belt, in registers, in memory, and by reference.

When passing arguments on the belt or in registers, the arguments of the portal-type call operation have exactly the same meaning and use as they have for normal calls. The belt positions or registers are filled with small operand values, in belt order. An argument that is too big to fit in the hardware operands is passed in memory instead. The maximal size for belt or register arguments can be predefined, but all widths of single scalars may be passed by the belt or registers. The belt is of limited fixed size, and the registers are of limited fixed number, so the call may need to pass more belt/register arguments than there are places to put them in; excess arguments are passed in memory instead. By the nature of the belt and registers, all belt/register arguments (and results) are passed-by-copy. The server receives the value of the argument; it does not receive any right to view or modify the source of that value. Similarly, the client receives the value of the result, not the right to view or modify the source of that result.

Arguments that are too big or too numerous are passed in memory, as are variadic arguments (VARARGS or ellipsis arguments, as defined in various languages). In one embodiment, the CPU can use a common protocol for memory arguments to both normal and portal-type call operations. This protocol defines input and output regions of the data stack, where the caller places the arguments in its output region, but after the call the callee sees the same arguments in its input region. The effect of this protocol in a call is that both callee and caller can see and/or modify a memory argument independently and concurrently during the call. Of course, the caller itself is quiescent during the call, but some other thread in the same turf as the caller and running in a different can inspect and modify the arguments while the callee is running in a different core or pre-empted. This concurrent visibility is harmless when caller and callee are trusting, as in a normal call. In a portal-type call operation between a distrustful client and server, the concurrent visibility is unfortunate and potentially exploitable. To avoid problems, all arguments passed in memory for any reason are automatically copied within the server to buffer space that is not visible to the client, before other access. From the view of the called function the access to the passed arguments is the same, and a function may transparently be called either via a portal or via a normal call. However, because arguments are shared in a normal call but unshared in a portal-type call operation, it is possible to write client code that can tell the difference and behaves differently depending on which was used. Such client code necessarily involves concurrent access to the stack locations occupied by the arguments, which is unlikely ever to be needed for client functionality. If concurrent access to memory arguments is ever in fact necessary, then the call signature of the function must be changed to make explicit that the relevant argument is being passed by reference, rather than passed-by-observable-value.

In one embodiment, the CPU can support two protocols for pass-by-reference arguments of portal-type call operations: address-based, and index-based. In the address-based protocol, the server receives the actual memory addresses of the arguments, and can use those addresses as ordinary pointers to access the argument data. Code using the address-based protocol for pass-by-reference arguments looks much like code not using a portal, and existing code can be converted into an address-based server with minimal rewrite. However, some software and organizations define their security policy to not only protect the data but also to hide the actual location of the data in memory. Such a policy cannot use the address-based protocol, because the address-based protocol exposes client addresses to the server. Instead, the policy must use the index-based protocol. In the indexed-based protocol, the pass-by-reference arguments are accessed by getter and setter operations that view the grants received by a server as a two-dimensional array, where the first dimension is the ordinal number of the accessed grant, and the second is a byte index into the data covered by that grant. Because they differ in the manner of access, the operations of the address-based protocol differ from those of the index-based protocol. Any given portal-type call operation may use either protocol, or even both in a single call. However, client and server must agree on the protocol for each argument; a client passing an address-based argument where the server expects an indexed-based one will not work, nor vice versa. Thus the choice of protocol is part of the definition of the API as exported by the server. Note that these protocols are only relevant when arguments are passed by reference. A portal-type call operation that gets all its arguments by value, whether from operand storage (e.g. the belt) or from memory, can ignore the distinction.

Arguments passed by reference are not copied, but are shared between callee/client and caller/server concurrently throughout the duration of the call. A common idiom is for the caller to allocate a buffer in memory and pass it to the callee to be filled with data. In some cases, pass-by-reference is used only to avoid copy overhead, and the sharing is incidental. In other cases, the sharing is requisite and both parties witness the evolution of the argument data concurrently and coordinate among themselves the sharing aspects. Code that cares about the security risks inherent in sharing between untrusted parties may avoid the sharing inherent in pass-by-reference arguments by altering the function signature to use pass-by-value instead. With such a change, the buffer in the idiom example would be passed using the in-memory protocol described above, being copied from caller to callee for use during the call, and copied back to the caller at return, transparently.

Permission checks are an extremely common occurrence and they exhibit high locality for caching. Thus, the CPU can employ three levels at which permissions are checked in the following order:
 1. Well Known Regions (WKR)
 2. Protection Lookaside Buffers (PLB)
 3. Permission Tables (PT)
For better understanding the description will be in a different order.

The Permission Tables store permissions that are granted by executing one of several hardware operations depending on the permission to be granted and the context of the grant. The effect of a grant is to record the permission in one of several data structures in memory, collectively called the Permission Tables. The Permission Tables can be searchable by hardware, using search criteria that vary with the type of grant held by the table. The organization of the Permission Tables, the search algorithm used and whether access is by hardware or by trap and software can vary by design. In general, any code with read/write access to the Permission Tables is by definition trusted code, and will typically be part of the operating system kernel or a trusted service affiliated with the kernel. The Permission Tables can be organized into two groups, the Persistent Permission Tables and the Transient Permission Tables. The permissions specified by a persistent grant operation stays in its Persistent Permission Table until explicitly removed. The permissions of a transient grant operation that is associated with a particular portal-type call operation are automatically revoked and removed from its Transient Permission Table when that call returns.

There can be two Persistent Permission Tables associated with each turf, one for storing read and write permission and one for storing execute and portal permissions. This split into read/write and execute/portal stems from the way the address ranges are defined and searched for the two categories, and the different additional data required. The two Persistent Permission Tables themselves may be located anywhere, but the addresses of the bases of the tables are held in the turf header where it is accessible to hardware. These tables are allocated by the software that creates the turf. The tables may have pre-allocated space, or be lazily allocated on overflow, as determined by software policy. While running in a turf, the base address of the Persistent Permission Tables of that turf is held in the rwTableReg and xpTableReg registers.

Read-Write permission ranges in a grant can cover the whole address space (e.g., 60 bit address space) with byte granularity, and different ranges can overlap in a protection domain. For this reason, the Read-Write Persistent Permission Table can be organized as set of interval trees where the read-write permissions are stored in and looked up from the set of interval trees. There are a number of well-known algorithms for interval trees than can be used. The contents of a read-write permission of the Read-Write Persistent Permission Table include:
 1. The address range covered
 2. The rights conveyed (r or w or both)
 3. The grantee, a turf ID
 4. The re-grant right (g)

Execute and Portal permission ranges don't have byte granularity. The smallest possible portal is a single pointer, so the granularity is eight bytes at the least. It is not possible for any pair of entries to cover overlapping ranges. For this reason, the Execute-Portal Persistent Permission Table may be organized as a binary tree. The contents of an execute permission of the Execute-Portal Persistent Permission Table include:
 1. The address range covered
 2. The rights conveyed (x)
 3. The grantee, a turf ID
 4. The re-grant right (g)
 5. The dWKR, discussed later
 6. The rWKR, discussed later
 7. The tLibIndex, discussed later
The contents of a portal permission of the Execute-Portal Persistent Permission Table include: include:
 1. The address range covered
 2. The rights conveyed (p)
 3. The grantee, a turf ID
 4. The re-grant right (g)
 5. The target turf, a turf ID The Transient Permission Tables are associated with particular portal-type call operations, from slightly before the portal-type call is made until when the portal-type call returns. Because portal-type call operations may be active in many threads, and portal-type call operations may nest even within a single thread, there are many Transient Permission Tables at any one time, and new ones are continually being created and destroyed. The organization and structure of a Transient Permission Table can vary by design. However, a representative simple organization is for each Transient Permission Table to be an array of granted permissions located in the spillet stack of the thread at or near to the frame holding the state for the corresponding call, and discussion herein will assume such an organization. Because the granted permissions in several different Transient Permission Tables may be applicable simultaneously, all the Transient Permission Tables for calls by a particular thread to a service in a particular turf are linked on a list, with the head of the list held in the spillet header and in the transTableReg special register of the CPU.

Protection lookaside buffers, or PLBs, are the central hardware modules around which the CPU permission checking revolves. They are a cache over the various Permission Tables. Each time a grant is made by executing a hardware grant operation, the corresponding entry is pushed into the appropriate PLB as well as being entered in its Permission Table. The PLBs are pure caches; it is not possible to modify an entry in a PLB, only to replace it with a different entry. The eviction policy, structure, and size in number of entries can vary by design. One example is a fully-associative cache of some four, eight or sixteen entries. The content of a PLB entry may differ from the corresponding table entry; in particular, PLB entries will lack the data supporting the search structures in memory, such as inter-node tree links.

There are two PLBs: one for the instruction and control flow, the instruction PLB, or iPLB, and another for loads and stores, for data access, the dPLB. The PLBs essentially are small key-value lookup tables. Lookup is by address and ID, and the keys are the address ranges of the entries and the protection domain, i.e. either a turfID or a transactionID. All PLB entries can contain a transience flag t, which is set if the entry derives from a Transient Permission Table and cleared if it derives from a persistent table. The interpretation of the g flag in an entry is influenced by the setting of the t flag, only when the t flag is set, the g flag is relevant.

The dPLB holds read-write (rw) permissions and is accessed to check the validity of load and store operations when the target address is derived from a pointer. It caches the contents of the read-write Persistent Permission Tables, and the equivalent entries from the Transient Permission Tables. Data permission ranges can cover the whole global address space and be at byte granularity. This means the range key consists of two 60 bit addresses, and lookup is a range comparison against the address and an equality comparison against the grantee. The contents of a dPLB entry include:

1. The address range covered
2. The rights conveyed (r or w or both)
3. The grantee, a turf ID
4. The re-grant right (g)
5. The transience flag (t)

The iPLB holds execute-portal (xp) grants and is accessed to check the validity of control flow transfer operations such as branch, call, and return operations when the target address is derived from a pointer. It caches the contents of the execute-portal Persistent Permission Tables, and the equivalent entries from the Transient Permission Tables. The contents of an execute iPLB entry include:

1. The address range covered
2. The rights conveyed (x)
3. The grantee, a turf ID
4. The re-grant right (g)
5. The dWKR, discussed later
6. The rWKR, discussed later
7. The tLibIndex, discussed later
8. The transience flag (t)
9.

The contents of a portal iPLB entry include:
1. The address range covered
2. The rights conveyed (p)
3. The grantee, a turf ID
4. The re-grant right (g)
5. The target turf, a turf ID
6. The transience flag (t)

The Well Known Regions (called WKRs) are an optimization. They exist to drastically reduce the need to look up permissions in the PLBs and the Permission Tables. They map the most common access patterns in typical software. Well known Regions are held in special registers and are checked on certain defined operations before the PLBs or permission tables are consulted. Only when no relevant WKR check is successful are other permission checks attempted. WKRs may be thought of as a micro-cache above the PLBs and the Permission Tables. For most but not all WKRs there is a normal equivalent permission defined and resident in the PLBs and protection tables. Associated with most WKRs is a hardware base register that may be used to compose addresses in load and store operations. The WKR is only checked for operations using the corresponding base register; operations using addresses derived from pointers bypass the WKRs and are checked in the PLBs and/or underlying tables. The WKRs can include the code well know region (cWKR), the data well known region (dWKR), the data well known region (rWKR), the thread local storage region (tWKR), the stack WKR (sWKR), the output WKR (oWKR), the input Well Known Region (iWKR), the home WKR (hWKR), and the null Well Know Region (nWKR) as described below in more detail.

The code well known region, or cWKR, is checked for all control flow transfer operations using relative addressing, and also for changes of execute address arising from normal sequential execution. These transfers are required to stay within the region covered by cWKR; a relative transfer or sequential execution to outside that region causes a fault with invalidAddressFault without consulting the iPLB or the underlying tables. The cWKR is set whenever an execute permission entry in the iPLB or its tables has to be consulted in a pointer-based control flow transfer, i.e. on calls and branches outside the current cWKR. The address range of the grant found to cover the target address becomes the new cWKR value after the transfer. Thus the region within which relative addressing is permitted is changed by jumping/calling through a pointer pointing into a different region. It is held in the cWKRReg register. Rather than holding an address range, if execute grants are constrained to be power-of-two sized and aligned then the cWKR can be represented as a bit mask and equality comparand; this optimization permits the cWKR check to be a simple and cheap bitmask check instead of the more expensive range comparison.

The data well known region, or dWKR, can be checked for all load and store operations using addresses based on the dpReg special register. This register is normally used to access program static data, such as the contents of the .data and .bss sections of a load module using ELF conventions. These addresses are required to stay within the region covered by dWKR. A load based on dpReg from outside that region can return a Not-A-Result (NaR) value of the requested width without consulting the dPLB or the underlying tables or actually accessing memory. A store based on dpReg to outside that region causes a fault with invalidAddressFault without consulting the dPLB or the underlying tables. dWKR is set whenever an execute permission entry in the iPLB or its tables has to be consulted in a pointer-based control flow transfer, i.e. on calls and branches outside the current cWKR. The value of the dWKR entry in the permission that permits the control transfer becomes the new dWKR value after the transfer. Thus the region within which program static data is found is changed by jumping/calling through a pointer pointing into a different code region. The dWKR is held in the dWKRReg register as a byte range. Typically, the dpReg base register occupies the same logic as the lower bound of dWKRReg.

The data well known region, or rWKR, is checked for all load and store operations using addresses based on the cppReg special register. This register is normally used to access program read-only data, such as the contents of the .rodata sections of a load module using ELF conventions. These addresses are required to stay within the region covered by rWKR. A load based on cppReg from outside that region returns a NaR value of the requested width without consulting the dPLB or the underlying tables or actually accessing memory. A store based on cppReg to any address inside or outside that region causes a fault with invalidOperationFault without consulting the rWKR, the dPLB or the underlying tables. rWKR is set whenever an execute permission entry in the iPLB or its tables has to be consulted in a pointer-based control flow transfer, i.e. on calls and branches outside the current cWKR. The value of the rWKR entry in the permission that permits the control transfer becomes the new rWKR value after the transfer. Thus the region within which program read-only data is found is changed by jumping/calling through a pointer pointing into a different code region. The rWKR is held in the rWKRReg register as a byte range. Typically, the cppReg base register occupies the same logic as the lower bound of rWKRReg.

The thread local storage region, or tWKR can have byte granularity that is set when a control flow transfer outside the range of the current cWKR occurs, it works a little differently. The code permission contains only an index for thread local addressing (the tLibIndex field), rather than the full byte address range of the dWKR and rWKR. The tWKR is held in tWKRReg during execution. While data stacks are per thread as well, a TLS is of a compile time fixed size and accessible the same way from all frames within the thread. The TLS can store global data for the thread. When a thread enters a code section that requires TLS, as indicated by a non-zero index, the hardware saves the TLS index in the tLibIndexReg special register, and clears the tpReg special register to zero. When subsequently, but before a transfer to a different cWKR occurs, a load or store using an address derived from the tpReg base register is executed, the hardware detects that tpReg is NULL and not a meaningful value. In each spillet is the address of the base and length of an array of descriptors of thread-local regions, the TLS root vector. The base and length are clear (zero) for a new turf for which there are no threads with TLS, where the zero may be implicit from backless memory. The hardware attempts to index into the TLS root vector with the TLS index in the tLibIndexReg, to locate the root of its particular TLS. The indexed descriptor is loaded to tWKRReg, its range becomes the new tWKR, tpReg is set to a location within that range to serve as the address base for further access to TLS, and the hardware completes the original load or store normally. If during the above steps it is found that the value in tLibIndexReg exceeds the length of the TLS root vector (including the case where there is no TLS root vector at all) then the hardware traps to software, which allocates a longer TLS root vector, copies the current root vector contents (if any) to the new longer one, discards the old vector and initializes the TLS root vector base and length in the turf header to describe the new vector. New descriptor entries in the expanded vector are zero, indicating no allocated TLS storage. The new length and base replace the old length and base in the turf header. The size of the new TLS root vector may be set from the value of tLibIndexReg, or larger depending on policy and information available to the trap handler. If during the above steps it is found that the indexed descriptor selected by the value of tLibIndexReg is clear (zero) then the hardware traps to software that allocates a thread local storage region for the thread/turf combination. The region is initialized from the TLS prototype that is associated with the code of the thread, originally from the load module file that contained that code. How that prototype is located, copied to the new region, and initialized is determined by software policy and the implementation. As a final step, a read-write grant for the new region and the owning turf is pushed to the dPLB and the underlying persistent read-write permission tables, thus permitting access to the new region both by addresses based in tpReg (checked by the tWKR) and by pointer (checked by the dPLB and tables). When the new TLS region is fully initialized the trap returns and the original load or store completes normally.

The effect of the above steps is that TLS data is created lazily on a per-turf-per-thread basis, transparently to the operations that access it, and the memory steps required to be able to address it are also only performed the first time an access is attempted after a transfer to a new cWKR occurred. Threads never or not currently using TLS see no overhead.

Note that all accesses using addresses based on tpReg are checked against tWKR (possibly after tWKRReg receives a value as described above). A failure of the check faults the thread with invalidAddressFault and neither the dPLB nor the tables are consulted.

Figure 19:
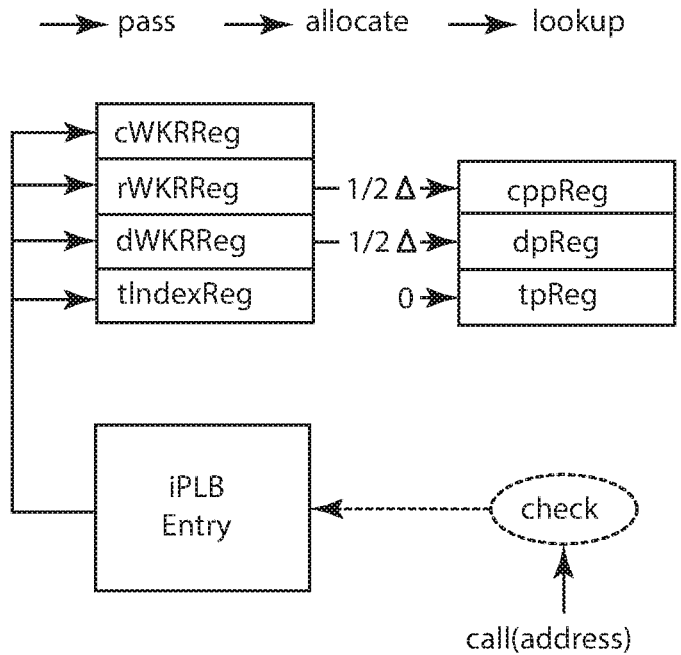
FIG. 19 shows operations that can be performed when a call address misses in the cWKR but hits in the iPLB or Permission Tables.

When a call address misses in the cWKR but hits in the iPLB or Permission Tables then the program will transit to a different library. The iPLB entry found contains the WKR values appropriate for the new library. These operations are shown in FIG. 19. In this graphic, a pass arrow means a value is copied and changes state elsewhere, a lookup means a value is searched and used, and an allocate means a new data structure is allocated.

Figure 20:
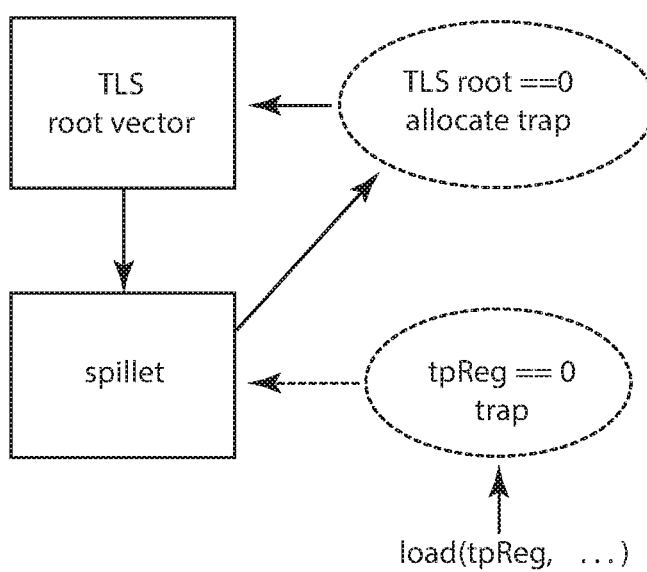
FIG. 20-22 shows operations that can be performed with respect to memory references based on the TLS base register, tpReg.

A memory reference based on the TLS base register, tpReg, finds the base is zero and traps. It checks for the TLS vector root in the spillet header and discovers that is empty too, so it allocates a new vector and updates the root descriptor in the spillet header. These operations are shown in FIG. 20.

Figure 21:
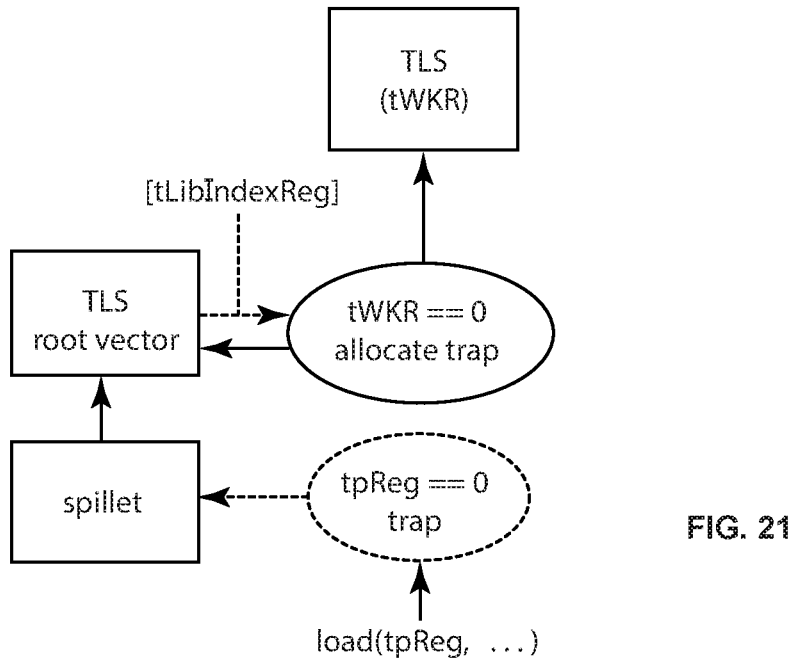
Figure 22:
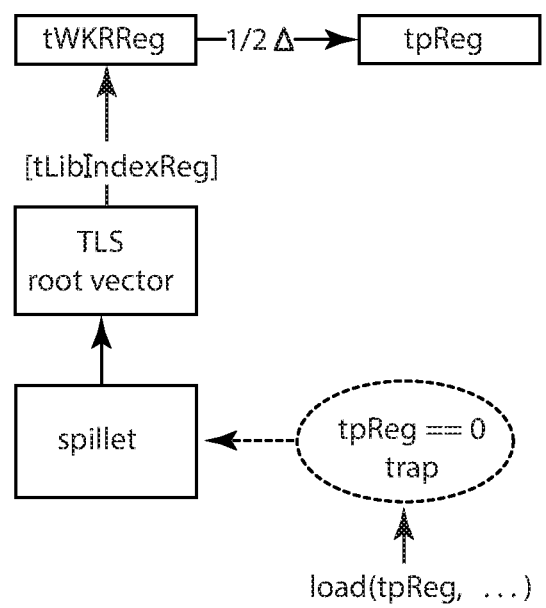

A memory reference based on the tpReg register finds the base is zero and traps. It checks for the TLS vector root in the spillet header and discovers that the entry indexed by tLibIndexReg is empty, so it allocates a new TLS and initializes it from the relevant .tdata program segment, updates the vector entry to describe the new TLS, and sets tWKR and tpReg to use the new TLS. These operations are shown in FIG. 21. The TLS root vector entry indexed by tLibIndexReg now points at the TLS for the current library and thread. tWKR covers all the new TLS, and tpReg points at the middle of it so it can be used for based addressing into the TLS as shown in FIG. 22.

The stack WKR (sWKR) is part of the data stack. It has byte granularity and describes the space located between the frame pointer fpReg and the stack pointer spReg of the data stack. Its primary purpose is sanity checks on stack accesses to the current frame. It is consulted on any fpReg based load or store and faults with invalidAddressFault if it fails. Note that the address range covered by sWKR changes dynamically with every call, return, stackf, or alloca operation executed. The latency of the changes to sWKR (i.e. the relative timing of a change to fpReg or spReg and the change in the check on addresses in load and store) can vary by design. Since stacks usually are allocated in memory that is accessible by the turf anyway, normal pointers into the stack still work using permissions in the dPLB and/or tables, but stacks can be allocated in regions without turf permissions, and then only the current stack frame can access them.

The output WKR (oWKR), together with the input Well Known Region (iWKR), forms a mechanism for passing function arguments on the data stack. It makes use of three special registers, the addressing base registers inpReg and outpReg, and the argSizeReg. The oWKR is set with the argSize operation. Normally, outpReg is equal to the current spReg, and both register change in sync. With the argSize operation, spReg is incremented by the requested amount, but outpReg is not. The freshly created oWKR is defined to cover the new space on the stack between outpReg and spReg. The caller can now fill the region between the two with the argument values, using outpReg as the base for addressing. Executing the argSize operation with a zero length recovers the space of the oWKR and invalidates further access based on outpReg until another argSize operation is executed. On a call operation, outpReg is copied to inpReg and argSizeReg is set to spReg-outpReg. A load or store operation using an address derived from outpReg as a base is checked against the oWKR. It faults with invalidAddressFault if out of range; neither dPLB nor the tables are consulted. Since stacks usually are allocated in memory that is accessible by the turf anyway, normal pointers into the output region of the stack still work using permissions in the dPLB and/or tables. A return operation always restores the state of the caller, i.e. it sets outpReg to inpReg and restores the previous inpReg, argSizeReg, iWKR, and oWKR, all having the same values as before the call operation. The oWKR region may contain stack results from the call operation, which may be accessed normally using addresses based on outpReg. Note that if the call operation involved transit through a portal then the iWKR and oWKR are in different turfs.

The iWKR is set by each call operation. The caller's outpReg becomes the callee's inpReg, and the caller's oWKR becomes the callee's iWKR. The argSizeReg register is set to spReg-outpReg of the caller. Note that the argSize( ) operation does not set the argSizeReg directly. It only sets the distance between outpReg and spReg, which will then become the argSizeReg value on the call operation. The iWKR is thus defined to start at inpReg and extend argSizeReg upwards on the data stack. The former values are saved by the spiller for restoration by the return operation. Any load or store operation using an address derived from the inpReg base register is checked against iWKR. The check faults with invalidAddressFault if out of range. Neither the dPLB nor the tables are consulted. A return operation restores the state of the caller, i.e. it sets outpReg to inpReg and restores the previous inpReg, argSizeReg, iWKR, and oWKR, all having the same values as before the call operation. Note that if the call operation involved transit through a portal then the iWKR and oWKR are in different turfs.

The home WKR (hWKR) serves as an optimization to avoid searching the dPLB and tables for common accesses that are not intercepted by the other WKRs. Each turf has its own hWKR. The location and content of hWKR are arbitrary, but performance and power usage are improved if data frequently accessed by pointers is placed in the region covered by the hWKR. For implementations supporting the local vs. global space distinction used for the unix fork( ) syscall, the hWKR by convention can be located at local address zero (the home plot) wherever that may be in the global space. A recommended configuration is for the loader to lay out all static data of the application and all libraries within the hWKR, together with space for the initial heap. The hWKR need not cover the entire plot even if the plot has been reserved for future use by the turf. Because hWKR grants read-write permission, any covered address will be a valid target for pointer-based access. Backless memory will cause values not otherwise initialized to read as an implicit zero in the covered region. The hWKR should not be set to cover addresses for which access is invalid rather than valid but zero. It can be omitted entirely by setting it to zero. The hWKRReg register for the hWKR is set on portal-type call operations during turf transitions. The value for it is obtained from the turflet. If the region is restricted to power-of-two size and alignment then it may be implemented as a simple power of two address mask, with an equally simple check; the choice of implementation is member specified. The region covered by the hWKR can only be changed by changing the value in the corresponding turflet array entry. The turflet array entry is only writable by trusted software, so an application will normally rely on system software such as mmap( ) or the loader to manage the hWKR. The hWKR can be checked whenever a load or store operations use an operand value (pointer) as its base address. Unlike the other WKRs, on a failed check there is no fault, but the dPLB and (and if necessary the underlying tables) can then are searched for a valid permission.

In speculative code NULL pointer accesses can be quite frequent. To avoid expensive tree searches every time, the Null Well Know Region or nWKR can be configured to quickly can reject NULL pointer accesses. Specifically, the null pointer can be held in the nWKRReg register as a bitmask check. This register is permanent and unchangeable.

Note that transient permissions are tied to a single portal-type call. They are only needed for arguments passed by reference, and serve to control the sharing of the data between client and server; transient permissions are not needed for arguments passed by value, whether on the belt or in memory. The permissions are created by the client as a series of one or more grants, which are then made available to the server by the act of calling through the portal. While in the call, the server may access the shared memory using variations of memory-reference operations such as load and store. These variants specifically indicate that they refer to shared arguments. When normal memory operations are used by the server they are always evaluated in the server's normal context and do not use any of the permissions conveyed by the call. The distinction between a reference using the server's native permissions, as they exist in the persistent permission tables, and the permissions conveyed by the call is maintained in order to avoid the so-called confused deputy problem, in which a client confuses the server by supplying a reference that means nothing to the client but has inherent meaning to the service. Confused deputy is a frequently used avenue to attack the security of a system, but is impossible when the permission spaces of the server and the arguments are disjoint and the server consistently uses the intended space for access. There can be two protocols for conveying the permissions required to access arguments that have been passed by reference. In the search-based protocol, the server receives real client pointers to the argument data, and the data itself may contain pointers. Thus a pointer-linked list or graph can be passed intact to a server, and the server can follow the links so long as all pointers in fact refer to arguments that have been passed by the client as well.

Dereferencing a pointer whose target was not part of the arguments will cause a protection violation, even if the pointer being dereferenced came from arguments that had been received from the client. That is, it is not possible to pass a linked structure solely by passing an entry pointer and then following the links; each node of the structure must be individually passed, whereupon the links may be followed by the server. While the need to pass each node may be cumbersome, the alternative capabilities approach, in which having a valid pointer to something implies also having a pointer to whatever the something points too, is impractical due to the peculiarities of important programming languages, and the costs of hardware implementation. However, the grant-based model of the CPU as described herein makes it easy to pass only a single node of a linked structure as an argument, which is difficult in a capability-based system.

A server may need to make further portal-type call operations to fulfill its function, and those further nested servers may need to access data passed by the original client. Thus it must be possible for a server to pass on, or relay, a permission it has received to a nested portal-type call operation. All transient grants may be relayed arbitrarily, in both protocols, although the operations to perform the relay differ to conform to the requirements of the respective protocols. It is possible for permissions received using the address-based protocol to be relayed using the index-based protocol. However, the converse is not true; once a permission is index-based, it remains that way through further relaying. Allowing indexed-based to address-based relaying would permit a server to recover the actual addresses used in an index-based argument, whereas the point of the index-based protocol is to preclude exposing actual addresses.

Relaying permits a server to pass a received permission on to a nested portal-type call operations, and so on forming a relay chain. However, each intermediary in the chain may make direct use pf the permission received, even if nothing is required but that it relay the permission on to the final service that will use the permission to perform its function. To prevent inspection and use by intermediaries in a relay chain, a permission may be sealed with the identity of the intended final consuming server. All transient permissions, both original and relayed, may be sealed in both protocols, although the operations to perform the seal differ to conform to the requirements of the respective protocols. An attempt to seal a permission that is already sealed will fault with the invalidOperandFault; it is not possible to change a seal or remove it. No explicit action is needed to unseal a permission; the sealee server may simply use the permission as if it were unsealed.

Note that both protocols support the ability to grant transient permissions with w (write), r (read) and p (portal) rights derived from the persistent permissions of the client. In addition, it is possible to create a transient permission with p (portal) rights by passing an address of code for which the client has persistent permission with x (execute) rights. Such a transient permission is called an implicit portal, and are intended as a convenience when the interchange between client and server may use callbacks. An implicit portal permission acts exactly a normal portal permission does, except it describes only a single portal rather than an array of portals. The target entry address of the implicit portal is the code address supplied when it was granted, and the target turf is that of the granting client. Implicit portals may be sealed, relayed or persisted like any other transient permission, and supported in both protocols.

Transient permissions have strictly limited lifetime; they are automatically revoked when the associated portal-type call operation exits for any reason. However, they may be made persistent by explicitly persisting them, or rather, a persistent permission conveying the same rights may be created from them. The transient permission from which a persistent permission has been created remains for the duration of the call and may continue to be used as a normal transient permission. This mechanism provides the means by which persistent permissions are spread from turf to turf. The ability to persist a transient permission is governed by the g (grant) right conveyed by the transient. Only permissions carrying this right may be persisted; an attempted violation faults with invalidOperandFault. The persistent permission created may be more restrictive than that of the transient permission from which it was made; in particular, it may omit the g right of the transient. The persisting mechanism permits the transfer of persistent permissions among cooperating turfs. The server cannot obtain a persistent permission unless the client explicitly passes a transient permission with the G right, and the client cannot grant-bomb the server because the server must explicitly persist any permission received from the client.

Persistent permissions are always address-based because they expose the actual machine addresses involved. Consequently, only address-based transient permissions may be persisted; it is not meaningful to persist an index-based permission because to do so would expose the contained address. There is no operation to persist an index-based permission, whether the g right is carried or not. Note that sealed permissions may be persisted, but only by the sealee after any relaying through intermediaries. The persist mechanism requires that the recipient must act as a server and hence must export a portal that the granter can call with the permission to be made persistent. This may be inconvenient; as pure clients would not want the administrative overhead of exporting a portal vector. As an alternative, trusted software, such as a loader, may provide initial persistent permissions directly by manipulating the relevant persistent permission tables in memory directly. However direct manipulation is also inconvenient (and potentially risky) for ordinary extension of persistent permissions, such as would result from a call to the system mmap( ) function. The recommended practice for such situations is for the client (desiring allocation of memory) to call the allocation server (a well know API exported by a system service), passing an implicit portal to a client callback function as well as other necessary arguments. The server then allocates the resource from state for which it has persistent permissions, and portal-calls back to the client's implicit portal, passing a transient permission for the resource that carries g rights so it may be persisted. The callback then persists the new permission, thereby giving the client its new persistent permission, without requiring that the client export portals to the server. The entire transaction, including the callback handler, is likely wrapped in a library function of the runtime system used by the client, and the interface visible to the client is that of the familiar mmap( ) call.

The implementation of transient permissions can vary by design. The following describes a representative implementation for illustration. Other suitable implementations can also be used. In the representative implementation, the transient permissions are held in the Transient Permission Tables, which are hardware-aware data structures in memory. These tables are searched (address-based protocol) or indexed (index-based protocol) to locate a relevant permission which allows an attempted access. Because the transient permissions are tied to a particular portal-type call operation and hence to the granting and calling thread, the corresponding Transient Permission Table is also tied to the call and thread. Consequently, each Transient Permission Table is kept in the spiller stack where it is inaccessible except to trusted system software. There is one Transient Permission Table per portal-type call operation; if calls are nested, then there is a Transient Permission Table or each. Thus the Transient Permission Tables are interleaved with spiller frames on the spiller stack in the spillet array.

A call operation with granted permissions goes through three distinct phases. First, a series of grant operations informs the hardware about each permission to be passed. Second, the call itself takes place. And third, the executing server uses the permissions to access argument data that had been passed by reference. The structures used change as these steps are passed through.

The first phase comprises accumulating the grants. The top of the spiller stack is treated as an open-ended array, and there is a hardware counter, grantTopReg, that indicates the last filled position in that array. A grant using the index-based protocol carries the intended index value, which is used to index this implicit array to select a location in which the entry describing the granted permission is placed. If the desired position is beyond the current value of grantTopReg then the intervening potential positions are cleared such that the absence of a permission in that position is evident to the hardware. The grantTopReg is updated to reflect the highest index position yet used in the series of grants. Because of the position marking, the grant operation can detect the use of the same index value in two different grants, which is faulted. A grant using the address-based protocol is simply pushed on the top of the spiller stack, advancing grantTopReg.

When the granting phase completes and the call is made, the accumulated permission entries occupy an array on the spiller stack whose length is given by grantTopReg. This array is located logically between the spiller frames of the calling client and the called server. However, client and server are in different turfs, and so the client frame and the server frame are based in different spillets and not adjacent in memory. Thus the new permission array is in the top of the client spiller frame but not adjacent to the server frame. The array is internally identified by the memory address of the adjacent caller frame, which is of fixed length, or alternatively by the ordinal number of that frame as counted back through nested calls back to the root of the thread. The value of grantTopReg (the size of the array) is saved with the array for index checking, and grantTopReg is cleared in anticipation of nested portal-type calls. In the index-based protocol, the constructed array is indexed directly, and the contained permissions act both as rights-carriers and also as descriptors for the memory that had been granted. An access locates the correct array, indexes it to locate the permission/descriptor, and indexes that with the relevant byte address and length to obtain a verified effective address which can be used to access memory normally. Out of range indexes fault, both for the entry index and the byte index. In the address-based protocol, a candidate address obtained by the server for argument data is first checked against the PLB as an optimization. If the PLB lacks a relevant permission, the table is located and the entries in the array are searched for a relevant permission. If none is found then the hardware indicates a protection violation appropriate to the kind of access, as described elsewhere. If one is found, then the permission is pushed to the PLB to speed up further access using the same permission.

Because the Transient Permission Table is immediately above the caller's spiller frame in the caller's spillet, when the portal-type call operation returns, the Transient Permission Table will be at the top of the spiller stack with no spiller frames above it. It may then be cut back automatically simply by setting grantTopReg to zero.

There are many variations possible in this basic model. Among others, grants may mark the permission with the identity of the indicated table and the associated index that it would have had if it had been written to the table immediately. The marked permission is then pushed to the PLB rather than being written it directly to the table. Only if the permission is evicted from the PLB is it lazily written back to its position in the table.

In another variation, permissions using the index-based protocol are pushed into the PLB, either immediately with lazy writeback to the table, or immediately with immediate entry to the table, or as loaded from the table when used. The PLB is searched by address range in the hardware, whereas index-based lookup is by index. However, the range-checking hardware can be used if the index and table identifier is treated as a pseudo-address with a length of one byte.

In yet another variation, for permissions using the address based protocol, the Transient Permission Tables may be reorganized from the simple array structure described here into a search tree or other structure for faster lookup. This is especially advantageous if the permissions are not directly inserted in the table when granted but are instead pushed into the PLB, from where they are lazily moved to the table and inserted in the search structure only if PLB activity forces them to be evicted before the function exits.

It is also possible to have larger structures holding the transient grants of many portal-type call operations, similar to the persistent permission tables. These may include only the permissions of one thread through nested calls, or may include permissions from all threads in a turf as the persistent tables do, or even for all threads in a system. Such organizations are most appropriate when the tables are maintained by software using trapping, because removing permissions when a portal-type call operation returns is likely to be too complex for hardware.

Lastly, the implementations can implement any of the operations in actual hardware, or by trapping to trusted software to perform the necessary steps.

Nearly all operations using the address-based protocol locate a permission by searching in the Transient Permission Table for one covering a desired address range with the desired rights. If one is not found in the Transient Permission Table, then most operations fault with invalidAddressFault. Exceptions are noted in the relevant operation descriptions herein.

Nearly all operations using the index-based protocol use a from argument to select a single permission from the Transient Permission Table. If this index is out of range then the operation faults with invalidOperand fault. Most operations then apply offset and size arguments to the range of addresses covered by the permission to verify coverage of the operation. Most operations call for the permission to possess certain explicit rights. Failure of these checks usually faults with invalidAddressFault; exceptions are noted in the description of individual operations.

Permissions in the Transient Permission Table may have been sealed with the turf ID of a specific grantee, in the expectation that the permission will be relayed to a server in that turf through a chain of intermediaries. A sealed permission for which the current turf is the grantee acts as if it were unsealed. A sealed permission for which the current turf is not the grantee acts as if it had no extent in memory and carries no rights. These behaviors are the same for all operations of both protocols except the grantIsSealed operation.

The CPU can support a number of operations as follows.

The grant operation is a client operation that can use the address-based protocol or indexed-based protocol for pass-by-reference arguments as follows:

Address-based:
    grant(void* addr, size_t length, bitset<right>rights, turfID seal)

Index-based:
    grant(void* addr, size_t length, bitset<right>rights, turfID seal, int to)

addr—start address of the grant range
length—size of the grant range
rights—the right bits
seal—the turfID of the intended user, others can pass it on, but not use it
int to—the index for the index based grants These parameters are used consistently in the following operations. The rights are represented as a bitmask where each bit corresponds to one of the defined permissions/rights enumeration. The grantor must possess persistent permissions covering the range of addresses with at least the granted rights; failure faults with invalidAddressFault. Multiple grants may overlap in any way. The created permission is sealed for use solely by a server running in the seal turf. A turfID of zero indicates that the permission is unsealed. A grant with read rights conveys permission to read (load from) data within the described address range. A grant with write rights conveys permission to write (store to) data within the described address range. A grant with portal rights conveys permission to call through a portal whose target address is one of the elements of an array of function pointers located within the described address range. The target turf of the portal is implicitly the turf of the grantor. Generally, read, write and portal rights are disjoint in grants, but this is not required. If the grant is for execution rights, then an implicit portal is created and the grantee receives the corresponding p right to that portal. The target code address of the resulting portal is the address argument and the target turf is the turf of the grantor. The length argument is ignored. There is no way to grant execution rights as such. Any grant carrying g rights may be persisted by the callee.

The relay operation is a server operation that re-grants all or part of an existing permission to a further nested call. It can use an address-based protocol or an index-based protocol for pass-by-reference arguments as follows:

Address-based:
    relay(void* addr, size_t length, bitset<right>rights, turfID seal)

Index based:
    relay(int from, size_t offset, size_t length, bitset<right>rights, turfID seal, int to)

This operation re-grants an existing permission to a further nested call. The operation differs from the grant operation in that grant requires that the granter have persistent permissions for the grant, whereas relay requires it to have transient permissions in the transient table.

The persist operation is a server operation that uses an address-based protocol for pass-by-reference arguments as follows:
    persist(void* addr, size_t length, bitset<right>rights)

The server must possess a transient permission covering the indicated range with the indicated rights and also the g right whether or not the g right is included in the rights to be persisted; the operation faults with invalidAddressFault if no permission exists.

The callAs server operation initiates a portal call to the code address described by or contained in a portal permission. The operation carries an argument list; these are belt arguments identical to those of the call operation. In addition, arguments may be passed using the normal memory protocols, including VARARGS. The call executes in the turf indicated in the portal, rather than in the caller's turf.
    callAs(int from, size_t offset, args argv)
    args—the normally encoded function arguments
    from—the grant index
    offset—the byte offset to the portal to call in the portal grant The indexed permission must possess portal rights; failure faults with invalidAddressFault. An implicit portal has an offset of zero. Note that the offset is in bytes, not in terms of function pointers in the portal array, and that the operation uses an implied width of eight bytes, the size of a function pointer.

The loadAs operation is a server operation that uses the index-based protocol for pass-by-reference arguments. It initiates a load request to fetch data from cache or external memory to operand storage (e.g., the belt). The data is loaded from an address contained in an indexed grant as offset by the argument of the operation. The width loaded may be any width supported on the member; unsupported scalar widths will be emulated by specializer-injected idioms, while unsupported vector widths will get a specializer or conAsm diagnostic. The loadAs operation has the form:
    loadAs(int from, size_t offset, widthTag width)
    from—the grant index
    offset—the byte offset within the region granted
    width—the normal width descriptor of load operations The access is checked both against the transient permissions of the server executing the operation, and also against the persistent permissions of the ultimate grantor (disregarding relays) of the transient permission used to permit the access in the server. As with all persistent permissions, this second check is address-based, using the effective address as calculated by the protocol. The double check deals with the situation in which a granting client may itself have lost rights to the permission during the course of the call, or may even have gone away such that the granted resource no longer exists. The operation is checked against the permission indexed by from. If the address in the indexed permission is a local address it is resolved to a global address using the turf of the granter of the permission being checked, not that of the server. The indexed permission must have r rights and cover the effective address and the indicated width to be loaded. The original grantor (disregarding relays) of the applied permission must also possess persistent permission covering the access. Failure of either check causes the operation to retire a NaR value of the indicated width in the same way as for load; it does not fault.

The storeAs operation is a server operation that uses the index-based protocol for pass-by-reference arguments. It initiates a store request to store data from the operand storage (e.g., belt) to cache or external memory. The data is stored to an address contained in an indexed grant as offset by the argument of the operation. The datum operand may be of any width supported by the member; unsupported scalar widths will be emulated by specializer-injected idioms. The storeAs operation has the form:
    storeAs(int to, size_t offset, beltPos datum)
    to—the grant index offset—the byte offset within the region granted datum—the belt operand index with the data to store The access is checked both against the transient permissions of the server executing the operation, and also against the persistent permissions of the original grantor (disregarding relays) of the transient permission used to permit the access. As with all persistent permissions, this second check is address-based, using the effective address as calculated by the protocol. The double check deals with the situation in which a granting client may itself have lost rights to the permission during the course of the call, or may even have gone away such that the granted resource no longer exists. Failure of the second check, without other error, causes the store to be silently discarded, as if the operand stored had been a None. This operation is checked against the permission indexed by from. If the address within the indexed permission is a local address it is resolved to a global address using the turf of the original granter of the permission being checked, not that of the server. The indexed permission must have write rights and cover the effective address and the indicated width to be stored; failure causes a fault with invalidAddressFault.

The copyFromAs operation is a server operation using the index-based protocol for pass-by-reference arguments. It initiates a copy of memory within a granted region to memory private to the server. The copyFromAs operation has the form:

copyFromAs(int from, size_t offset, void* to, size_t leng)

from—the grant from which to copy offset—the byte offset within the region granted to—the destination buffer address leng—amount of bytes to copy, doesn't need to be the whole grant The indexed permission must have read rights; failure causes a fault with invalidAddressFault. Its extent must cover a portion beginning at offset and extending for leng bytes; failure causes fault with invalidOperandFault. The granter of the indexed permission must have a persistent permission covering the entire extent with r rights; failure cause fault with invalidAddressFault. The server must have persistent permission for the entire region described by to and leng with writw rights; failure causes a fault with invalidOperandFault. The operation causes a trap to trusted software, which copies the whole of the extent of the permission to the space after to.

The copyToAs operation is a server operation that uses the index-based protocol for pass-by-reference arguments. It initiates a copy of data from server private memory to a portion of the memory described by an indexed grant. The copyToAs operation has the form:

copyToAs(int to, size_t offset, void* from, size_t leng)

to—the grant to copy to offset—the byte offset within the region granted from—the source buffer leng—amount of bytes to copy, must fit in grant The indexed permission must have writw rights; failure causes a fault with invalidAddressFault. Its extent must cover a portion beginning at offset and extending for leng bytes; failure causes fault with invalidOperandFault. The original granter (disregarding relays) of the indexed permission must have a persistent permission covering the selected portion of the extent with write rights; failure cause fault with invalidAddressFault. The server must have persistent permission for the entire region described by from and leng with read rights; failure causes a fault with invalidOperandFault. The operation causes a trap to trusted software, which copies the whole of space described by from and leng to the selected portion of the extent of the permission.

The grantSize operation is a server operation that uses an index-based protocol for pass-by-reference arguments as follows:

grantSize(int index)

This operation provides metadata information about the permissions in the Transient Permission Table. Specifically, this operation returns the length, in bytes, of the range covered by the indexed permission as a result on the belt.

The grantGranter operation is a server operation that provides metadata information about the permissions in the Transient Permission Table. One version grantGranter( ) returns the turf ID of the immediate client as a D-width result on the belt. Another version using an index-based protocol for pass-by-reference arguments of the form grantGranter(int index) returns the turf ID of the granter of the indexed permission as a D-width result on the belt. The ID returned may differ from the ID returned by grantGranter( ) due to relaying.

The grantRights operation is a server operation that uses an index-based protocol for pass-by-reference arguments of the form grantRights(int index). This operation provides metadata information about the permissions in the Transient Permission Table. Specifically, this operation returns a bit-mask of the enumeration of the rights carried by the indexed permission as a result on the belt.

The grantIsSealed operation is a server operation that uses an index-based protocol for pass-by-reference arguments of the form grantIsSealed(int index). This operation provides metadata information about the permissions in the transient permission table. Specially, this operation returns a Boolean as a result on the belt. The value is true if the indexed permission is sealed and the current turf is not the grantee.

The CPU can also support a guard operation that supports a low-overhead pass-by-reference argument for portal-type calls that can be used to pass linked graph structures to an untrusting server. The protocol distinguishes memory references that are to be evaluated using the permissions of the server (making the access) from those that are to be evaluated in the permission context of the client who has passed the data being referenced to the server. The guard operation sets a reserved bit (referred to as the guard bit) of a pointer representation. All special registers used as bases, and also malloc results, have the guard bit cleared. When a client invokes a portal-type call operation, it can perform transient grant operations as described herein, and pass pointers into them normally, still with guard bit cleared. The callee, who knows his own signature, then sets the guard bit on any argument pointers it has received, but doesn't change any of the data passed by reference via the transient grant operation such that the pointers embedded in the data structures remain guardless (guard bit cleared). The semantics of the guard bit follows:

1. load or store based on a guarded pointer checks only the transient grants
2. load or store not based on a guarded pointer does not check transient grants
3. pointer load (loadp) based on a guarded pointer sets guard on the loaded pointer
4. pointer load (loadp) that loads a guarded pointer faults
5. pointer store (storep) based on a guarded pointer must be storing a guarded pointer (else fault) and clears the guard on it
6. load effective address preserves guard Thus a guarded pointer will use the client's permissions, and any pointer loaded from the data will also be a guarded pointer and will use the client's permissions in turn. Meanwhile ordinary non-guarded pointers in the server will continue to use the server's permission context and reference server data.

Clients in general are exposed to confused deputy if a server modifies a pointer embedded in a granted data structure. The guard bit is a device to protect trusted servers, not to protect clients. The effect of all this is that non-defensive clients and relatively simple servers can use a protocol that uses ordinary function-call and pointer conventions, with the proviso that 1) clients must grant the referend of any pass-by-reference arguments, and 2) servers must explicitly guard all pointer arguments before use. Arguments and granted structures can be relay-passed on by nested portal calls to servers trusted by the intermediate server; relay calls to untrusted servers are not safe because the calling server acts like a client in the relay, and clients are not safe in this protocol.

The CPU can also support sessions that permits both server and client of a respective portal-type call operation to maintain session-related state, with automatic cleanup at the completion of the session. Sessions can support several transactions that are disjoint in time but otherwise similar. Sessions make use of the transient permission machinery and a transient permission table, but the table survives completion of each portal call and lasts until the session is explicitly terminated. While not during a portal call, the transient table sits on the top of the spiller stack, where it forms a logical array of granted permissions. In ordinary (non-session) portal-type call operations, this table is cut back automatically as part of returning from the portal. In a session the table is not cut back, and can even have more permissions added to it, so each subsequent portal call passes the same (or an expanded) permission set to the server. The accumulated table is discarded when the client executes the sessionEnd operation, or when the client exits the frame containing the table for any reason.

The client is always the instigator of a session. There is no way for the server/service to create a session other than at the request of a client. Any service that supports a session-based protocol must export an entrypoint that a client may call to request the creation of a session. The function may have any signature or name. In addition to its normal results, the function is also able to use the sessionMake operation that gangs with the return to annotate the client's session table with server-relevant state. This annotated state includes a portal pointer called sessionWrap and a data pointer called sessionState. The sessionState is an implicit argument to every subsequent client call using the session. Typically, the server will use the pointer to reach per-client state that lets it distinguish securely among multiple clients, without needing to maintain complex lookup structures internally. The sessionWrap must point to a portal whose target turf is the same server. If the client executes sessionEnd, or exits the function below the session permission table, then a trap causes a call to the sessionWrap portal, giving the server a chance to tear-down its per-session state to the ending session. When sessionEnd returns the session permission table is discarded, and client execution resumes as if the call to sessionEnd had not occurred.

If the client requests a session with the server and the server is unwilling or unable to do so, then it does not execute sessionMake and no session is established. However, the session table remains in place, and the client may try again. Typically, the client will learn of the lack of session via an error indication returned by the portal call, although it is possible to query if the session had been established.

It is not possible for a server to session-bomb a client by using sessionMake with ordinary calls. If the client has not executed sessionBegin, or if the session is already made, then sessionMake will fault in the server. The session operations form a convenient and very lightweight for a client and server to coordinate shared state over a sequence of portal calls. However, the facility is also limited: there can be at most one session active concurrently.

Sessions can involve the follow operations. All session operations can use both an address-based protocol or index-based protocol for pass-by-reference arguments.

The sessionBegin operation is a client operation where an existing Transient Permissions Table on top of the spiller stack, populated with permissions or empty, is marked as a candidate session table. The operation faults with invalidOperandFault if the table has already been marked.

The sessionIsStarted operation is a client operation that returns a Boolean result to belt. The value is true if the Transient Permission Table is marked as being in session.

The sessionMake operation is a server operation of the form

SessionMake(void(*sessionWrap)( ), void* sessionState)
   sessionWrap—the destructor function
   sessionState—pointer to server defined data for session
This operation must be attached or ganged with a normal return operation. It is not possible to execute it as a free-standing operation. If the return operation is not from a portal, or if the transient permissions table that supplied permissions to the returning call is not marked as being a candidate session or in session, the operation faults with invalidOperandFault. Otherwise the two arguments are saved in the Transient Permission Table, and the table state is marked as being in session. It is permitted to execute sessionMake while returning from multiple calls during a session; each execution updates the saved values in the session table.

The sessionState operation is a server operation that returns to the belt the current value of the sessionState pointer that had been saved in the session permission table when the session was established.

The sessionEnd operation is a client operation that triggers a call to the sessionWrap function that was saved in the session table. The session table is not cut back during this call, i.e. the server has transient rights to its contents during sessionWrap. When sessionWrap returns, the transient table is cut back as it would have been had it been an ordinary transient table rather than a session. SessionWrap activation is also triggered if the client function containing the session attempts to exit.

As described above, the protection model of the CPU can employ address ranges (or region descriptors) where each address range/region descriptor defines a particular address range within the virtual address space of the memory system together with meta-data that includes a set of permissions that grant or deny certain access rights to the particular address range. The address ranges/region descriptors are grouped together to form a turf, which is a collection of address ranges and associated permissions. The address ranges and permissions that belong to a given turf can be associated with a particular thread during execution of the thread. In this sense, the particular thread executes within the given turf and the set of address ranges and permissions that belong to the given turf are used during execution of the particular thread to dictate which parts of the virtual address space of the memory system can and cannot be accessed by the execution of the particular thread. A thread is a contained flow of execution. Each thread is identifiable by a thread ID.

For an implementation where the memory system is organized with separate virtual address space for instructions and data, the turfs are stored as entries in the two PLBs, where the entries of the iPLB store instruction-type turfs pertaining to memory regions of the virtual address space that contain instructions (code), and where the entries of the dPLB stores data-type turfs pertaining to memory regions of the virtual address space that contain data. The iPLB can be organized as a set-associative cache structure, a fully associative cache structure, or a direct mapped cache structure as is well known in the art. Similarly, the dPLB can be organized as a set-associative cache structure, a fully associative cache structure, or a direct mapped cache structure as is well known in the art.

Figure 4:
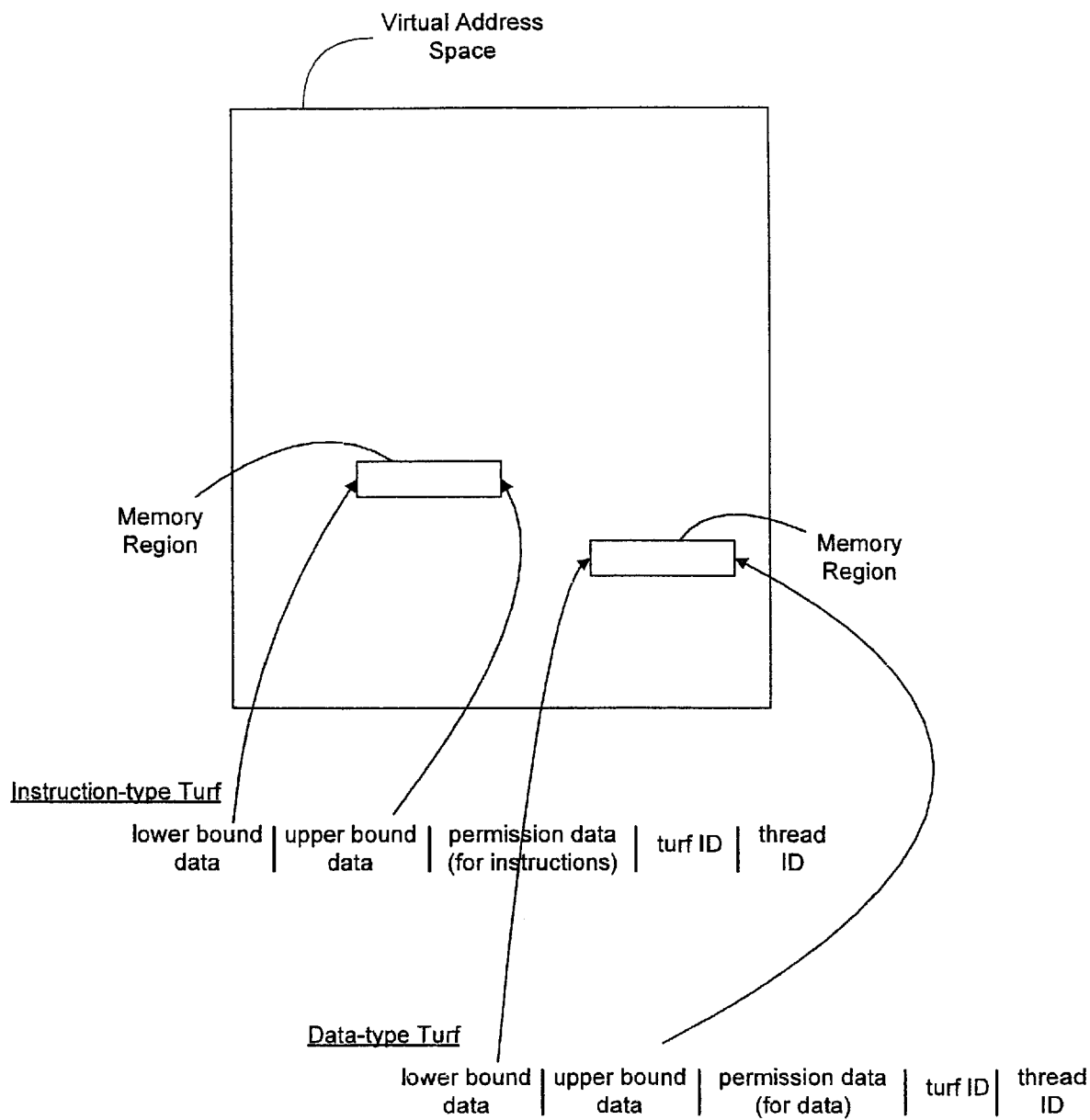
FIG. 4 is schematic illustration of the instruction-type and data-type turfs that are used by the computer processor of FIG. 1 to define and enforce protection domains for threads executing on the computer processor.
Figure 5A:
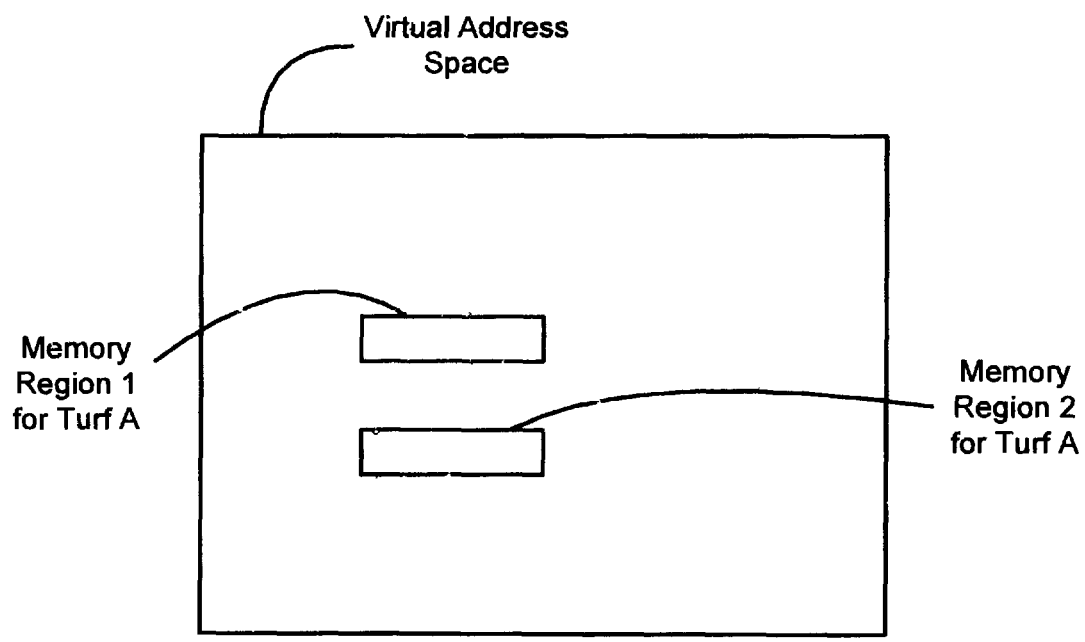
FIG. 5A is a schematic region of two disjoint memory regions specified by two instruction-type or data-type turfs.
Figure 5B:
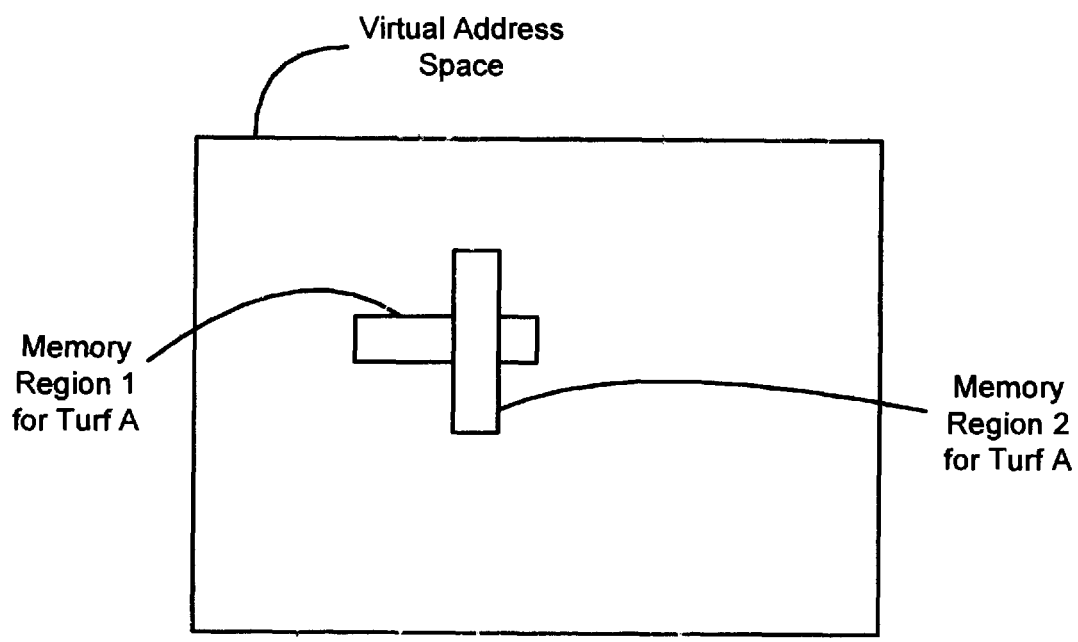
FIG. 5B is a schematic region of two partially overlapping memory regions specified by two instruction-type or data-type turfs.
Figure 5C:
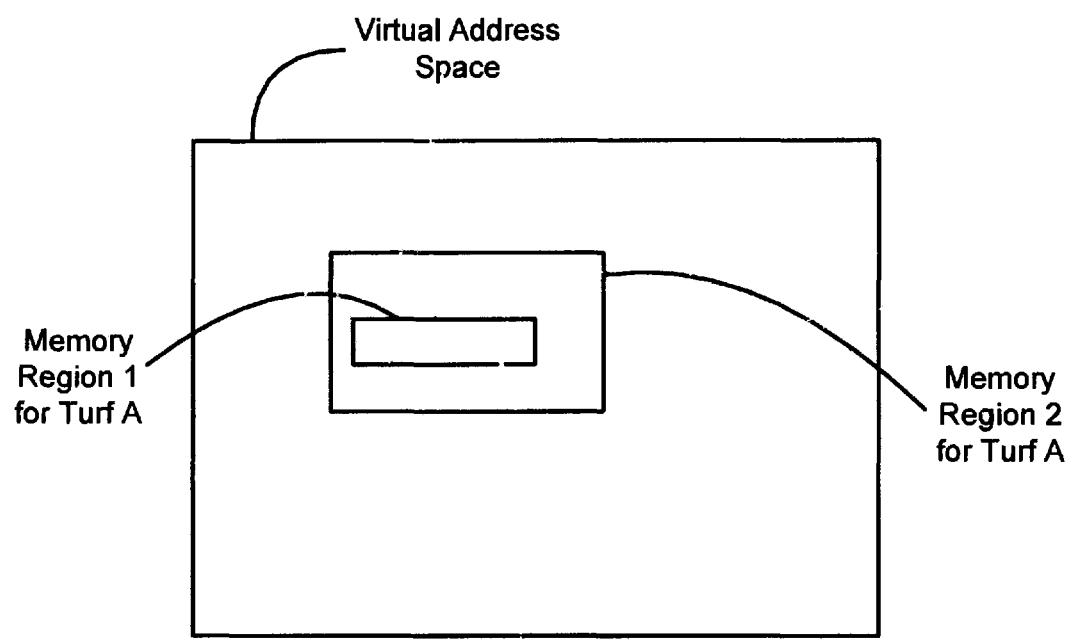
FIG. 5C is a schematic region of two overlapping memory regions specified by two instruction-type or data-type turfs.

FIG. 4 illustrates examples of the instruction-type turfs stored in the entries of the iPLB as well as the data-type turfs stored in the entries of the dPLB. Each instruction-type turf includes data that defines a specific memory region with the virtual address space of the memory system with associated meta-data including permissions data, a turf ID, and a thread ID. The data that defines a specific memory region can specify the lower and upper bounds of the specific memory region as shown. The permissions data can be used to specify that certain access rights should be granted or denied (such as "execute" or "portal" permissions) with regard to accessing instructions stored the specific memory region. The turf ID can be used to identify a collection of memory regions, which includes all memory regions that carry the same turf ID. The turf ID can possibly represent a wild-card identifier to specify that the specific memory region corresponds to all turfs. The thread ID can be used to specify that the instruction-type turf belongs to the particular thread identified by the thread ID. The thread ID can possibly represent a wild-card ID to specify that the instruction-type turf belongs to any thread that executes in the turf identified by the turf ID of the instruction-type turf. The memory regions specified by the instruction-type turfs of the iPLB can be disjoint from one another as shown in FIG. 5A, partially overlap with one another as shown in FIG. 5B, or fully overlap with one another as shown in FIG. 5C. Thus, the instruction-type turfs specified by the iPLB can describe overlapping memory regions, possibly with different permissions (and thus different access rights). The same memory region can have several instruction-type turfs with different turf IDs and thus can belong to multiple turfs.

Each data-type turf includes data that defines a specific memory region with the virtual address space of the memory system with associated meta-data including permissions data, a turf ID, and a thread ID. The data that defines a specific memory region can specify the lower and upper bounds of the specific memory region as shown. The permissions data can be used to specify that certain access rights should be granted or denied (such as read or write permissions) with regard to accessing data stored the specific memory region. The turf ID can be used to identify a collection of memory regions, which includes all memory regions that carry the same turf ID. The turf ID can possibly represent a wild-card identifier to specify that the specific memory region corresponds to all turfs. The thread ID can be used to specify that the data-type turf belongs to the particular thread identified by the thread ID. The thread ID can possibly represent a wild-card ID to specify that the data-type turf belongs to any thread that executes in the turf identified by the turf ID of the data-type turf. The memory regions specified by the data-type turfs of the dPLB can be disjoint from one another as shown in FIG. 5A, partially over overlap with one another as shown in FIG. 5B, or fully overlap with one another as shown in FIG. 5C. Thus, the data-type turfs specified by the dPLB can describe overlapping memory regions, possibly with different permissions (and thus different access rights). The same memory region can have several data-type turfs with different turf IDs and thus can belong to multiple turfs.

The entries (and corresponding instruction-type turfs) of the iPLB can be accessed in conjunction with a fetch request issued to the L1 Instruction Cache 117 (which can stem from the instruction stream flow or control transfer, including conditional or unconditional BRANCH or CALL or RETURN operations) to ensure that the executing thread whose actions issued the fetch request has requisite permission to access the instruction stored at the requested memory address (which can be a cache line address holding one or more instructions). In this manner, the virtual address space for instructions is protected, independent of the translation to physical addresses. The cache line addresses specified in the fetch requests employ virtual addresses as does the tags of the L1 Instruction Cache 117 and the instruction-type turfs of the iPLB. In one embodiment, the access and lookup of the iPLB can be performed in parallel with the access and lookup of the L1 Instruction Cache 117.

The entries (and corresponding data-type turfs) of the dPLB can be accessed by a memory request issued to L1 Data Cache 119 to ensure that the executing thread whose actions issued the memory request has requisite permission to access the operand data stored at the requested memory address (which can be a cache line address holding one or more bytes of operand data). In this manner, the virtual address space for data is protected, independent of the translation to physical addresses. The memory addresses specified in the memory request employs virtual addresses as does the tags of the L1 Data Cache 119 and the data-type turfs of the dPLB. In one embodiment, the access and lookup of the dPLB can be performed in parallel with the access and lookup of the L1 Data Cache 119.

Note that the iPLB and dPLB are of limited size and can run out of space. To address this issue, the turfs of both the iPLB and dPLB are backed by memory in structures called the Permissions Tables as described herein. The Permission Tables are set up by the operating system. The Permissions Tables memory structure can be accessed in the event that a lookup of the iPLB or dPLB misses. In this case, the CPU hardware searches the appropriate Permission Table(s) for matching turfs which can then be hoisted up into the iPLB or dPLB for subsequent access.

In the protection model of the CPU, a thread executes in a turf—one turf at a time, but this turf can change over time. The CPU hardware includes two special purpose hardware registers (which is referred to herein as "specReg") that hold both the thread ID and turf ID for each thread that is currently executing on the CPU. Note that more than one thread can execute concurrently on the CPU for the case where the CPU includes multiple cores. Each one of these threads corresponds to a unique thread and turf combination, which can be identified by the unique thread ID—turf ID pair corresponding to the thread ID of a particular thread and the turf ID for the particular turf that the particular thread is currently executing in. For each one of these thread-turf combinations, the CPU hardware can utilize the instruction-type and data-type turfs that hold a thread ID and turf ID that match the thread ID and turf ID stored in SpecReg register (as well as the instruction-type and data-type turfs that hold a wildcard ID for turf and a thread ID that matches the thread ID stored in SpecReg for the given thread and the instruction-type and data-type turfs that hold a wildcard ID for thread and a turf ID that matches the turf ID stored in SpecReg for the given thread) to dictate the security permissions associated with the memory regions of the turf of the given thread. Note that more than one thread can execute in the same turf concurrently, and thus multiple threads can see and use the memory regions of the same turf concurrently according to the permissions associated with the memory regions of that turf.

Figure 6A:
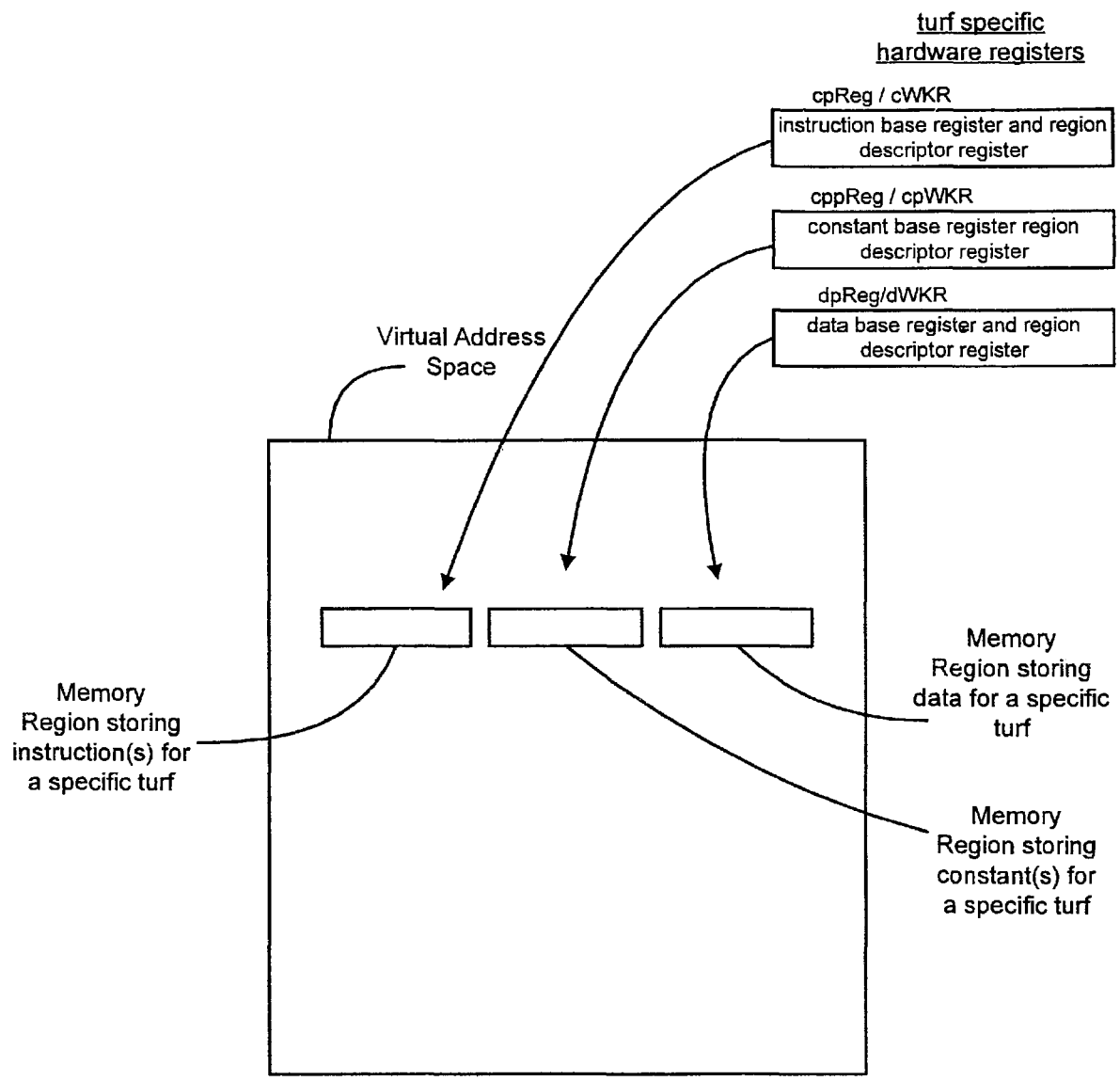
FIG. 6A is schematic illustration of hardware registers storing turf-specific descriptors that are used by the computer processor of FIG. 1 to define and enforce protection domains for threads executing on the computer processor.

Note that the hardware-based PLB processing consumes computational resources and power that ideally would be avoided. And the vast majority of memory accesses for each program are directed to the certain pre-defined well known regions as described herein. For this reason, each executing thread can have access to a set of well-known turf-specific hardware registers for the turf ID that it is executing in. Such turf-specific hardware registers store state information for the given turf. Such turf-specific state information can include a set of addresses and corresponding descriptors (referred to herein as "well-known region descriptors") that pertain to different regions of the virtual address space that are commonly accessed by a thread executing in the given turf. The addresses define base addresses that are used to derive effective addresses into the turf-specific regions. The descriptors define address ranges for the turf-specific regions with implicit permissions for such turf-specific regions. An example of such turf-specific hardware registers is shown in FIG. 6A, which includes the following:

a register "cpReg" that stores data representing a base address for a memory region in the virtual address space of the memory system that holds binary instructions (code) for the turf;

a register "cWKR" that stores data representing an address range for the memory region in the virtual address space of the memory system that holds the binary instructions (code) for the turf;

a register "cppReg" that stores data representing a base address for a memory region in the virtual address space of the memory system that stores constants for the turf;

register "cpWKR" that stores data representing an address range for the memory region in the virtual address space of the memory system that stores constants for the turf;

a register "dpReg" that stores data representing a base address for a memory region in the virtual address space of the memory system that holds operand data for the turf; and a register "dWKR" that stores data representing an address range for the memory region in the virtual address space of the memory system that holds operand data for the turf.

These memory regions can be specified by the program loader of the operating system. Note that the turf-specific registers can be accessed by the corresponding executing thread for protection checking such that these memory regions can be accessed securely without checking the iPLB and/or the dPLB and thus avoids the computational resources and power in checking the iPLB and/or the dPLB.

The CPU hardware can also include thread-turf specific hardware registers that store a set of stack addresses and corresponding descriptors that pertain to the stacklet of each given thread-turf combination executing on the CPU. The stack addresses can include an "FP" pointer that points to the top stack frame in the stacklet, and "SP" pointer that points to the end of the top stack frame in the stacklet. The stacklet descriptors can represent an address range that covers the stack frames of the stacklet (e.g., from the base of the stack frame to the "SP" pointer for the stacklet). The stack addresses and descriptors for the stacklet can be adjusted dynamically according to the control flow of the program as stack frames are added (due to the execution of a CALL operation in the thread-turf combination) and removed (due to the execution of a RETURN operation in the thread-turf combination).

The CPU hardware can also include thread-specific hardware registers that store a set of addresses and corresponding descriptors that pertain to thread local storage of each given thread executing on the CPU. The addresses can include a pointer that points to the thread local storage of the given thread. The descriptors can represent an address range for the thread local storage of the given thread.

Figure 6B:
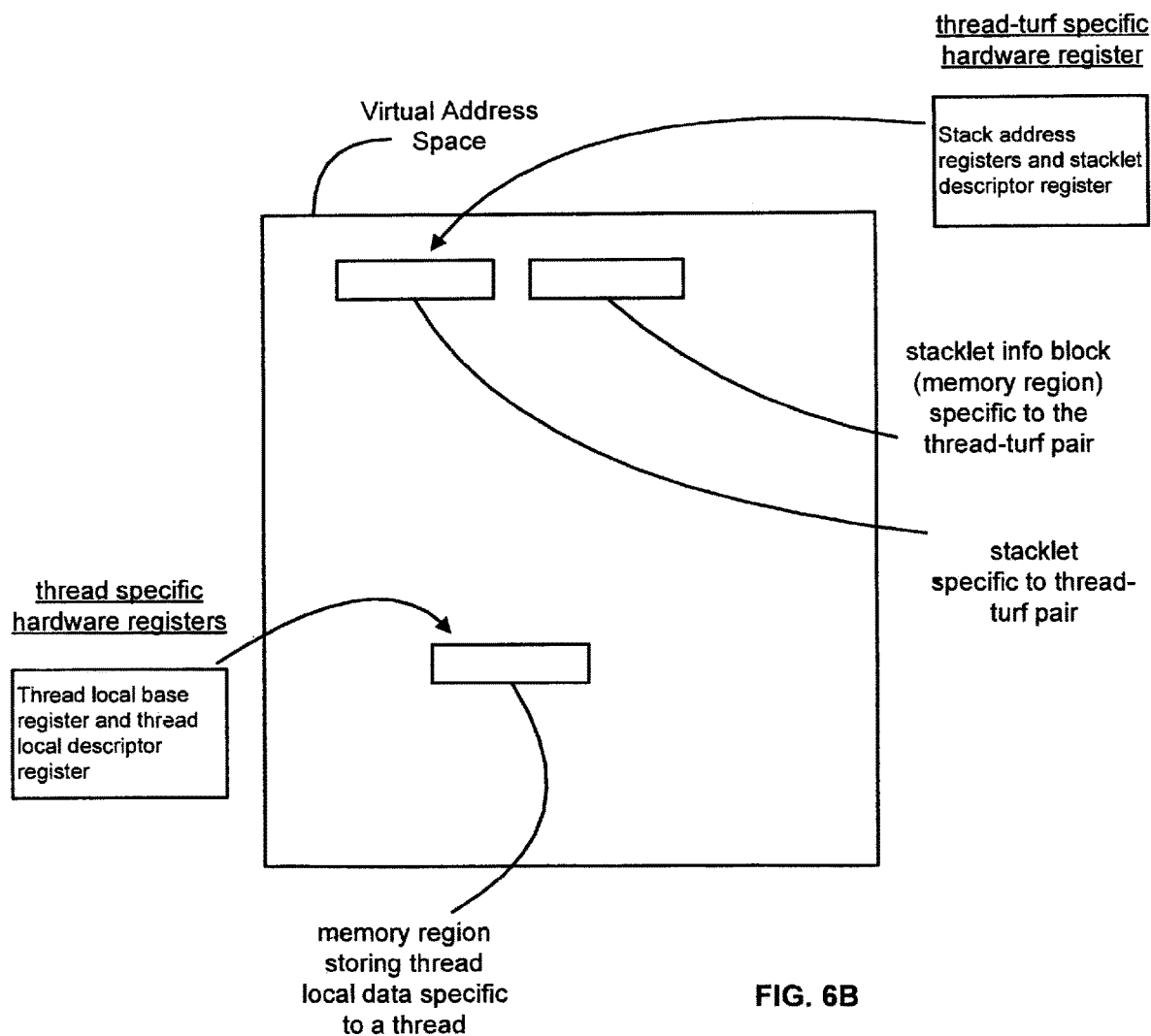
FIG. 6B is schematic illustration of hardware registers storing thread-turf-specific descriptors and thread-specific descriptors that are used by the computer processor of FIG. 1 to define and enforce protection domains for threads executing on the computer processor.

An example of such thread-turf specific hardware registers and thread-specific hardware registers is shown in FIG. 6B. These hardware registers can be used for protection checking such that the stacklet frames and/or thread local storage that corresponds to an executing thread and turf pair can be accessed securely without involving checking the iPLB and/or the dPLB. This avoids using the protection domains defined by the iPLB and/or the dPLB to protect the stacklet frames and thread local storage of the functions and services of the program from each other and thus avoids the computational resources and power in checking the iPLB and/or the dPLB. Note that it is possible for one thread-turf combination (which is referred to as "thread-turf A") to access the stack frame(s) of another thread-turf combination (which is referred to as "thread-turf B"), and the thread-turf specific hardware registers for thread-turf A will not permit access to the stack frame(s) for thread-turf B. Consequently, the iPLB and/or dPLB and/or Permission Tables of the CPU can include turfs that cover the stack frame(s) of thread-turf B with appropriate permissions for access by thread-turf A. In this case, the querying of the iPLB and/or dPLB and/or Permission Tables will permit the thread-turf A to access the stack frame(s) of thread-turf B when deemed appropriate by the permissions. It is also possible for one thread (which is referred to as "thread A") to access the thread local storage of another thread (which is referred to as "thread B"), and the thread specific hardware registers for thread A will not permit access to the thread local storage for thread B. Consequently, the iPLB and/or dPLB and/or Permission Tables of the CPU can include turfs that cover the thread local storage of thread B with appropriate permissions for access by thread A. In this case, the querying of the iPLB and/or dPLB and/or Permission Tables will permit thread A to access the thread local storage of thread B when deemed appropriate by the permissions.

Figure 6C:
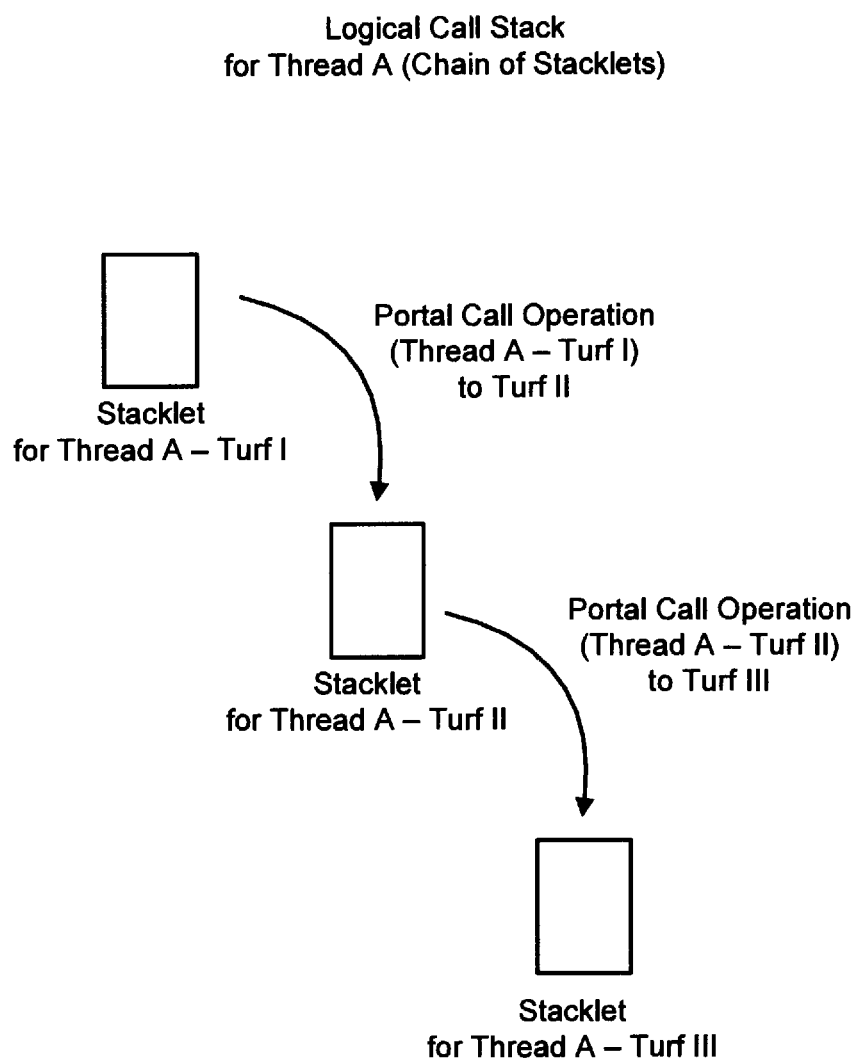
FIG. 6C is pictorial illustration of a logical call stack for a thread executing on the computer processor of FIG. 1.

Each thread and turf combination has its own stacklet stored in the virtual address space of the memory system. When the execution of a thread moves to a different turf (for example, by the processing of a portal-type CALL operation as described herein), the whole logical stack for a given thread is a chain of stacklets as shown in FIG. 6C. Each stacklet can have its own protection domain, because the stacklets corresponds to different turfs that can be isolated from each other. No extra dPLB or iPLB entries are needed to enforce these security measures. Note that chain of stacklets for the given thread partitions or segments the whole logical stack for the given thread. The stacklets, which are segments of the logical stack for the given thread, can be chained on a list. In the event that bottom stack frame of a current stacklet exits, the top stack frame of the next stacklet down the list can be unwound.

Figure 8A:
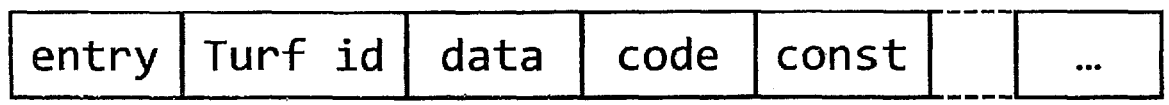
FIG. 8A is an illustration of the layout of a portal entry according to an embodiment of the present disclosure.
Figure 8B:
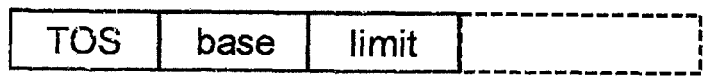
FIG. 8B is an illustration of the information contained in a stacklet info block according to an embodiment of the present disclosure.

The memory system can also store an info block per stacklet (which is referred to herein as a "stacklet info block"), which is used preserve the stack state of each thread on each turf in each stacklet. An example of a stacklet info block is shown in FIG. 6B. In one embodiment, each stacklet info block can be a single cache line in size and contain data pointing to the top of stacklet, the base of the stacklet, and the limit of the stacklet as shown in FIG. 8B.

The stacklets can be automatically allocated by hardware. In one embodiment, the upper part of the virtual address space of the memory system of the CPU can be reserved for stacklets and can be organized as a two-dimensional array indexed by thread ID and turf ID. The CPU hardware can compute the address of a stacklet trivially. How large stacklets are and how many turfs and threads are available and how much of the virtual address space they hold overall is implementation specific. In one example, an implementation that allows 1 million turfs and 1 million threads with stacklets of 8 Kbytes in size can reserve the upper 8 GB of the virtual address space of the memory system of the CPU as the two dimensional array of stacklets.

The stacklet info blocks can also be automatically allocated by hardware. In one embodiment, the virtual address space of the memory system of the CPU that is reserved for stacklet info blocks can be a reserved address space indexed with turf ID and thread ID. Uninitialized stacklet info blocks (as well as all uninitialized memory) can be implicitly assigned to zero as described in U.S. patent application Ser. No. 14/515,231, filed on Oct. 15, 2014, and herein incorporated by reference in its entirety. As such, the stacklet info blocks are automatically initialized to the default state of an empty stacklet.

Each thread executing on the CPU can also have access to its own local thread memory block as part of the virtual address space of the memory system of the CPU. This local thread memory block can be used to store local operand data that is generated and/or consumed by an executing thread. Each thread local memory block can have its own protection domain, because the thread local memory blocks corresponds to different turfs that can be isolated from each other.

Figure 7:
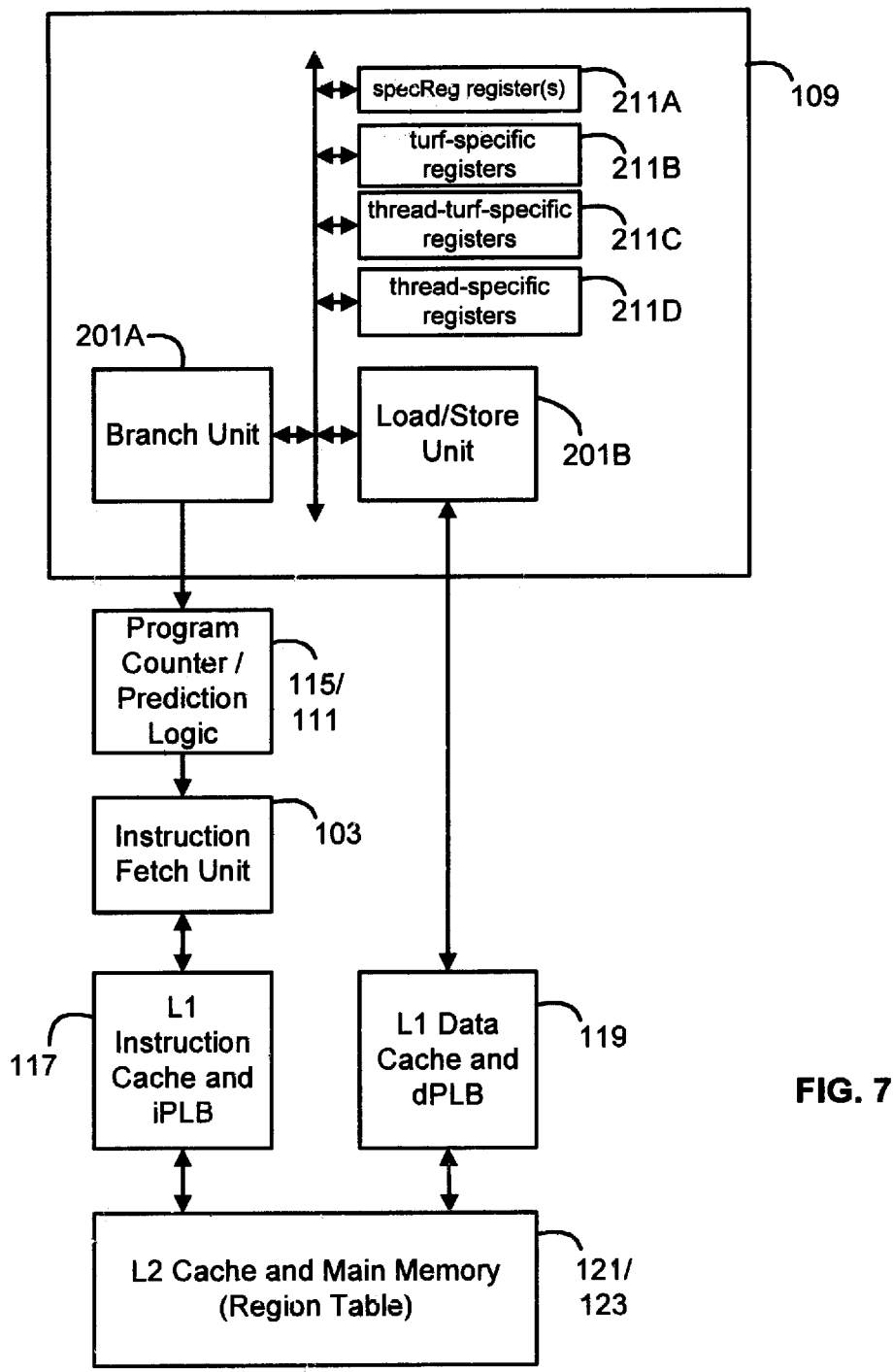
FIG. 7 is a schematic block diagram of components that can be part of the execution/retire logic of the computer processor of FIG. 1 according to an embodiment of the present disclosure.

In one embodiment shown in FIG. 7, the Execution/Retire Logic 109 of the CPU includes at least one functional unit 201A (one shown and labeled "Branch Unit") that is configured to perform actions for control flow operations (such as conditional and unconditional BRANCH operations, conditional and unconditional CALL operations and conditional and unconditional RETURN operations) as well as at least one functional unit 201B (one shown and labeled "Load/Store Unit") that is configured to perform actions that load operand data from or store operand data to the memory system of the CPU (such as LOAD and STORE operations). The functional units 201A and 201B interface to hardware registers 211A, 211B, 211C and 211D as shown. The hardware registers 221A are the specReg registers that stores the thread ID and turf ID pair(s) for the thread(s) executing on the CPU. The hardware registers 211B are turf-specific registers (e.g., cpReg, cWKR, cppReg, cpWKR, dpReg, dWKR Registers) that stores the turf-specific state information for thread-turf pair(s) executing on the CPU. The hardware registers 211C are thread-turf-specific registers that stores the thread-turf-specific state information (e.g., stacklet addresses and stack frame descriptors) for thread-turf pair(s) executing on the CPU. The hardware registers 211D are thread-specific registers that stores the thread-specific information (e.g., thread local storage addresses and descriptors) for thread-turf pair(s) executing on the CPU.

During the execution of a control flow operation by a given thread-turf pair, the Branch Unit 201A can access the base address "cpReg" register of the turf-specific registers 211B for the given thread-turf pair (and/or possibly one or more other supported address registers for the given thread-turf pair) to generate the target address of the control flow operation and then access the well-known region descriptors stored in the turf-specific registers 211B for the given thread-turf pair (e.g., the well-known region descriptor of the memory region storing instructions (code) for the particular turf of the thread-turf pair) to determine if the memory region(s) pointed to by such descriptors (which are inherently accessible by the given thread-turf pair) cover the target address of the control flow operation. This condition can be determined by comparing the virtual address range for the cache line referenced by the target address to the virtual address range for the memory region(s) pointed to by such well-known region descriptors to ascertain whether the virtual address range for the cache line referenced by the target address lies within the virtual address range for the memory region(s) pointed to by such well-known region descriptors. If so, the transfer of control flow to the target address is performed without checking the iPLB and/or the dPLB and thus avoids the computational resources and power in checking the iPLB and/or the dPLB. This transfer of control flow can involve the cooperation of the Program Counter 115 and Prediction Logic 111 to issue a fetch request to the L1 Instruction Cache 117 to fetch the cache line referenced by the target address. In this case, protection checking by the iPLB (and the dPLB) is avoided.

In the event that the memory region(s) pointed to by the well-known region descriptors stored in the turf-specific registers 211B for the given thread-turf pair do not cover the target address of the control flow operation, the Branch Unit 201A can cooperate with the Program Counter 115 and Prediction Logic 111 to issue a fetch request to the L1 Instruction Cache 117 to fetch the cache line referenced by the target address. In this case, protection checking by the iPLB is performed to ascertain whether the instruction-type turfs stored by the entries of the iPLB (which can possibly be hoisted from the Permission Tables if missed in the iPLB) dictate that access to the referenced cache line should be granted or denied for the given thread—turf pair. If such processing indicates that access should be granted, the transfer of control flow to the target address is performed. If such processing indicates that access should be denied, a protection violation is detected and a fault or other error is raised by the CPU.

During the execution of a LOAD or STORE operation by a given thread-turf pair, the Load/Store Unit 201B can access the base address "dpReg" register of the turf-specific registers 211B for the given thread-turf pair (and/or possibly one or more other supported address registers for the given thread-turf pair) to generate the target address of the LOAD or STORE operation and then can access the well-known region descriptors stored in the turf-specific hardware registers 211B for the given thread-turf pair (e.g., the well-known region descriptors of the memory regions storing data and constants for the particular turf of the thread-turf pair) as well as the descriptors describing the stacklet for the given thread-turf pair as stored in the thread-turf-specific registers 211C as well as the descriptors describing the thread local storage of the thread of the given thread-turf pair as stored in the thread-specific registers 211D to determine if the memory region(s) pointed to by such descriptors (which are inherently accessible by the given thread-turf pair) cover the effective address of the LOAD or STORE operation. This condition can be determined by comparing the virtual address range for the cache line referenced by the effective address to the virtual address range for the memory region(s) pointed to by such descriptors to ascertain whether the virtual address range for the cache line referenced by the effective address lies within the virtual address range for the memory region(s) pointed to by such descriptors. If so, the LOAD or STORE operation is performed without checking the iPLB and/or the dPLB and thus avoids the computational resources and power in checking the iPLB and/or the dPLB.

In the event that the memory region(s) pointed to by the descriptors stored in the turf-specific registers 211B, the thread-turf specific registers 211C and the thread-specific registers 211D for the given thread-turf pair do not cover the effective address of the LOAD or STORE operation, the Load/Store Unit 201B can issue a memory request to the L1 Data Cache 119 to fetch the cache line referenced by the effective address of the LOAD or STORE operation. In this case, protection checking by the dPLB is performed to ascertain whether the data-type turfs stored by the entries of the dPLB (which can possibly be hoisted from the Permission Table(s) if missed in the dPLB) dictate that access to the referenced cache line should be granted or denied for the given thread—turf pair. If such processing indicates that access should be granted, the actions of the LOAD or STORE operation are completed. If such processing indicates that access should be denied, a protection violation is detected and a fault or other error is raised by the CPU.

The CPU hardware can utilize portals that are stored in the hierarchical memory system and accessed by an executing thread to call or invoke functions or services. Such functions or services can execute in a different protection domain without switching threads. Each portal includes a set of data elements that can be accessed by an executing thread to call (or invoke) a particular function or service. These data elements include the following:

a target memory address, which is an entry address used to start the processing (e.g., fetch, decode, issue, execute, retire) of the instruction(s) of the particular function or service;

a TurfID for the new context of the thread;

optional data representing state information specific to the turf associated with the particular function or service (for example, such state information can be the turf-specific descriptors for the turf associated with the particular function or service that are stored in the turf-specific hardware registers as described above with respect to FIG. 6A).

The data elements of the portal entry can be arranged in a pre-defined layout as stored in the memory system. An example of such a layout is shown in FIG. 8A. The memory region(s) of the virtual address space of the memory system of the CPU that store the portal data can have a predefined permission parameter (which is referred to as "portal" permission) that permits the memory region to store a valid portal entry.

The function or service associated with a given portal entry can provide secure, stateful, callable behavior. The secure nature of the function or service can be provided by the separate and distinct protection domains for the Caller (the program code of a thread that called or invoked the function or service) and for the Callee function or service itself (which executes as part of the same thread of the Caller). This means that the Caller while executing in its own protection domain cannot directly access and tromp on the state and variables of the Callee function or service, and that the Callee function or service itself while executing in its own protection domain cannot directly access and tromp on the state and variables of the Caller. The stateful nature of the function or service can be provided by maintaining data structures representing the execution state (e.g., such as variables and other parameters) of the function or service as the function or service executes. Note that the execution of the function or service can continue in the same thread as that of the Caller while the execution of the Caller is inactive and does not execute. The callable nature of the function or service is provided by the portal-type CALL operation, which allows the function or service to be invoked by the execution of a CALL operation that does not require a task switch involving a change in threads.

The processing of a portal entry is triggered by the execution of a CALL operation with an address argument that represents a pointer referring to the portal entry. This is referred to as a portal-type CALL operation. Alternatively, the address argument(s) of the CALL operation can specify the entry address of a function (referred to herein as a "Callee function") that executes within the same thread and same protection domain as that of the CALL operation. This is referred to as a normal-type CALL operation.

The processing of both portal-type and normal-type CALL operations is described below with reference to the flowchart of FIGS. 9A and 9B. For the portal-type CALL operation, the address argument is a pointer to a portal entry in the virtual address space of the memory system. For the given thread-turf pair, the range of valid addresses referenced by the address argument (pointer) for portal-type CALL operations is constrained by the protection domain for the given thread-turf pair. This protection domain can include one or more memory regions described by the turfs of the iPLB (and Permission Tables) that are associated with the thread-turf pair and have "portal" permission. For normal-type CALL operations, the address argument(s) can specify an absolute address or offset address (such as base+index, base+index+offset or other offset addressing schemes) in the virtual memory space of the memory system. For a given thread-turf pair, the range of valid addresses referenced by the address argument(s) for normal-type CALL operations is also constrained by the protection domain for the given thread-turf pair. This protection domain can include two parts: i) a memory region storing instructions (code) for the thread-turf pair (which is pointed to by well-known region descriptors for the thread-turf pair) and ii) zero or more memory regions described by the instruction-type turfs of the iPLB (and the Permission Tables) that are associated with the thread-turf pair and have "execute" permission.

In block 901, the functional unit executing the CALL operation (e.g., the Branch Unit 201A of FIG. 7) evaluates the address argument(s) of the CALL operation to derive an effective virtual address for the CALL operation. The base address "cpReg" register of the turf-specific registers 211B for the given thread-turf pair (and/or possibly one or more other supported address registers for the given thread-turf pair) can be accessed to generate the effective virtual address for the CALL operation where the address argument of the CALL operation is an address that is offset from the base address stored in the "cpReg" register. It is also possible that the effective virtual address for the CALL operation can be generated without access to the base address stored in the "cpReg" register (and/or without access to other supported address registers for the given thread-turf pair) where self-relative addressing is used.

In block 903, the Branch Unit (or other CPU hardware) accesses the hardware register(s) 211B storing the well-known region descriptors pointing to the memory region storing instructions (code) for the thread ID—turf ID pair at the time of the CALL operation.

In block 905, the Branch Unit (or other CPU hardware) checks whether the memory region storing instructions (code) for the turf ID-thread ID pair (as dictated by the well-known region descriptors accessed in block 903) cover the effective virtual address resulting from the evaluation of the address argument(s) in block 901. This condition can be determined by comparing the virtual address range for the cache line referenced by the effective virtual address derived from the address argument(s) in block 901 to the virtual address range for the memory region(s) pointed to by such well-known region descriptors to ascertain whether the virtual address range for the referenced cache line lies within the virtual address range for the memory region(s) pointed to by such well-known region descriptors. If the check of block 905 passes, the operations continue to block 907; otherwise, the operations continue to block 909.

In block 907, the CALL operation is processed as a normal-type CALL operation (and not a portal-type CALL operation) because only normal-type CALL operations (and not portal-type CALL operations) can specify a target address within the well-known memory region storing instructions (code) for the turf of the thread-turf pair. Specifically, the Branch Unit uses the effective virtual address resulting from the evaluation of the address argument(s) in block 901 to update the Program Counter 115. If the instruction portion referenced by this effective virtual address is not already stored in the Instruction Buffer 105, the Instruction Fetch Unit 103 can be controlled to issue a fetch request to the L1 Instruction Cache 117 for the instruction portion referenced by this effective virtual address without protection checking by the iPLB, which avoids the computational resources and power in checking the iPLB. In one embodiment, the Instruction Fetch Unit 103 is controlled to fetch a cache line at the virtual address referenced by the address argument(s) of the CALL operation. For the normal-type CALL operation, this cache line stores code of a Callee function that executes in the same thread and protection domain as that of the call site. In this manner, these actions initiate transfer of control to the Callee function that executes within the same thread and same protection domain as that of the call site (normal-type CALL operation). Such transfer of control can also involve updating (e.g., elevating) the quality information for a predictor entry corresponding to the particular normal-type CALL operation where the particular normal-type CALL operation was predicted to be taken and then processed (e.g., fetch, decode, issue and execution) by speculation. Such transfer of control can also involve detecting and recovering from a mispredict where the particular normal-type CALL operation was predicted to be not taken. In this case, the mispredict recovery can initiate the processing (e.g., fetch, decode, issue and execution) of the instruction(s) of the Callee function and update (lower) the quality information for a predictor entry corresponding to the particular normal-type CALL operation.

In block 909, the Branch Unit uses the effective virtual address resulting from the evaluation of the address argument(s) in block 901 to update the Program Counter 115. If the instruction portion referenced by this effective virtual address is not already stored in the Instruction Buffer 105, the Instruction Fetch Unit 103 can be controlled to issue a fetch request to the L1 Instruction Cache 117 for the instruction portion referenced by this effective virtual address in conjunction with protection checking by the iPLB (blocks 911 to 921).

In block 911, the iPLB hardware accesses and queries (looks-up) the entries of iPLB to identify an instruction-type turf stored in the iPLB (or possibly stored in the Region Table if missed in the iPLB) that has i) a thread ID-turf ID pair that matches the thread ID-turf-ID pair at the time of the CALL operation and ii) data that specifies a memory region that covers the virtual address resulting from the evaluation of the address argument(s) of the CALL operation in block 901. This second condition ii) can be determined by comparing the virtual address range for the cache line referenced by the effective virtual address derived from the address argument(s) in block 901 to the virtual address range for the memory region(s) specified by the matching instruction-type turf to ascertain whether the virtual address range for the referenced cache line lies within the virtual address range for the memory region(s) pointed to by the matching instruction-type turf In block 913, the iPLB hardware processes the permission parameters for the matching instruction-type turf identified in block 911 to determine if such permission parameters specify an "execute" permission throughout.

In block 915, iPLB hardware checks that the permission parameters processed in block 913 specify an "execute" permission throughout. If this check passes, the operations continue to block 917; otherwise, the operations continue to block 919.

In block 917, the CALL operation is processed as a normal-type CALL operation (and not a portal-type CALL operation) because only normal-type CALL operations (and not portal-type CALL operations) can have target addresses in a memory region described by a turf with "execute" permission. Specifically, the iPLB hardware grants permission for completion of the fetch request initiated in block 909, which corresponds to the target address of the Callee function. These actions initiate transfer of control to the Callee function that executes within the same thread and same protection domain as that of the call site (normal-type CALL operation) and the operations end.

In block 919, the iPLB hardware further processes the permission parameters for the matching instruction-type turf identified in block 911 to determine if such permission parameters specify a "portal" permission that permits the memory region to store a valid portal entry.

In block 921, iPLB hardware checks that the permission parameters processed in block 919 specify a "portal" permission. If this check passes, the operations continue to block 923; otherwise, the operations continue to block 925.

In block 923, the CALL operation is processed as a portal-type CALL operation (and not a normal-type CALL operation) because only portal-type CALL operations (and not normal-type CALL operations) can have target addresses in a memory region described by a turf with "portal" permission. Specifically, the iPLB hardware grants permission for completion of the fetch request initiated in block 909, which corresponds to the virtual address for the portal entry that is further processed to call (or invoke) a particular function or service and thus transfer of control to the particular function or service. Such transfer of control can involve detecting and recovering from a mispredict where the particular portal-type CALL operation was predicted to be not taken. In this case, the mispredict recovery can initiate the processing (e.g., fetch and subsequent processing) of the portal entry for the particular portal-type CALL operation as described below.

In block 925, the target address of the CALL operation falls outside the protection domain of the thread-turf pair. In this case, the iPLB hardware denies permission for completion of the fetch request initiated in block 909 (which can prohibit the requested cache line from being stored into the Instruction Buffer 105) and raises a fault or triggers other suitable error handling as desired and the processing ends.

Figure 9A:
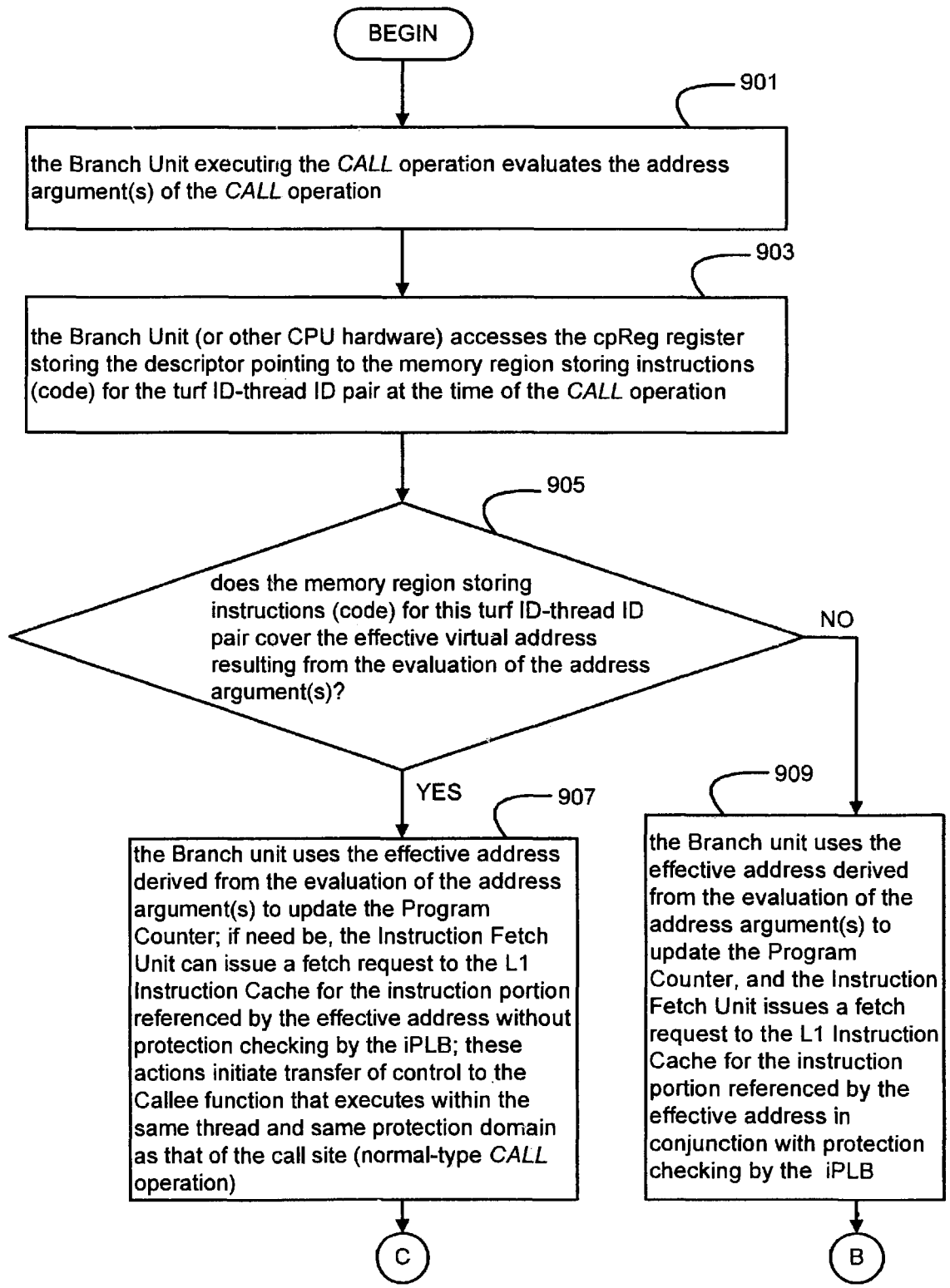
FIGS. 9A and 9B, collectively, is a flowchart illustrating the operations carried out by the computer processor in processing CALL operations, which includes normal-type CALL operations and portal-type CALL operations according to an embodiment of the present disclosure.
Figure 9B:
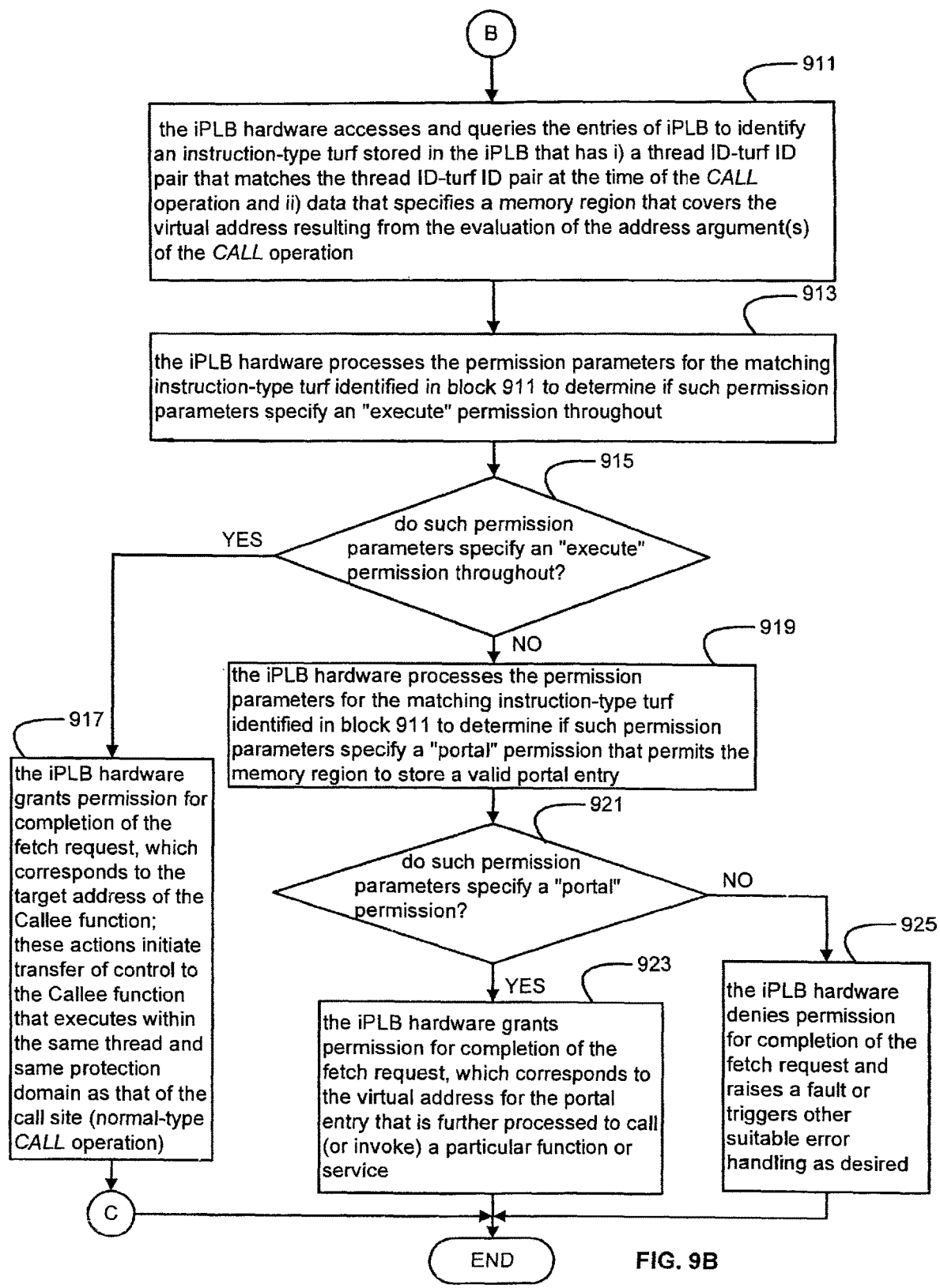
Figure 10:
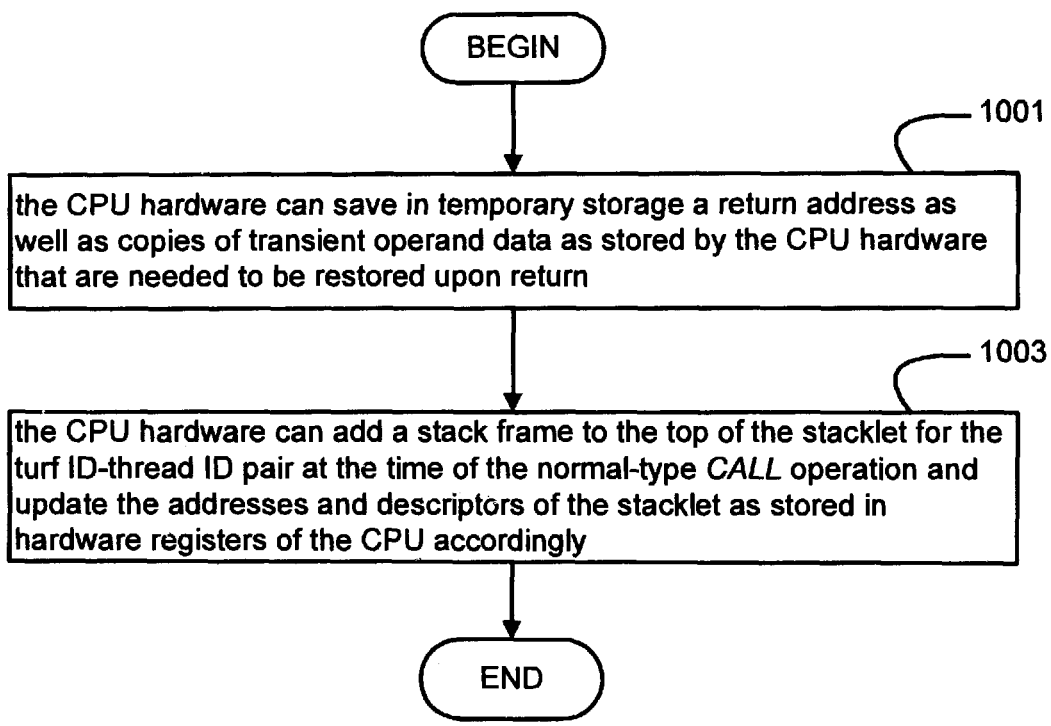
FIG. 10 is a flowchart illustrating actions carried out by the computer processor in processing a normal-type CALL operation.

FIG. 10 illustrates actions that can be performed by the CPU hardware for the case of a normal-type CALL operation (blocks 907 of FIG. 9A or block 917 of FIG. 9B). In block 1001, the CPU hardware can save in temporary storage a return address as well as copies of transient operand data as stored by the CPU hardware that are needed to be restored upon return. In one embodiment, the return address and transient operand data can be saved by an asynchronous hardware engine (referred to a "Spiller") as described in U.S. patent application Ser. No. 14/311,988, filed on Jun. 23, 2014 and herein incorporated by reference in its entirety. The Spiller can save such information in temporary storage that is separate and distinct from the stacklet for the turf ID-thread ID pair. Note that the storage of the return address in temporary storage that is separate and distinct from the stacklet can thwart return-oriented security exploits that are common sources of security violations in modern computer systems. Also note that in this case the Callee function executes within the same thread and turf as the Caller function and thus shares the same well-known region descriptors specific to this thread ID—turf ID pair. For this reason, the well-known region descriptors of the Caller function can be used for execution of the Callee function and there need not be any actions that involve switching protection domains between the Caller function and the Callee function.

In block 1003, the CPU hardware can add a stack frame to the top of the stacklet for the thread ID—turf ID pair as stored in the specReg register of the CPU at the time of the normal-type CALL operation. The CPU hardware can initialize every new stack frame to zero. The memory address for the top of the stacklet can be referenced by accessing the stacklet descriptor information stored in registers of the CPU. The stacklet descriptor information can loaded from the stacklet info block that corresponds to the stacklet for the thread ID—turf ID pair when beginning execution of the given thread—turf pair and updated according as the new stack frame is added to the stacklet during execution of the given thread—turf pair. The stack addresses and stacklet can include data used by the Callee function (such as descriptors for arguments passed to the Callee function as well as constants and variables used in the execution of the Callee function).

Figure 11:
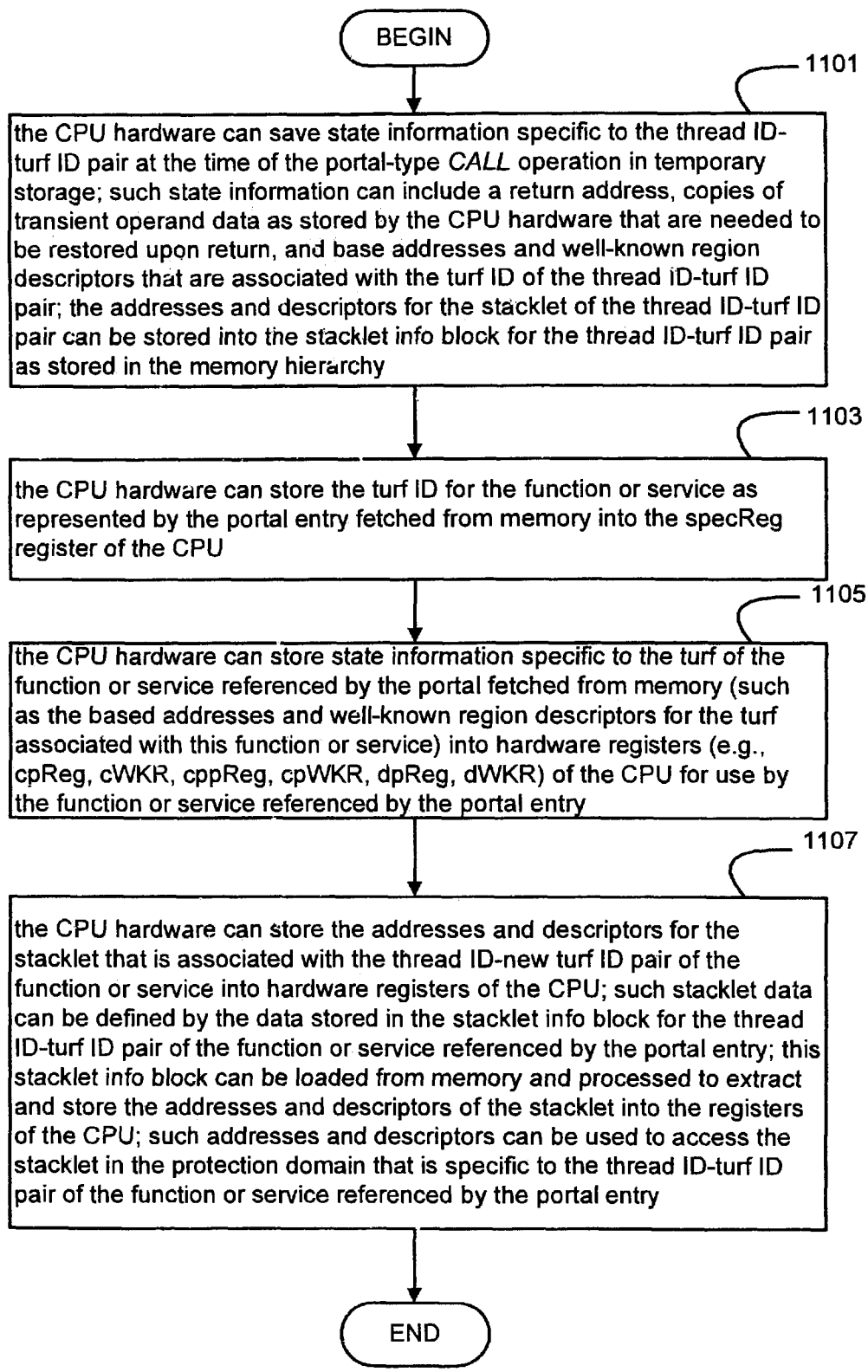
FIG. 11 is a flowchart illustrating actions carried out by the computer processor in processing a portal-type CALL operation.

For the case of a portal-type CALL operation, the CPU hardware is configured to access and process the given portal entry in order to initiate execution of the function or service referenced by the given portal entry (block 923 of FIG. 9B). In most cases (and possibly all cases), the given function or service will execute in a separate and distinct protection domain (relative to the protection domain of Caller function) as part of the same thread as the Caller function. Thus, the processing of the portal entry does not involve switching threads and avoids the computation resources required for thread/task switching. The processing of the portal entry can involve the actions described below with respect to flowchart of FIG. 11 where the portal entry acts as indirect interface mechanism to the execution of the given function or service.

In block 1101, the CPU hardware can save state information specific to the thread ID-turf ID pair at the time of the portal-type CALL operation in temporary storage. For example, such thread ID-turf ID pair specific state information can include a return address, copies of transient operand data as stored by the CPU hardware that are needed to be restored upon return, the address data and well-known region descriptors that are associated with the turf ID of the thread ID-turf ID pair. In one embodiment, such thread-turf pair specific state information can be saved by the Spiller as described in U.S. patent application Ser. No. 14/311,988, filed on Jun. 23, 2014, and incorporated by reference above in its entirety. The Spiller can save such information in temporary storage that is outside the protection domain of the function or service referenced by the portal entry and thus inaccessible by this function or service. This affords security features whereby the execution of the service or function cannot directly access and tromp on the state and variables of the Caller function. The CPU hardware can also store the stacklet descriptors that are associated with the thread ID-turf ID pair in the stacklet info block for thread ID-turf ID pair as stored in the memory system of the CPU as described herein.

In block 1103, the CPU hardware can store the turf ID for the function or service as represented by the second data of the valid portal entry into the specReg hardware register 211A of the CPU.

In block 1105, the CPU hardware can store state information specific to the turf of the function or service referenced by the portal entry (such as the base addresses and well-known region descriptors for the turf associated with this function or service) into turf-specific hardware registers 211B of the CPU for use by the function or service referenced by the portal entry. In this action, such state information specific to the turf of the function or service can be loaded from the third data of the valid portal entry as described herein.

In block 1107, the CPU hardware can store addresses and descriptors that describe the stacklet for the thread ID-new turf ID pair of the function or service into the thread-turf-specific hardware registers 211C of the CPU. In one embodiment, the stacklet addresses and descriptors can be defined by the data stored in the stacklet info block for the thread ID-turf ID pair of the function or service referenced by the portal entry. This stacklet info block can be loaded from memory and processed to extract and store the stacklet descriptors into the registers of the CPU. Such stacklet addresses and descriptors can be used by the function or service referenced by the portal entry to access the stacklet in the protection domain that is specific to the thread ID-turf ID pair of the function or service referenced by the portal entry. In this case, the CPU hardware can use the stacklet descriptors for the thread ID-new turf ID pair to add and access a new stack frame to the memory space of the stacklet for the thread ID-new turf ID pair. The CPU hardware can initialize every new stack frame to zero. The memory space for this stacklet is referenced by the stacklet addresses and descriptors for the thread ID-new turf ID pair. The stacklet addresses and descriptors can be used such that the memory region beyond the top stack frame of the stacklet is inaccessible by the executing thread in the new turf ID. These security measures can thwart exploits that access stack rubble in the region outside the stack frames for the current thread. The addresses and stacklet can include data used by the function or service (such as descriptors to arguments passed to the function or service as well as constants and variables used in the execution of the function or service).

Note that execution of a portal-type CALL operation can involve load requests for two cache lines—one cache line for the portal entry and one cache line for the stacklet info block corresponding to the portal entry.

Also note that the portal entries can rely on static assignment of one unique stacklet per thread-turf pair. Furthermore, it is possible for a single thread to include more than one portal-type CALL operation into a single function or service. For example, consider a thread executing in turf A that includes a portal-type CALL operation to turf B. These operations will involve two stacklets: one for the particular thread, turf A pair; and one for the particular thread, turf B pair. If the thread then includes a portal-type CALL operation to turf C before returning to turf A, these operations will comprise three stacklets: one for the particular thread, turf A pair; one for the particular thread, turf B pair; one for the particular thread, turf C pair. If then the thread includes a portal-type CALL operation to turf B, the recursive portal processing would attempt to again use of the stacklet for the particular thread, turf B pair, and would destroy the frames in that stacklet that are in use from the use of thread in turf B in between turfs A and C. To avoid this error each stacklet contains at its lowest address a value for the top of stacklet pointer (TOSP). This pointer indicates the first free location in the stacklet. In processing the portal-type CALL operation, the TOSP for the stacklet associated with the portal-type CALL operation (the current thread-turf pair) is updated from a hardware top of stack register of the CPU at the time of the portal-type CALL operation, and top of stack register of the CPU for the function or service is set from the TOSP in the stacklet for the thread-turf pair of the function or service. Because new frames are always allocated at the current top of stack, new frames allocated at the second or subsequent transit into the process will not overlap. In order to use the TOSP in the stacklet for the thread-turf pair of the function or service in setting the hardware top of stack register of the CPU, it must be fetched from memory by the CPU as part of the processing of the portal-type CALL operation. If there is another portal-type CALL operation to a function executing in the same thread and turf pair, then the TOSP will have been set immediately above the previous frames and using it for the stack pointer will be correct. However, if this is the first portal-type CALL operation to a function or service executing in a given thread and turf pair, then the stacklet has never been used before and the TOSP location in the stacklet is undefined. It would of course be possible for the processing of CPU to initialize a TOSP in every possible stacklet. However, the number of such stacklets can be quite large and most will never be used, which would waste the virtual memory resources of the system.

Instead, the CPU can be configured to take advantage of the hardware handling of a load-type memory request to the L1 Data Cache for a value that is undefined, i.e. to a virtual address that has never been stored to. In this case, the load-type memory request can be processed by first checking the caches for a cache line matching the virtual address, and then attempting to translate the virtual address to a corresponding physical address to probe main memory. The virtual-to-physical address translation mechanism will not find a translation page entry in the TLB nor its underlying tables, and so will report a page trap to the operating system. That page trap can be configured to recognize that the load request is a stacklet TOSP request from a portal-type CALL operation (and not an ordinary program load operation) and then respond by setting the TOSP to zero or some other fixed value in a cache line and returning that value as if the TOSP had already been initialized. That is, a load of an uninitialized TOSP causes the TOSP itself to be initialized when the load memory request fails translation in the TLB.

The execution of a RETURN operation is carried out by the Branch Unit 201A (or other CPU hardware). The actions of the RETURN operation unwinds the most recently executed CALL operation, whether it be a normal-type or portal-type CALL operation.

Figure 12:
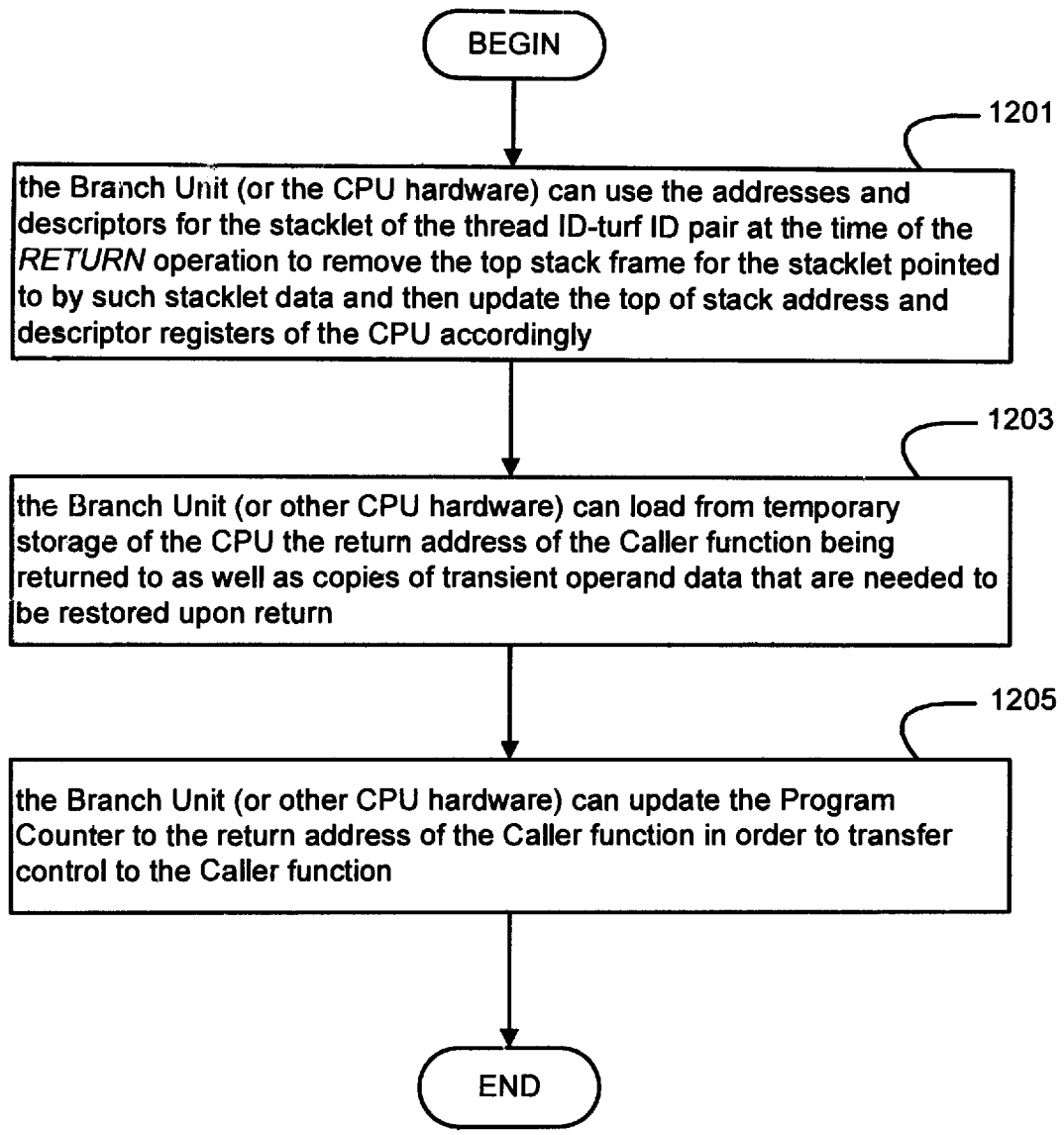
FIG. 12 is a flowchart illustrating actions carried out by the computer processor in processing a RETURN operation from a normal-type CALL operation.

For the case where the most recently executed CALL operation is a normal-type CALL operation, the RETURN operation can involve the actions as described below with respect to FIG. 12. In block 1201, the Branch Unit (or other CPU hardware) can use the state information for the thread ID-turf ID at the time of the RETURN operation (particularly, the stacklet addresses and descriptors stored in the thread-turf-specific registers 211C) to remove the top stack frame for the stacklet pointed to by such stacklet addresses and descriptors and then update the top of stack address and descriptors stored in the thread-turf-specific registers 211C of the CPU accordingly. The stacklet can also be used to pass operand data generated by the Callee function to the Caller function, if need be.

In block 1203, the Branch Unit (or other CPU hardware) can load from temporary storage of the CPU the return address of the Caller function being returned to as well as copies of transient operand data that are needed to be restored upon return. In one embodiment, such information can be loaded from temporary storage by the Spiller as described in U.S. patent application Ser. No. 14/311,988, filed on Jun. 23, 2014, and incorporated by reference above in its entirety. Note that in this case the Caller function executes within the same thread and turf as the Callee function and thus shares the same well-known region descriptors specific to this thread ID—turf ID pair. For this reason, the well-known region descriptors of the Callee function can be used for execution of the Caller function and there need not be any actions that involve switching protection domains between the Callee function and the Caller function. The transient operand data loaded from temporary storage and possibly transient operand data generated by the Callee function and being passed back to the Caller function can be stored in the operand storage elements of the CPU.

In block 1205, the Branch unit (or other CPU hardware) can update the Program Counter 115 to the return address of the Caller function in order to transfer control to the Caller function. Such transfer of control can also involve detecting and recovering from a mispredict where the RETURN operation to the Caller function was predicted to be not taken. In this case, the mispredict recovery can initiate the processing (e.g., fetch, decode, issue and execution) of the instruction(s) of the Caller function. Such transfer of control can also involve updating the quality information for a predictor entry corresponding to the RETURN operation to the Caller function where the RETURN operation to the Caller function was predicted to be taken and then processed (e.g., fetch, decode, issue and execution) by speculation.

Figure 13:
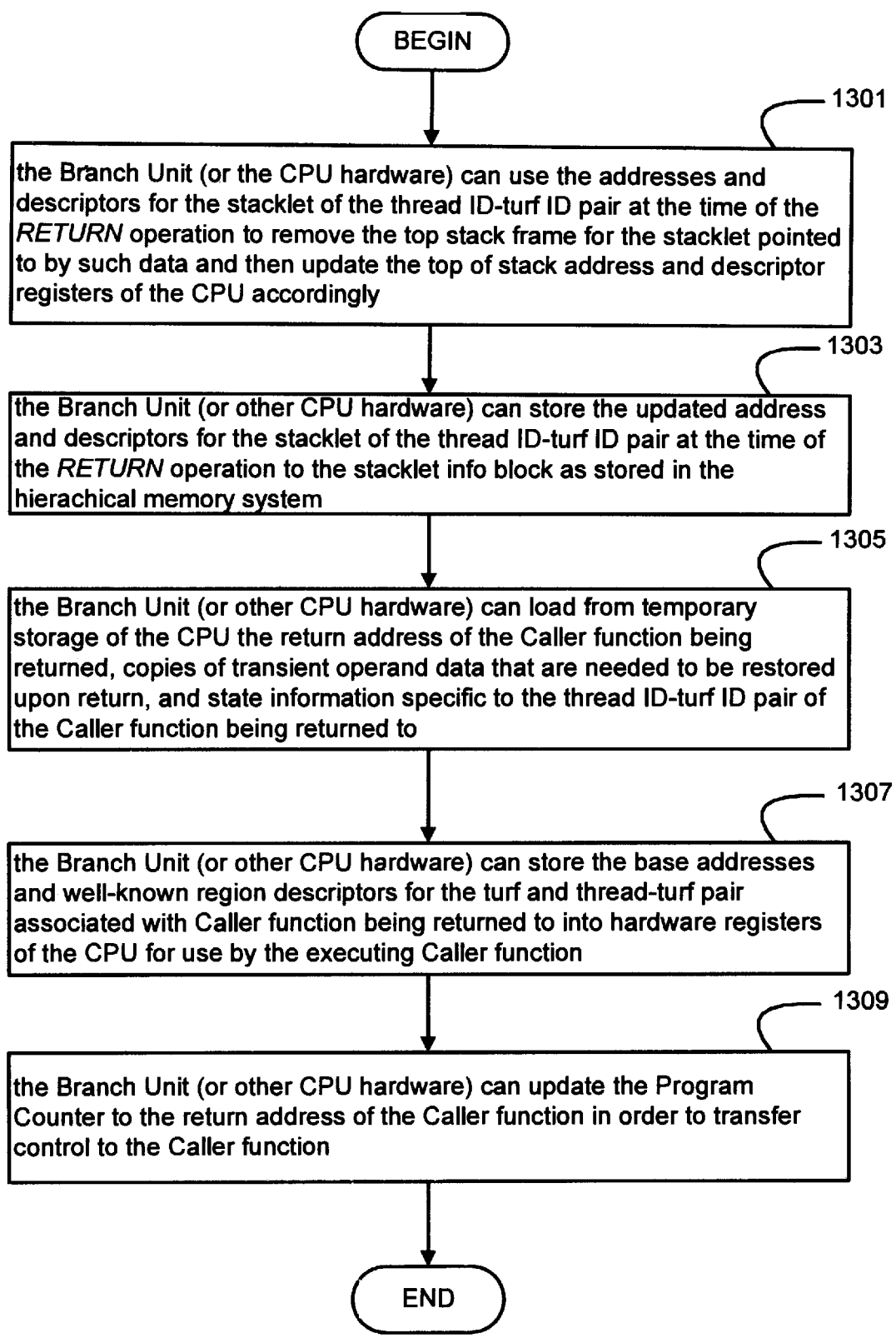
FIG. 13 is a flowchart illustrating actions carried out by the computer processor in processing a RETURN operation from a portal-type CALL operation.

For the case where the most recently executed CALL operation is a portal-type CALL operation, the RETURN operation can involve the actions as described below with respect to FIG. 13. In block 1301, the Branch unit (or other CPU hardware) can use the addresses and descriptors for the stacklet of the thread ID-turf ID pair at the time of the RETURN operation as stored in the thread-turf-specific registers 211C to remove the top stack frame for the stacklet pointed to by such stacklet addresses and descriptors and then update the top of stack address and descriptors stored in the thread-turf-specific registers 211C of the CPU accordingly. This stacklet can also be used to pass operand data generated by the Callee function to the Caller function, if need be.

In block 1303, the Branch Unit (or other CPU hardware) can store the updated stacklet descriptors for the thread ID-turf ID pair at the time of the RETURN operation to the stacklet info block as stored in the memory system.

In block 1305, the Branch Unit (or other CPU hardware) can load from temporary storage of the CPU the return address of the Caller function being returned to, copies of transient operand data that are needed to be restored upon return, and state information specific to the thread ID-turf ID pair of the Caller function being returned to. In one embodiment, such information can be loaded from temporary storage by the Spiller as described in U.S. patent application Ser. No. 14/311,988, filed on Jun. 23, 2014, and incorporated by reference above in its entirety. The thread-turf specific state information can include addresses and well-known region descriptors that are associated with the turf ID of the Caller function being returned to. The CPU hardware can also load from memory the stacklet info block for the thread ID-turf ID pair of the Caller function being returned to.

In block 1307, the Branch Unit (or other CPU hardware) can store the addresses and well-known region descriptors for the turf ID associated with the Caller function being returned to into the turf-specific hardware registers 211B of the CPU for use by the executing Caller function. Such addresses and well-known region descriptors for the turf ID of the Caller function can be defined by thread ID-turf ID pair specific state information loaded from temporary storage in block 1305. Such well-known region descriptors can be used to grant the executing Caller function access to memory regions for code, constants and data of the Caller function and thus enforce the protection domain that is specific to the thread ID-turf ID pair of the Caller function. The Branch Unit (or other CPU hardware) can also store the addresses and descriptors for the stacklet of the Caller function being returned to into the thread-turf-specific hardware registers 211C of the CPU for use by the executing Caller function. Such addresses and descriptors for the stacklet of the Caller function can be defined by the data of the stacklet info block loaded from memory in block 1305. Such stacklet descriptors can be used to grant the executing Caller function access to the stacklet and thus enforce the protection domain that is specific to the thread ID-turf ID pair of the Caller function. The transient operand data loaded from temporary storage and possibly transient operand data generated by the Callee function and being passed back to the Caller function can be stored in the operand storage elements of the CPU.

In block 1309, the Branch Unit (or other CPU hardware) can update the Program Counter 115 to the return address of the Caller function. Such transfer of control can initiate processing (fetch, decode, issue, execute, retire) of the instruction(s) of the Caller function.

The processing of the RETURN operation from the portal-type CALL operation can be constrained such that it is executed non-speculatively. This can possibly introduce a bubble in the decode stage of the CPU, which can involve a stall of a couple of machine cycles. However, speculative prefetch actions can be performed with respect to the RETURN operation in order to reduce the instruction fetch overhead of the RETURN operation, assuming the prediction for the RETURN operation was correct.

Figure 14A:
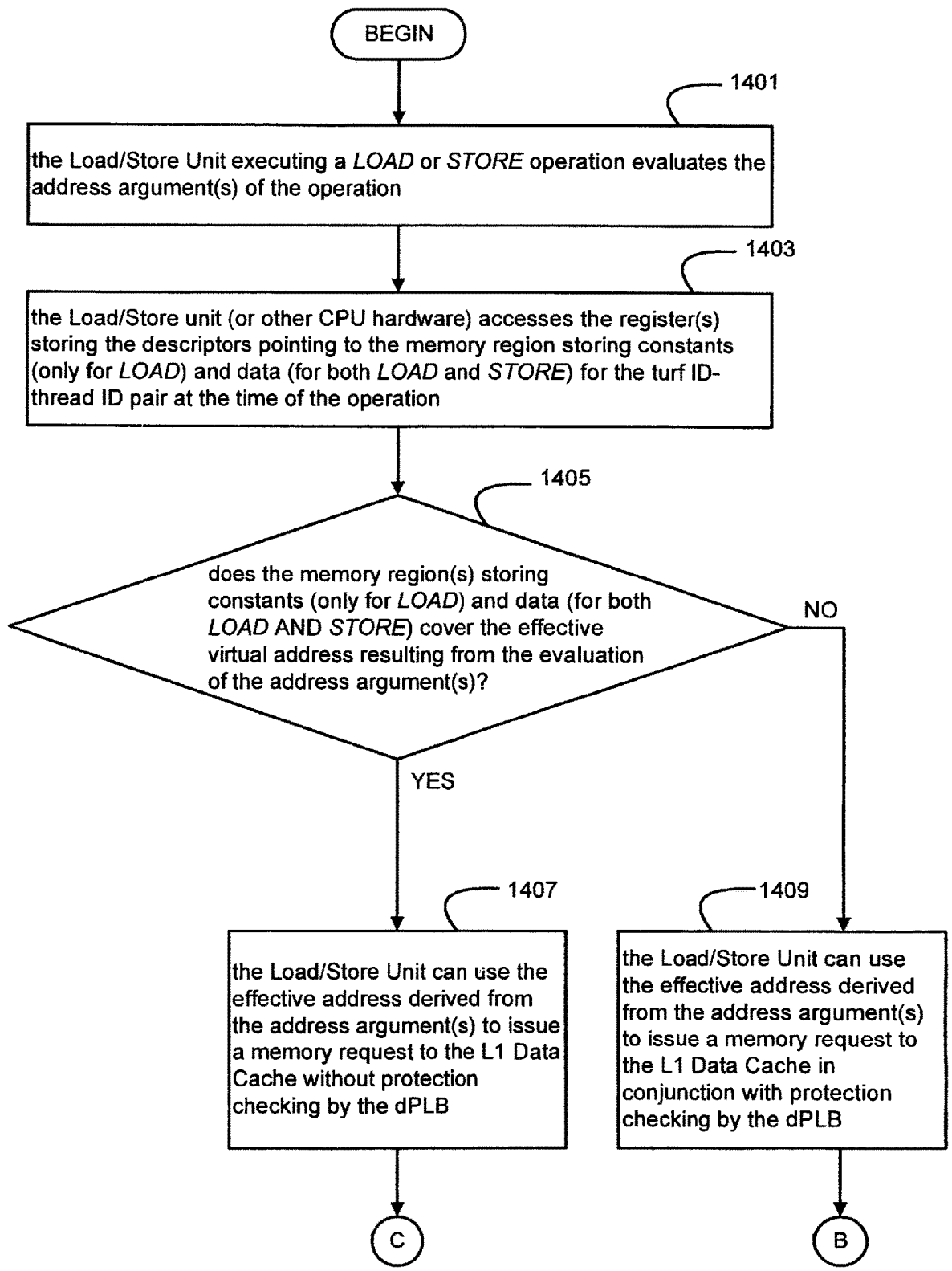
FIGS. 14A and 14B, collectively, is a flowchart illustrating the operations carried out by the computer processor in processing LOAD and STORE operations according to an embodiment of the present disclosure.
Figure 14B:
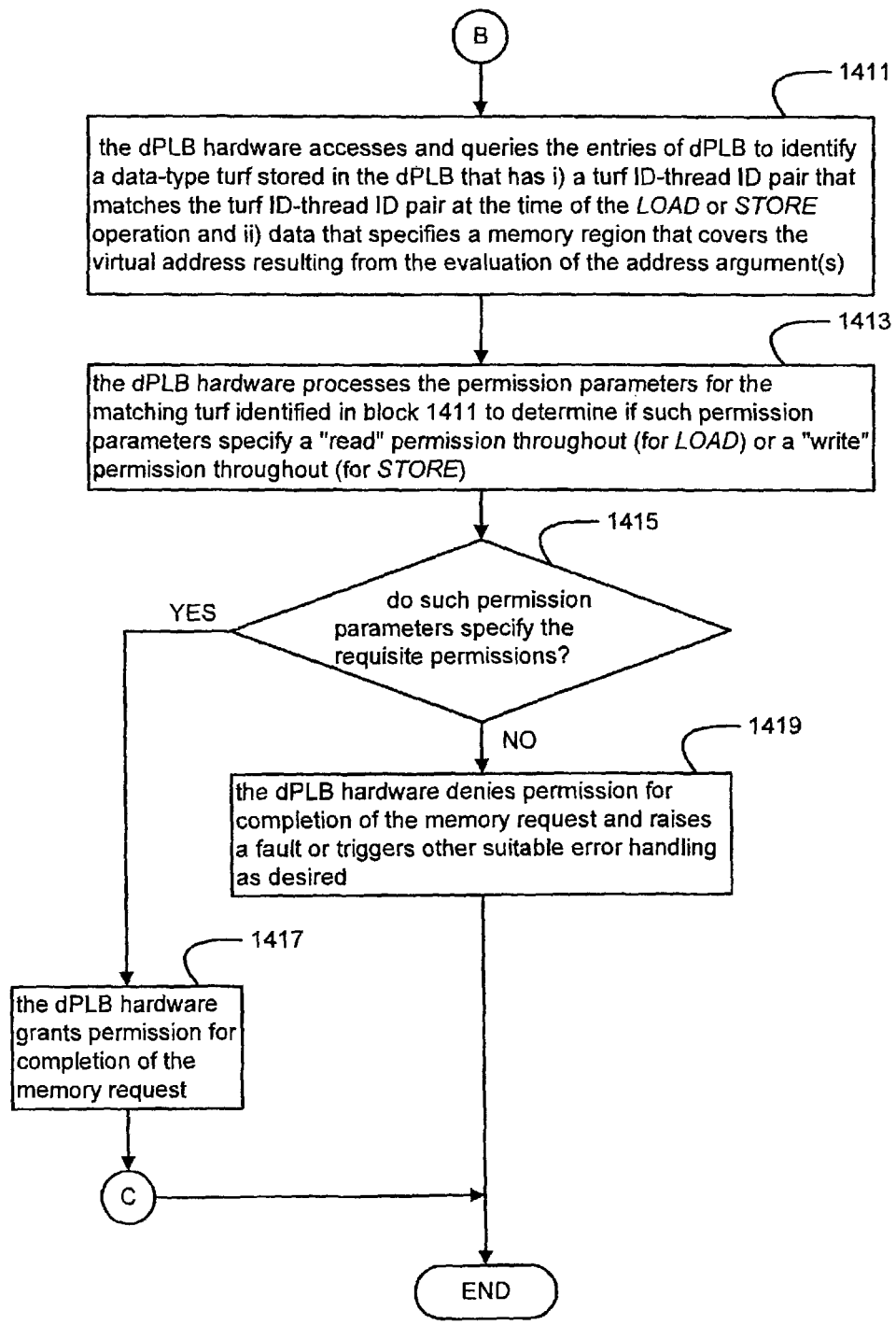

The processing of LOAD and STORE operations by the Load/Store Unit 201B is described below with reference to the flow chart of FIGS. 14A and 14B. The LOAD and STORE operations each include address argument(s) that can specify an absolute address or offset address (such as base+index, base+index+offset or other offset addressing schemes) in the virtual memory space of the memory system. For a given thread-turf pair, the range of valid addresses referenced by the address argument(s) for LOAD operations is constrained by the protection domain for the given thread-turf pair. This protection domain can include two parts: i) memory regions storing constants and data for the thread-turf pair (which is pointed to by well-known region descriptors for the thread-turf pair) and ii) zero or more memory regions described by the data-type turfs of the dPLB (and Permission Tables) that are associated with the thread-turf pair and have "read" permission. For a given thread-turf pair, the range of valid addresses referenced by the address argument(s) for STORE operations is constrained by the protection domain for the given thread-turf pair. This protection domain can include two parts: i) memory regions storing non-static data for the thread-turf pair (which is pointed to by well-known region descriptors for the thread-turf pair) and ii) zero or more memory regions described by the data-type turfs of the dPLB (and Permission Tables) that are associated with the thread-turf pair and have "write" permission.

In block 1401, the Load/Store Unit evaluates the address argument(s) of the LOAD or STORE operation to derive an effective virtual address for the operation. The base address "dpReg" register of the turf-specific registers 211B for the given thread-turf pair (and/or one or more other supported address registers for the given thread-turf pair) can be accessed to generate the effective virtual address for the LOAD or STORE operation where the address argument of the LOAD or STORE operation is an address that is offset from the base address stored in the "dpReg" register. It is also possible that the effective virtual address for the LOAD or STORE operation can be generated without access to the base address stored in the "dpReg" register (and/or without access to other supported address registers for the given thread-turf pair) where self-relative addressing is used.

In block 1403, the Load/Store Unit (or other CPU hardware) accesses the hardware register(s) of the CPU storing the descriptors pointing to the memory region storing constants (only for LOAD) and non-static data (for both LOAD and STORE) for the turf ID-thread ID pair at the time of the operation. These registers can include the cWKR and dWKR hardware registers (211B) specific to the turf of the thread ID-turf ID pair, registers storing stacklet descriptors (211C) for thread ID-turf ID pair, and registers storing thread local storage descriptors (211D) specific to the thread of the thread ID-turf ID pair.

In block 1405, the Load/Store Unit (or other CPU hardware) checks whether the memory regions for the turf ID-thread ID pair (as dictated by such descriptors accessed in block 1403) cover the effective virtual address resulting from the evaluation of the address argument(s) in block 1401. This condition can be determined by comparing the virtual address range for the cache line referenced by the effective virtual address to the virtual address range for the memory region(s) pointed to by the descriptors accessed in block 1403 to ascertain whether the virtual address range for the cache line referenced by the effective address lies within the virtual address range for the memory region(s) pointed to by such descriptors. If the check of block 1405 passes, the operations continue to block 1407; otherwise, the operations continue to block 1409.

In block 1407, the Load/Store Unit uses the effective virtual address resulting from the evaluation of the address argument(s) in block 1401 to issue a memory request (a load-type memory request for a LOAD operation and a store-type request for a STORE operation) to the L1 Data Cache 119 of the hierarchical memory system without protection checking by the dPLB, which avoids the computational resources and power in checking the dPLB.

In block 1409, the Load/Store Unit uses the effective virtual address resulting from the evaluation of the address argument(s) in block 1401 to issue a memory request (a load-type memory request for a LOAD operation and a store-type request for a STORE operation) to the L1 Data Cache 119 in conjunction with protection checking by the dPLB (blocks 1411 to 1421). Note that for a STORE operation, the results of any irreversible action that is part of the STORE operation can be held in a temporary buffer until the protection check by the dPLB completes successfully. At that time, the results of such irreversible action can be effectively written to the L1 Data Cache 119.

In block 1411, the dPLB hardware accesses and queries (looks-up) the entries of dPLB to identify a data-type turf stored in the dPLB (or possibly stored in the Permission Tables if missed in the dPLB) that has i) a thread ID-turf ID pair that matches the thread ID-turf-ID pair at the time of the LOAD or STORE operation and ii) data that specifies a memory region that covers the virtual address resulting from the evaluation of the address argument(s) of the LOAD or STORE operation in block 1401. The second condition ii) can be determined by comparing the virtual address range for the cache line referenced by the effective virtual address derived from the address argument(s) in block 1401 to the virtual address range for the memory region(s) specified by the matching data-type turf to ascertain whether the virtual address range for the referenced cache line lies within the virtual address range for the memory region(s) pointed to by the matching data-type turf In block 1413, the dPLB hardware processes the permission parameters for the matching data-type turf identified in block 1411 to determine if such permission parameters specify a "read" permission throughout (for LOAD) or a "read" permission throughout (for STORE).

In block 1415, the dPLB hardware checks that the permission parameters processed in block 1413 specify the requisite permissions ("read" permission throughout (for LOAD) or a "write" permission throughout (for STORE)). If this check passes, the operations continue to block 1417; otherwise, the operations continue to block 1419.

In block 1417, the dPLB hardware grants permission for completion of the memory request initiated in block 1409.

In block 1419, the effective virtual memory address of the LOAD or STORE operation falls outside the protection domain of the thread-turf pair. In this case, the dPLB hardware denies permission for completion of the memory request initiated in block 1409 (which can prohibit the requested cache line from being stored into the L1 Data Cache 119) and raises a fault or triggers other suitable error handling as desired and the processing ends.

In one embodiment, the CPU hardware can be configured on boot to provide a root turf containing the entirety of the virtual address space of the memory system with full rights for both code and data to the first thread. From there on out the first thread can utilize GRANT operations to pass on any right and region subdivision as it sees fit to other threads, which those threads can also do to what they received. In this manner, the assignment of protection domains to the executing threads cascades down the logical chain of threads as such threads are executed on the CPU.

The entries of the iPLB and dPLB can use a single bit (referred to herein as a "novel bit") to manage the discard process of such entries. Specifically, the entries for newly granted turfs that are added to the iPLB and the dPLB each have their novel bit set. The novel bit of the entry is cleared when the entry is evicted and lowered to the Permission Tables. The cleared novel bit is included in the PLB entry when the turf is hoisted from the Permission Tables when missed in the iPLB or dPLB. Matching entries for turfs that have been revoked are looked up in the iPLB or dPLB. If a matching entry has its novel bit set, the regions descriptor of the matching entry can be discarded from the iPLB or dPLB without processing the Permission Tables. If a matching entry has its novel bit cleared, the turf of the matching entry can be discarded from the iPLB or dPLB and also discarded from the Permission Tables (where the discard from the Permission Tables can be a lazy process if desired).

Figure 15:
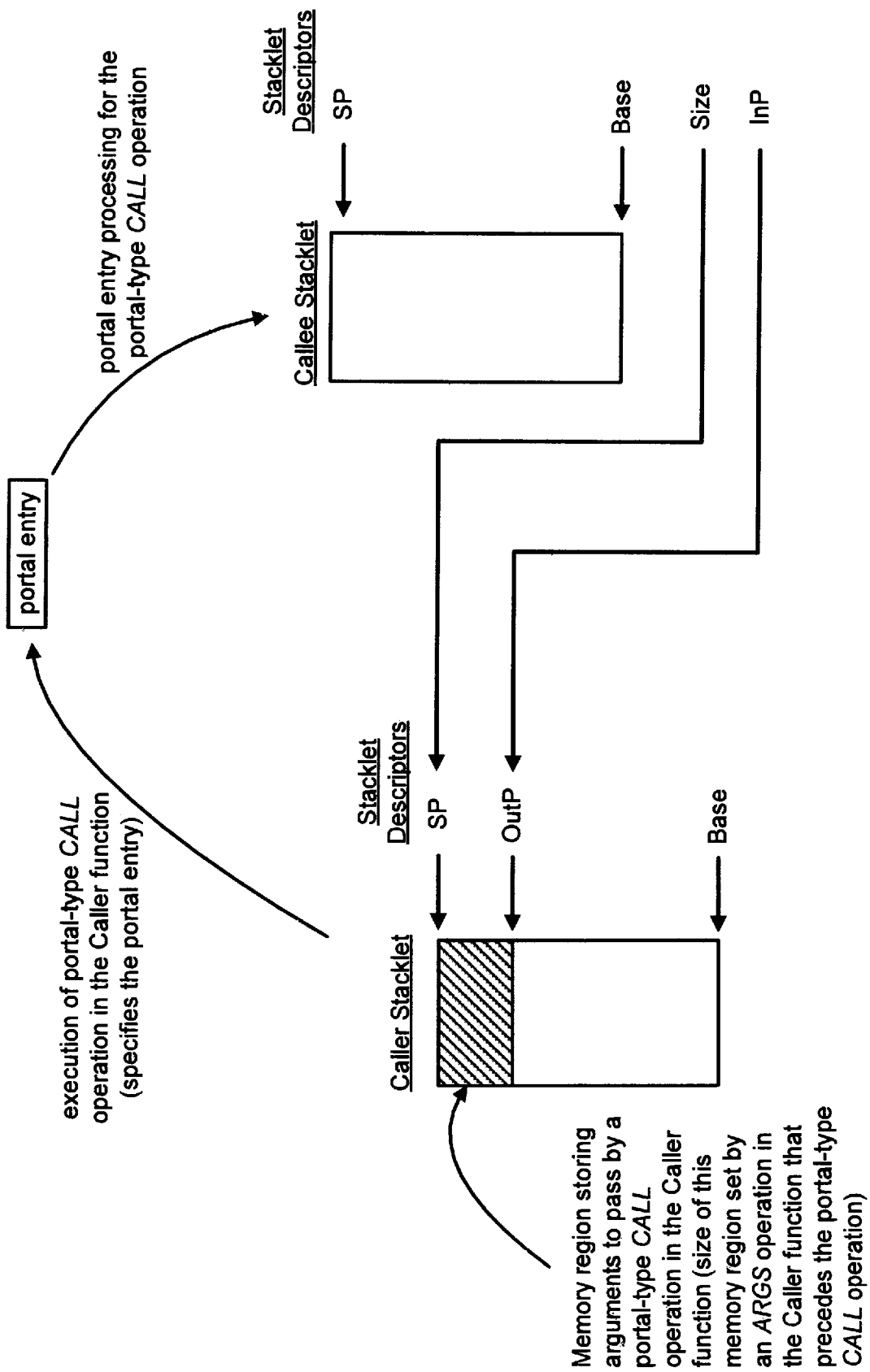
FIG. 15 is a schematic diagram of the processing of an ARGS operation and portal-type CALL operation that cooperate to pass one or more arguments stored in the stacklet of a Caller function to a Callee function according to an embodiment of the present disclosure.

The processing pipeline of the CPU can also support an ARGS operation, which ordinarily has nothing to do with granting rights. As evident from the schematic diagram of FIG. 15, the actions of the ARGS operation can reserve a portion of the top stack frame of the current thread-turf pair (Caller function) by setting a defined hardware register of the CPU (the "OutP" register) to some value below the stack pointer "SP" as needed. When processing a portal-type CALL operation that follows the ARGS operation in the Caller function, the processing of the portal entry specified by the a portal-type CALL operation involves the CPU hardware i) initializing a stack frame as part of the stacklet of the Callee function and ii) storing stacklet descriptors for the stack frame of the stacklet of the Callee function into the defined thread-turf specific registers of the CPU as described herein. Such stacklet descriptors can include a pointer "InP" and "Size" descriptors that describe the reserved portion of the top stack frame of the Caller function. In this case, the pointer "InP" can be copied from the pointer value stored in the "OutP" register for the Caller function. This processing allows the Callee function to have access to the reserved portion of the top stack frame of the Caller function. As this reserved data stack portion is part of the stacklet of the thread, this processing can be performed for normal-type CALL operations as well.

Note that the processing of the portal-type CALL operations as described herein affords an efficient mechanism to provide separate and distinct protection domains between the Caller (Source) and Callee (Sink) code portions that execute in the same thread. Furthermore, the context that needs to be accessed from memory in crossing the protection barrier can be contained in two cache lines. Furthermore, the portal entries that provide gateways between the protection domains can be user-defined and allow the services that are referred to by such portal entries to be contained in small protected packages. Furthermore, the protection domains defined by the memory regions and turfs of the protection-lookaside buffer(s) and Region Table can be counted in the thousands or tens of thousands on a system. This is relatively coarsely grained security. These features all work together to provide a flexible, reliable, and efficient security framework. Specifically, the features can avoid full context switches that are incredibly expensive. Modern CPUs often spend a third or more of their cycles on context switches and related management like TLB and cache shuffling. For example, a full context switch can run into hundreds of machine cycles just to change the processor core state. And on top of is added machine cycle delays due to cache thrashing and the memory accesses required to switch the working data sets.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). In still another example, the security protection mechanisms as described herein can be applied to memory regions that are defined in the physical address of main memory of the CPU. In this case, the protection checking can be carried out in conjunction with virtual-to-physical address translation mechanism (TLB processing). The CPU can also implement other adaptations and extensions of the hardware-based protection mechanisms as described herein. It will therefore be appreciated by those skilled in the art that yet other modifications could be made to the provided invention without deviating from its spirit and scope as claimed.

What is claimed is:

1. A computer processor comprising:
   an instruction processing pipeline that interfaces to a hierarchical memory system employing an address space, wherein the instruction processing pipeline includes execution logic that executes at least one thread in different protection domains over time, wherein said different protection domains are defined by descriptors each including first data specifying a memory region of the address space employed by the hierarchical memory system and second data specifying permissions for accessing the associated memory region;
   wherein the first data of at least one particular descriptor specifies a memory region storing a portal corresponding to a given function or service, wherein the portal acts as an indirect mechanism to the execution of the given function or service;
   wherein the portal includes the following data: i) an ID that refers to a protection domain which is used during execution of the given function or service, and ii) address data that refers to an entry address of the given function or service;
   wherein the instruction processing pipeline is configured to execute a CALL operation to the portal with a pointer argument that refers to the portal whereby the actions of the CALL operation process the portal to switch to the protection domain referred to by the ID of the portal.

2. A computer processor according to claim 1, wherein:
   the address space comprises one of a virtual address space and a physical address space.

3. A computer processor according to claim 1, wherein:
   a given thread executes in a particular protection domain, one protection domain at a time; and
   the particular protection domain is selectively configured to change over time.

4. A computer processor according to claim 3, wherein:
   the given thread is identified by a first key;
   the particular protection domain is identified by a second key; and
   when the given thread executes in the particular protection domain, the first key is associated with the second key.

5. A computer processor according to claim 1, wherein:
   the descriptors are stored in at least one hardware table that is queried in conjunction with servicing requests that access the hierarchical memory system; and
   the at least one hardware table is backed to at least one permission table stored in the memory system.

6. A computer processor according to claim 5, wherein:
   the hierarchical memory system includes a top level instruction cache separate from a top level data cache; and
   descriptors for memory regions that store instructions are stored in a first hardware table that is queried in conjunction with servicing fetch requests that are issued to the top level instruction cache for accessing instruction portions stored in the top level instruction cache, and descriptors for memory regions that store operand data are stored in a second hardware table that is queried in conjunction with servicing memory requests that are issued to the top level data cache for loading operand data from or storing operand data in the top level data cache.

7. A computer processor according to claim 6, wherein:
   the second data for descriptors stored in the first hardware table selectively specify an execute permission or a portal permission;
   the second data for descriptors stored in the first hardware table optionally specify a grant permission;
   the second data for descriptors stored in the second hardware table selectively specify a write permission or a read permission; and
   the second data for descriptors stored in the second hardware table optionally specify a grant permission.

8. A computer processor according to claim 5, wherein:
   the at least one hardware table stores the descriptors in entries each including a single bit that is processed when first adding the corresponding entry to the at least one hardware table and evicting the corresponding entry from the at least one hardware table in order to remove the corresponding entry from the at least one hardware table without accessing the at least one permission table for circumstances when the corresponding entry is not located in the region table.

9. A computer processor according to claim 1, wherein:
   the protection domains are further defined by descriptors for predefined memory regions of the address space that are stored in hardware registers of the computer processor.

10. A computer processor according to claim 9, wherein:
    the protection domains are defined by turfs each representing a collection of descriptors, and the predefined memory regions include at least one memory region selected from the group including: at least one turf-specific memory region, at least one thread-turf-specific memory region, and at least one thread-specific memory region.

11. A computer processor according to claim 10, wherein:
    the at least one turf-specific memory region includes a first memory region that stores instructions for a particular turf, a second memory region that stores constants for a particular turf, and a third memory region that stores data for the particular turf;
    the at least one thread-turf-specific memory region includes a fourth memory region that stores a stack portion for a particular thread-turf pair; and
    the at least one thread-specific memory region includes a fifth memory region that stores thread local data for a particular thread.

12. A computer processor according to claim 9, wherein:
the hardware registers that store the descriptors for the predefined memory regions of the address space are accessed and processed in order to perform protection checking before querying the at least one hardware table that stores the descriptors for protection checking in order to avoid the protection checking carried out by accessing and processing the at least one hardware table that stores the descriptors in certain circumstances.

13. A computer processor according to claim 1, wherein:
the data of the portal further includes iii) state information that is restored to hardware registers for use during execution of the particular function or service.

14. A computer processor according to claim 1, wherein:
the second data of the particular descriptor includes a portal permission; and
the portal permission of the second data of the particular descriptor is processed in conjunction with the execution of the CALL operation to the portal to distinguish it from a normal-type CALL operation.

15. A computer processor according to claim 1, wherein:
the instruction processing pipeline supports a persistent grant operation that specifies persistent permissions attached to a given protection domain.

16. A computer processor according to claim 1, wherein:
the instruction processing pipeline supports a transient grant operation that specifies transient permissions created for the purpose of a single transaction between two different protection domains, wherein the transient permissions are automatically revoked when the transaction for which they were created completes.

17. A computer processor according to claim 16, wherein:
the transient permissions are associated with the thread that makes the transient grant operation and an immediately following a CALL operation to a portal.

18. A computer processor according to claim 1, wherein:
the instruction processing pipeline supports at least one grant operation that specifies permissions attached to a given protection domain, wherein the at least one grant operation employs an index-based protocol for pass-by-reference permission arguments.

19. A computer processor according to claim 1, wherein:
the instruction processing pipeline supports a guard operation that sets a reserved bit of a pointer representation, wherein a callee of a CALL operation to a portal employs the guard operation to set the reserved bit for each pass-by-reference argument pointer it receives.

20. A computer processor according to claim 19, wherein the guard bit has the following semantics:
load or store based on a guarded pointer checks only the transient grants;
load or store not based on a guarded pointer does not check transient grants;
pointer load based on a guarded pointer sets the reserved bit of the loaded pointer;
pointer load that loads a guarded pointer faults;
pointer store based on a guarded pointer must be storing a guarded pointer (else fault) and clears the guard on it; and
load effective address preserves guard.

21. A computer processor according to claim 1, wherein:
the instruction processing pipeline supports sessions that permits both server and client of a respective CALL operation to a portal to maintain session-related state, with automatic cleanup at the completion of the session.

22. A computer processor according to claim 21, wherein the instruction processing pipeline supports least one of the following operations:
i) a SESSIONBEGIN operation by which a client allocates and initializes a transient permission table distinct from that used by a GRANT operation;
ii) a SESSIONISSTARTED operation, by which a client determines if it is a participant in a session which the server has accepted;
iii) a SESSIONEND operation, by which a client terminates a session and recovers a transient descriptor table and other session-related resources;
iv) a SESSIONMAKE operation, by which a server can acknowledge the existence of a session and register a callback function and state for notification when a SESSIONEND operation is executed; and
v) equivalent functionality implemented as trapping operations, as library functions, or other means common in the art to implement such an operation.

23. A computer processor according to claim 1, wherein:
the instruction processing pipeline supports a protocol that permits both server and client of a respective CALL operation to a portal to communicate across a protection-domain boundary.

24. A computer processor according to claim 23, wherein the protocol includes at least one of the following operations:
i) a GRANT operation that conveys from client to server the right to access a region of the address space accessible to the client for use in one or more activities of the server as identified by individual permissions, where the rights conveyed are transient and are automatically revoked when the server returns from the CALL operation to a portal;
ii) a RELAY operation that conveys from the server (acting as a client) to a nested relaying server the right to access a region of the address space accessible to the client for use in one or more activities of the server as identified by individual permissions, where the rights conveyed had been granted to the relaying server rather than being possessed directly by the relaying server ;
iii) a PERSIST operation by which rights granted to the server by a GRANT or RELAY operation may be made persistent and survive the server return from the CALL operation to a portal;
iv) a CALLAS operation, by which the server may make a CALL operation to a portal using an address contained in a transient descriptor;
v) a LOADAS operation, by which the server may load a value from a memory location described by a transient descriptor;
vi) a STOREAS operation, by which the server may store a value to a memory location described by a transient descriptor;
vii) a COPYFROMAS operation, by which the server may copy the contents of a memory region described by a transient descriptor to a memory region private to the server;
viii) a COPYTOAS operation, by which the server may copy the contents of a memory region private to the server to a memory region described by a transient descriptor;
ix) a GRANTSIZE operation, by which the server can determine the size in bytes of a memory region described by a transient descriptor;

x) a GRANTGRANTER operation, by which the server can determine the identity of an ultimate granter (disregarding intermediate relays) of a transient descriptor;

xi) a GRANTRIGHTS operation, by which the server can determine which or the possible usage permissions are conveyed by a transient descriptor; and xii) equivalent functionality implemented as trapping operations, as library functions, or other means common in the art to implement such operations.

25. A computer processor according to claim 1, wherein:

each protection domain is associated with at least one region of the address space called a plot;

each plot constitutes a private address space, unique to the protection domain, overlaid on the global shared address space;

for any memory location, it is possible to determine its address in a local plot address space if given the global address and the identifier of the protection domain of that plot;

for any memory location, it is possible to determine its address in the global address space if given the local address in the plot and also the identifier of the protection domain of that plot; and machine pointers carry meta-information by which it can be determined for any pointer whether it refers to the global address space or to some local plot address space.

26. A computer processor according to claim 25, wherein:

the global address corresponding to a local plot address is determined by XORing the local address with the identifier of the protection domain associated with the plot; and the local plot address corresponding to a global address is determined by XORing the global address with the identifier of the protection domain associated with the plot.

27. A computer processor according to claim 1, wherein:

certain memory address locations referred to as spillets are reserved for use for holding machine state;

each spillet is associated with a single protection domain and with a single thread of execution, where the protection domains and threads have numerical identifiers;

the location of the spillet corresponding to a given thread and protection domain can be determined from the identifiers of the thread and protection domain;

spillets are accessible only to hardware and trusted software, not to the application thread associated with the spillet; and a change to the protection domain in which the thread is operating inherently changes which spillet is associated with the thread/protection domain at that point of execution.

28. A computer processor according to claim 27, wherein:

the location of a spillet for a given protection domain and thread combination is determined by treating the spillet region as a two-dimensional array of spillets in a statically known region legion of the address space, indexed by the protection domain and thread identifiers.

29. A computer processor according to claim 27, wherein:

a spillet can be marked as i) running where the associated thread is currently in execution by a CPU core and running in the associated protection domain or ii) parked where the associated thread is not currently in execution by any core, but such that if a core were assigned to it the associated thread world resume execution running in the associated protection domain or iii) blocked where the associated thread is not currently in execution by any core, and is not eligible to be assigned a core because of nested portal calls or iv) disused.

30. A computer processor according to claim 29, wherein the instruction processing pipeline supports at least one of the following operations:

a SPAWN operation, whereby a disused spillet is allocated, changed to the parked state, and initialized with a function and state arguments such that a CPU core assigned to the associated thread begins executing the function with the state arguments in the associated protection domain;

a DISPATCH operation, by which a running thread transfers its CPU core to the thread of a parked spillet changing its state to running, becoming itself parked; and a SUICIDE operation, by which a running thread transfers its CPU core to the thread of a parked spillet changing its state to running, becoming itself disused and recovering attached resources; and a FRATRICIDE operation, by which a running thread causes a parked spillet to change to disused, recovering associated resources.

31. A computer processor according to claim 1, wherein:

the CALL operation to the portal provides for exchange of arguments and results between caller and callee but neither party can see or modify any other state of the other party.

32. A computer processor according to claim 1, wherein:

the instruction processing pipeline supports a grant operation that specifies permissions attached to a given protection domain, wherein the permissions of the grant operation specify rights in the given protection domain, and wherein the grant operation is invoked by a grantor that is required to possess persistent permissions covering the memory range of the given protection domain with at least the granted rights.

* * * * *